(12) United States Patent
Spector et al.

(10) Patent No.: US 9,275,387 B1
(45) Date of Patent: Mar. 1, 2016

(54) SYSTEMS AND METHODS FOR PROCESSING TRANSACTIONS USING A WALLET

(75) Inventors: Howard Spector, Woolwich, NJ (US); Hugh Tamassia, Landenberg, PA (US); Brian Smyth, West Chester, PA (US); Joseph William Stanish, New York, NY (US); Reetika Grewal, Larkspur, CA (US); Vincent R. D'Agostino, Port Washington, NY (US); Russ Mahy, Palm Harbor, FL (US); Scott Hollis Ouellette, Kingston, NH (US); Sherry Ann Allen, Kennett Square, PA (US); Dan Poswolsky, Plainview, NY (US)

(73) Assignee: JPMOGAN CHASE BANK, N.A., New York, NY (US)

( * ) Notice: Subject to any disclaimer, the term of this patent is extended or adjusted under 35 U.S.C. 154(b) by 18 days.

(21) Appl. No.: 13/586,606

(22) Filed: Aug. 15, 2012

Related U.S. Application Data

(60) Provisional application No. 61/523,944, filed on Aug. 16, 2011, provisional application No. 61/544,837, filed on Oct. 7, 2011, provisional application No. 61/576,742, filed on Dec. 16, 2011, provisional application No. 61/581,864, filed on Dec. 30, 2011, provisional application No. 61/611,216, filed on Mar. 15, 2012, provisional application No. 61/645,954, filed on May 11, 2012.

(51) Int. Cl.
*G06Q 20/00* (2012.01)
*G06Q 20/36* (2012.01)

(52) U.S. Cl.
CPC .................................. *G06Q 20/367* (2013.01)

(58) Field of Classification Search
CPC .................................................. G06Q 20/3674
USPC .............................. 705/2, 39, 67, 64, 65, 66
See application file for complete search history.

(56) References Cited

U.S. PATENT DOCUMENTS

| | | | |
|---|---|---|---|
| 6,873,974 B1 * | 3/2005 | Schutzer | 705/39 |
| 2003/0115549 A1 | 6/2003 | Ward | |
| 2004/0254848 A1 * | 12/2004 | Golan et al. | 705/26 |

(Continued)

OTHER PUBLICATIONS

U.S. Appl. No. 61/482,755, filed May 5, 2011 to Lyman et al. ("Lyman"), 20 pgs.*

*Primary Examiner* — Hunter Wilder
(74) *Attorney, Agent, or Firm* — Hunton & Williams LLP

(57) ABSTRACT

The invention provides a wallet vault, in the form of a tangibly embodied processing machine, disposed in communication with a financial payment network, the wallet vault comprising a communication portion and a processing portion. The processing portion may perform processing including storing token information of a customer and real credentials of the customer, the token information associated with the real credentials of the customer, the real credentials constituted by an account number of the customer; inputting the token information with transaction ID information from a processing entity in the financial network, the token information with transaction ID information generated by a merchant processing a transaction for the customer; associating the token information of the customer with the real credentials of the customer; and outputting the associated real credentials with the transaction ID information to the processing entity.

14 Claims, 32 Drawing Sheets

(56) References Cited

U.S. PATENT DOCUMENTS

| | | | |
|---|---|---|---|
| 2007/0192245 A1* | 8/2007 | Fisher et al. | 705/39 |
| 2008/0140577 A1 | 6/2008 | Rahman et al. | |
| 2008/0223918 A1 | 9/2008 | Williams et al. | |
| 2011/0217994 A1* | 9/2011 | Hirson et al. | 705/27.1 |
| 2012/0028609 A1 | 2/2012 | Hruska | |
| 2012/0239417 A1 | 9/2012 | Pourfallah et al. | |
| 2012/0290376 A1* | 11/2012 | Dryer et al. | 705/14.23 |
| 2013/0110658 A1* | 5/2013 | Lyman et al. | 705/18 |

* cited by examiner

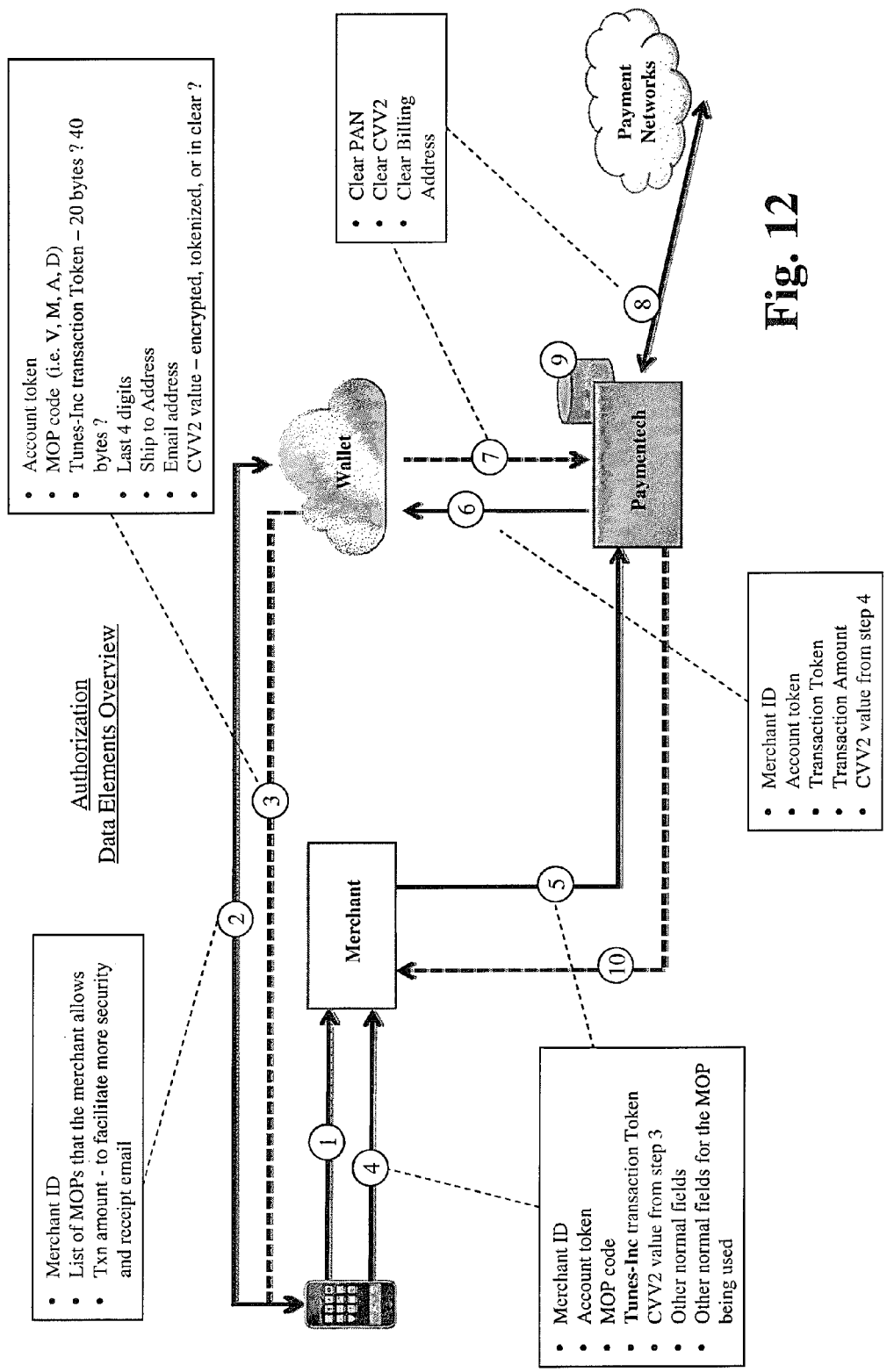

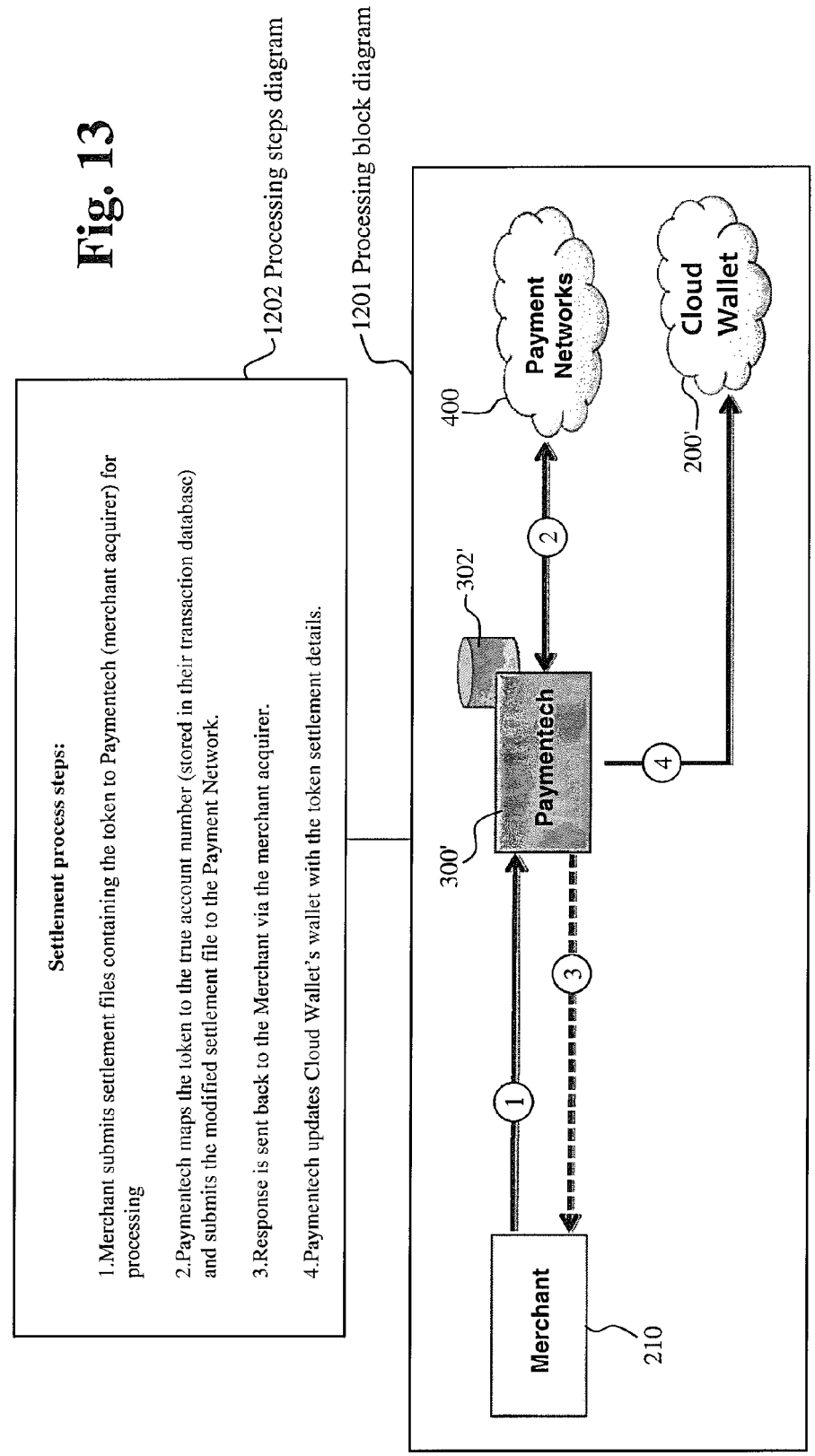

Transaction Token

The transaction token would be generated via a one-way cryptographic hash using a shared secret key and using information about the transaction, merchant and customer as the input to the hash.

The token would also have the last four digits of the customers underlying payment credential appended to the end of the token.

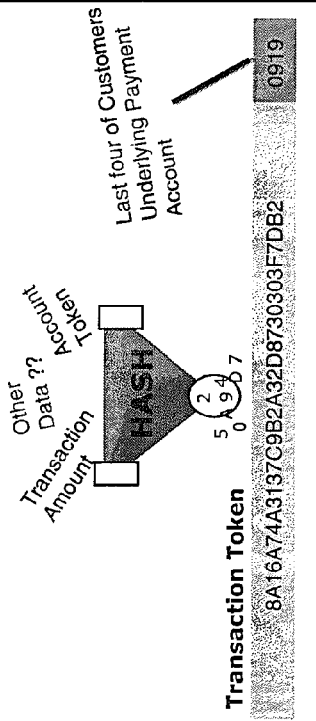

Transaction Token
8A16A74A3137C9B2A32D8730303F7DB2 0919

Last four of Customers Underlying Payment Account

Fig. 15

Account Token

The account token would be a 16 digit ISO compliant number that is routable over the existing payment networks. Preserving this form factor will reduce merchant integration and support any future network routing needs. This token may also be a permanent mapping between the card and this merchant. The account tokens will also be placed in a BIN range that corresponds to the network and product type at the highest level.

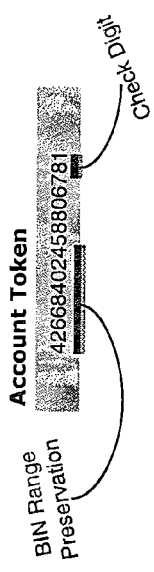

Account Token
4266840245806781

BIN Range Preservation

Check Digit

Fig. 14

Returns (m-commerce and in store)

SYSTEMS AND METHODS FOR PROCESSING TRANSACTIONS USING A WALLET

RELATED APPLICATIONS

This application claims priority to U.S. Provisional Patent Application 61/523,944 filed Aug. 16, 2011, which is incorporated herein by reference in its entirety.

This application claims priority to U.S. Provisional Patent Application 61/544,837 filed Oct. 7, 2011, which is incorporated herein by reference in its entirety.

This application claims priority to U.S. Provisional Patent Application 61/576,742 filed Dec. 16, 2011, which is incorporated herein by reference in its entirety.

This application claims priority to U.S. Provisional Patent Application 61/581,864 filed Dec. 30, 2011, which is incorporated herein by reference in its entirety.

This application claims priority to U.S. Provisional Patent Application 61/611,216 filed Mar. 15, 2012, which is incorporated herein by reference in its entirety.

This application claims priority to U.S. Provisional Patent Application 61/645,954 filed May 11, 2012, which is incorporated herein by reference in its entirety.

FIELD OF THE INVENTION

The systems and methods described herein relate to payment processing and related processing.

BACKGROUND OF THE INVENTION

In the present fast paced environment, people make a wide variety of purchases using traditional payment methods. To support such payment methods, an extensive financial infrastructure is utilized. For example, the credit card, and financial system associated therewith, is widely used. However, the current financial infrastructure is insufficient in some respects to provide desired convenience for people, as well as secure and efficient processing of a requested transaction. For example, the ease and efficiency of performing routine transactions is lacking using various of today's commonplace technologies.

Therefore, improvements to the current financial infrastructure are needed to accommodate the evolving needs of people in their busy and complex lives. The systems and methods of the invention provide such improvements.

BRIEF SUMMARY OF THE INVENTION

The invention provides a wallet vault, in the form of a tangibly embodied processing machine, disposed in communication with a financial payment network, the wallet vault comprising a communication portion that inputs and outputs information and a processing portion. The processing portion may perform processing including storing token information of a customer and real credentials of the customer, the token information associated with the real credentials of the customer, the real credentials constituted by an account number of the customer; inputting the token information with transaction ID information from a processing entity in the financial network, the token information with transaction ID information generated by a merchant processing a transaction for the customer; associating the token information of the customer with the real credentials of the customer; and outputting the associated real credentials with the transaction ID information to the processing entity in the financial network. The wallet vault may be associated with a wallet from which the transaction is initiated, and the wallet associated with the merchant.

BRIEF DESCRIPTION OF THE DRAWINGS

The present invention can be more fully understood by reading the following detailed description together with the accompanying drawings, in which like reference indicators are used to designate like elements, and in which:

FIG. 12 is a flowchart showing further aspects of authorization and data exchange, in accordance with one embodiment of the invention.

FIG. 13 is a diagram showing aspects of settlement processing, in accordance with one embodiment of the invention.

FIG. 14 is a diagram showing aspects of an account token, in accordance with one embodiment of the invention.

FIG. 15 is a diagram showing aspects of a transaction token, in accordance with one embodiment of the invention.

DESCRIPTION OF THE INVENTION

Figure 1:
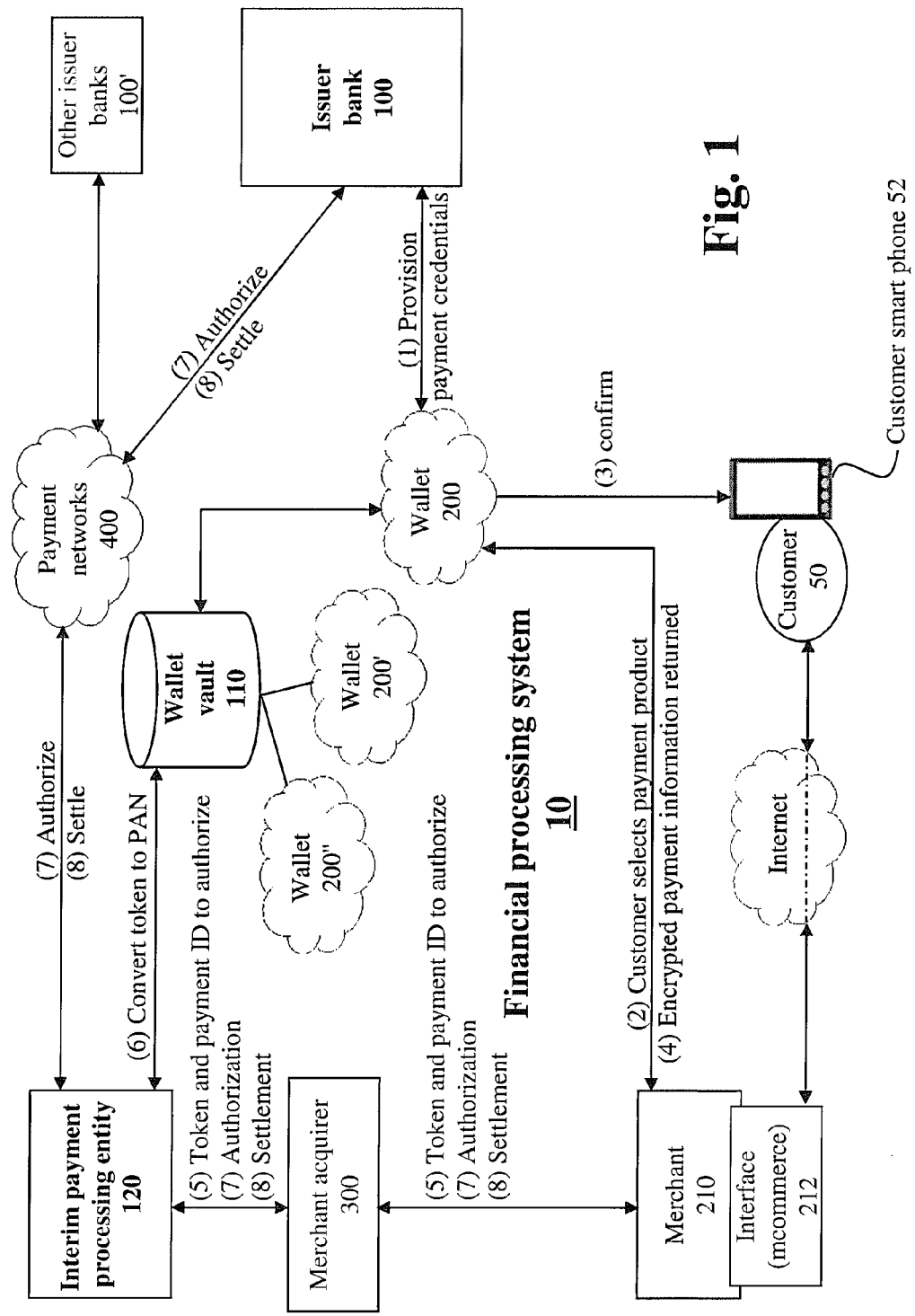
FIG. 1 is a block diagram showing the components of a financial processing system and the flow of information between such components, in accordance with one embodiment of the invention.

Hereinafter, aspects of a wallet vault in accordance with various embodiments of the invention will be described. As used herein, any term in the singular may be interpreted to be in the plural, and alternatively, any term in the plural may be interpreted to be in the singular.

The systems and methods of the invention provide a wallet vault. The wallet vault may be in the form of a single or multiple computer processors, e.g. servers, that are maintained by a financial entity. Relatedly, the wallet vault may utilize cloud computing architecture, i.e., the wallet vault of the invention may be "in the cloud."

In accordance with embodiments of the invention, the wallet vault houses the payment credentials of customers, i.e., users, in a secure manner. The wallet vault provides for a customer to enroll, i.e., participate in, one or more wallets. That is, in accordance with one embodiment of the invention, the invention provides a secure back end processor (the wallet vault) which interfaces with a front end processor (a wallet). In one scenario, the wallet vault may be maintained by a financial institution, such as JPMORGAN CHASE BANK, NA (CHASE). On the other hand, the wallet, on the front end, may be maintained by a primarily non-financial entity, such as GOOGLE, AMAZON, or APPLE, for example.

In the invention, a consumer "provisions" his or her credentials, which are stored in the wallet vault, to a particular wallet. In other words, the particular customer authorizes, i.e./enables, a "wallet" maintaining front-end entity (such as GOOGLE, AMAZON, or APPLE) to interface with the wallet vault to secure provisioned payment credentials from the wallet vault. Accordingly, the wallet vault may issue provisioned payment credentials for use by the customer via the particular wallet, and associate such provisioned payment credentials with "real credentials" of the customer. The real credentials of the customer might be in the form of her actual bank account number or credit card number, for example. It is the real credentials that are stored in the wallet vault, and which are not accessible by the wallet. The provisioned payment credentials may be in the same form as the real credentials, i.e., in the form of bank account number or credit card number, for example.

Accordingly, the invention provides an architecture that may be characterized as providing a separation of duties. The wallet vault secures the customer's real credentials outside the control and realm of the front-end entity, such as GOOGLE. Accordingly, the wallet vault may manage the financial products of different merchants or other entities. On the other hand, the front-end entity provides the front end interface to the customer for various transaction processing, as desired by the customer. It is appreciated that there may be multiple wallet vaults as well as multiple wallets associated with each of the multiple wallet vaults. For example, one particular wallet vault may be dedicated to a particular type of merchant and a second wallet vault dedicated to a different type of merchant. However, it is of course appreciated that respective wallet vaults may be associated with respective vaults based on any criteria as desired.

The provisioned payment credentials may, in accordance with one embodiment of the invention, be in the form of a token. As used herein, the term "payment token" or "token" means an identifier that points to a credential in the customer's wallet, such credential being associated with a method of payment (MOP) of choice. Such credential is stored in the wallet vault and is selected by the customer for that particular transaction. The payment token may be in various forms. In one form, the payment token may be in the form of a PAN (payment account number) that is processable across the rails (i.e., the existing payment channels) of VISA or MASTERCARD, for example. For example, the payment token might be in the form of a 16 digit number. The payment token may be tied to any number of the customer's available payment mechanisms/payment products (e.g. credit card, debit card, etc) that are stored in the wallet vault. A token as described herein may include, be associated with, and/or be packaged with any of a wide variety of data used in processing of a transaction and/or documentation of a transaction, for example. In general, it is of course appreciated that the particulars of a number sequence described herein are not limiting. For example, the 16 digit number sequence described above is not limiting, and a number sequence of another length may of course be utilized. For example, the particular length of a number might be 15 digits, 12 digits, or some other length, dependent on the particular payment network utilized and/or the particular processing systems utilized, for example. Further, the invention is not limited to a numerical sequence. For example, alphanumeric characters, symbols, and/or glyphs might be utilized or any other suitable character.

As described in detail herein, various types of tokens may be associated with a customer, credential, and/or transaction, for example. In one embodiment, the system may generate and use a transaction token that is unique to the particular transaction of the customer. Such transaction token may be utilized by a merchant acquirer, for example, to derive the customer's payment credentials (to be used in the transaction). Further, the merchant acquirer may also generate an account token that is associated with the transaction token. Further details are described below.

As also described further below, the architecture of the invention provides for transaction processing by a front-end entity using the provisioned payment credentials (e.g. a payment token). Subsequent to or in conjunction with such front-end processing, the provisioned payment credentials are translated to the true value in the wallet vault, i.e., the customer's real credentials in the back-end.

FIG. 1 illustrates aspects of the system and processing of the invention. Specifically, FIG. 1 is a block diagram showing the components of a financial processing system 10 and the flow of information between such components, in accordance with one embodiment of the invention. In particular, FIG. 1 shows aspects of a transaction processed using the wallet vault in accordance with one embodiment of the invention.

The financial processing system 10 of FIG. 1 includes an issuer bank 100 as well as other issuer banks 100'. The system 10 also includes a merchant 210, a wallet 200, and a merchant acquirer 300. The wallet 200 may be associated with the merchant 210. The merchant acquirer 300, in this example, is affiliated with the merchant 210 in such manner that the merchant acquirer 300 processes credit card payments and/or debit card payments, for example, for products or services for the merchant. Is appreciated that various of the processing performed by the issuer bank 100, as depicted in FIG. 1, might instead be performed by non-banking entities. Such non-banking entities might include a gift card provider, or some other entity managing a point system of some type.

The system 10 also includes wallet vault 110 and an interim payment processing entity (PPE) 120. Further details of the wallet vault 110 and the interim PPE 120 are described in detail below.

As shown in FIG. 1, a payment network 400 may provide communication between the various components of the system 10. However, communication may be provided in any suitable manner or over any suitable network, such as the Internet or other network.

The merchant 210 may be provided with suitable communication interfaces so as to communicate both with the customer and the payment network 400. As shown, for example, the merchant 210 may be provided with a mobile commerce interface 212. Such interface 212 allows the merchant 210 to interface with a customer's smartphone, in accordance with one embodiment of the invention.

The processing of FIG. 1 is initiated by a customer deciding that he or she wants to enroll in an online wallet 200. The customer then goes to a suitable website supporting the wallet 200 and interfaces with such website (supporting the wallet 200) to provide the requisite information, including various personal information including the customer's credentials, for example. Using the credentials (provided by the customer), the wallet 200 then interfaces with the wallet vault 110 and/or the issuer bank 100 to enroll the customer in the wallet 200. In particular, through the wallet 200 interfacing with the wallet vault 110 and/or the issuer bank the customer is presented with the possible payment products (e.g. credit card account, debit card account, stored value card account, charge account and/or transaction account) available to fund the particular wallet 200. The customer then selects one or more payment products, i.e., payment mechanisms, (in the wallet vault 110) she wishes to enable the wallet 200, and those payment products are then "provisioned" to the wallet 200. In particular, the wallet vault 110 assigns provisioned payment credentials for the customer to the wallet 200. For example, such might include the wallet vault 110 assigning a token which is constituted by a 16 digit PAN (in the form of a credit card number). The customer is thus enrolled in the wallet 200, with the wallet 200 having a token to be used by the customer to performs transactions. Hand in hand, the wallet vault 110 maintains the token and associates the token with the real credentials of the customer, i.e., such that the token may be mapped to the real credentials of the customer. It is appreciated that the wallet vault 110 may support multiple wallets 200, and not just the single wallet as described above. In embodiments described herein, a wallet is described as being associated with a particular merchant. However, it is appreciated that a wallet need not be associated with a particular merchant. A wallet may be associated with a group of merchants or some other entity or collection of entities. Accordingly, a wallet may be associated with a non-merchant entity or a collection of non-merchant entities. For example, a wallet may be associated with a third-party, which is in turn associated with some predetermined group of merchants or non-merchants, for example.

In operation subsequent to enrollment, in a typical scenario, the customer is shopping and identifies a merchant that accepts payment from the particular wallet 200. For example, the customer may go to AMAZON.COM and select the various items she wishes to buy. At checkout, the customer clicks on a suitable icon indicating she wishes to check out using the wallet 200. At that point in the processing, the customer is presented (in conjunction with some suitable authentication of the customer) with the payment products that are available for the wallet 200. That is, these available payment products are the particular payment products that were previously provisioned to the wallet 200 (from the wallet vault 110). The customer then selects (step 2 of FIG. 1) the particular payment product that she would like to use. For example, this might be performed by presenting the customer with icons in a suitable GUI (graphical user interface) window that reflects the various payment products of the customer in the wallet vault 110, and inputting the particular icon that the customer selects—to select the particular payment product. The wallet 200 may then seek confirmation that the customer is aware of the requested transaction and approves of the requested transaction. As shown in FIG. 1, in accordance with one embodiment of the invention, the wallet may send a communication such as a telephone call, to the customer's smartphone (step 3 of FIG. 1). The wallet vendor waits for confirmation back from the customer's smartphone 52. Upon receiving such confirmation, the wallet 200 proceeds with processing the transaction. Specifically, the wallet 200 sends payment information to the merchant to proceed with the transaction. That is, in accordance with one embodiment of the invention, a token number and a merchant transaction reference number (along with other information indicative of the payment product selected) is then encrypted and sent from the wallet 200 to the merchant 210 (step 4 of FIG. 1). In general, it is appreciated that authentication of the customer may be performed at any point in the processing as described herein, as desired.

Thereafter, the token (transaction token and/or account token) and merchant transaction reference number is sent from the merchant to a merchant acquirer (step 5 of FIG. 1), as shown in FIG. 1. Based on the information in the transaction information processed by the merchant acquirer 300, the token as well as the merchant transaction reference number or order number, for example, are then sent to the interim payment processing entity (PPE) 120. For example, the interim PPE 120 might effectively act (from the perspective of the merchant acquirer 300) as the issuer bank. However, in this embodiment, the interim PPE 120 is disposed in front of (from a processing perspective) of the ultimate issuer bank 100. For example, the interim PPE 120 might be a financial entity such as "CHASE Paymentech," for example, which sits in front of the ultimate issuer bank JPMorgan CHASE Bank, NA.

Upon receiving the token and merchant transaction reference number from the merchant acquirer 300, the interim PPE 120 then communicates with the wallet vault 110 to provide the token, and in return, the wallet vault 110 provides the "real credentials" of the customer, i.e., the actual credentials for the payment product of the customer—that the customer selected to support the wallet payment (step 6 of FIG. 1).

In this embodiment, the interim PPE 120 then communicates with the issuer bank 100, over a predetermined payment network 400, to secure authorization for the requested transaction. For example, the issuer bank 100 confirms that the customer's account is in good standing and that the balance of the account is sufficient to fund the requested transaction, for example. Assuming that everything is in order to authorize the transaction, the issuer bank 100 forwards authorization to the interim PPE 120 (step 7 of FIG. 1).

Upon receiving authorization for the requested transaction, the interim PPE 120 forwards such authorization to the merchant acquirer 300. Then, upon receiving the authorization from the interim PPE 120, the merchant acquirer 300 associates such authorization with the transaction information disposed in the merchant acquirer 300. The merchant acquirer 300 then forwards such authorization back to the merchant 210. Thereafter, the transaction is completed with the customer, and the customer is provided confirmation of her purchase. For example, the customer is provided an appropriate receipt.

Thereafter, settlement of the transaction may occur in due course. For example, settlement of the transaction might occur effectively in "real time." Alternatively, the merchant 210 might settle transactions in a batch manner. For example, the merchant 210 might settle all transactions at the end of the day. In accordance with one embodiment of the invention, settlement may include submitting all approved transactions to the merchant acquirer 300. Thereafter, the merchant acquirer 300 in turn submits the approved transactions to the interim PPE 120. The interim PPE 120 then converts each token and merchant transaction reference number (for each approved transaction) to the real credentials for the particular customer. In one embodiment, such conversion is performed with the wallet vault 110 making the association between each token/merchant transaction reference number vis-à-vis the real credentials/merchant transaction reference number for each transaction. Alternatively, the interim PPE 120 (based on the prior processing performed in conjunction with the authorization of the particular transaction) might retain sufficient information to make such association. Accordingly, once the interim PPE 120 secures the real credentials and merchant transaction reference number for a particular transaction, the interim PPE 120 then communicates with the issuer bank 100 to complete such settlement. Upon completion of settlement of the transaction, processing is completed.

Relatedly, it is appreciated that settlement of the transaction may or may not be preceded by authorization of the transaction. That is, it is appreciated that the system supports processing which might be characterized as "forced posting" or other similar processing. This is a situation in which the merchant sends in an adjustment or charge, for example, without first authorizing them. As a result, such adjustment or charge, for example, is aggregated into a suitable settlement file without any prior authorization. Similarly, such processing may also occur in the situation of a return, a refund, a credit, or a recurring payments, for example. Such processing may also effectively occur when authorization has indeed been performed, such as by VISA, but that authorization is not present in a particular performing the settlement processing. For example, if the system performing the settlement processing has not gotten the particular update from VISA. Such processing may be controlled by suitable rules and/or protocols imposed by the interested financial entities.

Accordingly, the wallet vault 110 stores payment credentials of the customer (associated with the customer's respective payment products) in a secure fashion, while allowing for multiple wallets 200 to interact with the wallet vault 110. Accordingly, a requested transaction is performed on the front end, using a particular wallet 200 with a respective assigned token, while maintaining the credentials of the customer's payment products (i.e., the real credentials) secure on the back end.

The invention is not limited to online transactions. The invention may well be utilized to perform transactions in other technologies and/or other environments such as mobile processing (e.g. using a smartphone), interfacing with kiosk, interfacing with a gas pump, interfacing with an airline terminal, interfacing with a train terminal, interfacing with some other type of ticket machine, interfacing with a vending machine, interfacing with some other dispensing unit, transactions performed in a physical store, and/or some combination thereof, for example.

Figure 2:
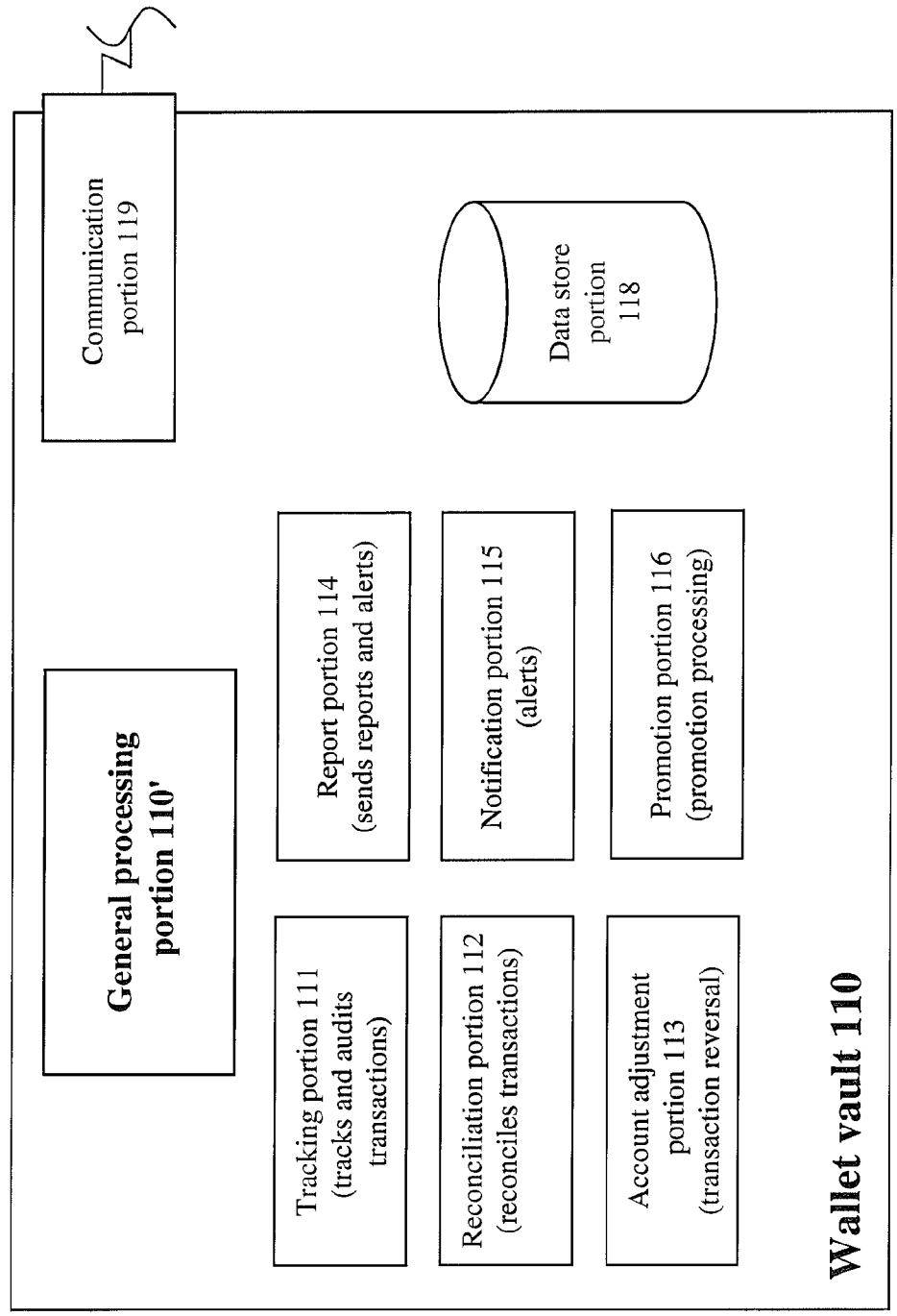
FIG. 2 is a block diagram showing further details of the wallet vault, in accordance with one embodiment of the invention.

FIG. 2 is a block diagram showing further details of the wallet vault 110 in accordance with one embodiment of the invention. The wallet vault 110 may provide a variety of functionality in conjunction with the various transactions the wallet vault 110 processes. Accordingly, FIG. 2 illustrates the various respective processing portions that specifically handle the processing associated with such functionality. In general, processing not described below as being performed by one of the specialized processing portions may be performed by the wallet vault 110 in general, i.e. by the general processing portion 110'.

As shown, the wallet vault 110 includes the general processing portion 110', as described above. Further, the wallet vault 110 includes a tracking portion 111, a reconciliation portion 112, an account adjustment portion 113, a report portion 114, a notification (i.e. alerts) portion 115 and a promotion portion 116.

The tracking portion 111 tracks and audits transactions that are processed by the wallet vault 110, and the reconciliation portion 112 performs various processing in conjunction with the reconciliation of transactions processed by the wallet vault 110. The account adjustment portion 113 performs various processing related to transaction reversal. For example, such a transaction reversal might be in the form of a refund to a customer. The report portion 114 generates and sends a variety of reports to the customer, the merchant, the issuer bank, or to some other entity. The notification portion 115 sends notifications and/or alerts to the customer or other entity. The promotion portion 116 handles various processing related to promotions. For example, the promotion portion 116 handles processing related to coupons, rewards points, gift cards, for example.

In general, it is appreciated that the tracking portion 111 may track a wide variety of attributes of a transaction. The tracking portion may of course track transaction amount, transaction date, the merchant, and other basic transaction attributes. Further, the tracking portion may input and store various other attributes associated with the transaction, such as the particular device that was used for a transaction, the GPS location of the transaction, and other attributes. It is appreciated that transaction reversals, as described in detail below, may in particular utilize such further attributes. For example, the GPS location at which a transaction was effected may be helpful in reminding a customer regarding the particulars of a transaction.

The wallet vault 110 also includes a data store portion 118. The data store portion 118 stores the various data used by the wallet vault 110 or generated by the wallet vault 110, for example. Further, the wallet vault 110 includes a communication portion 119. The communication portion 119 provides for the various communications between the wallet vault 110 and other processing components, as described herein.

Figure 3:
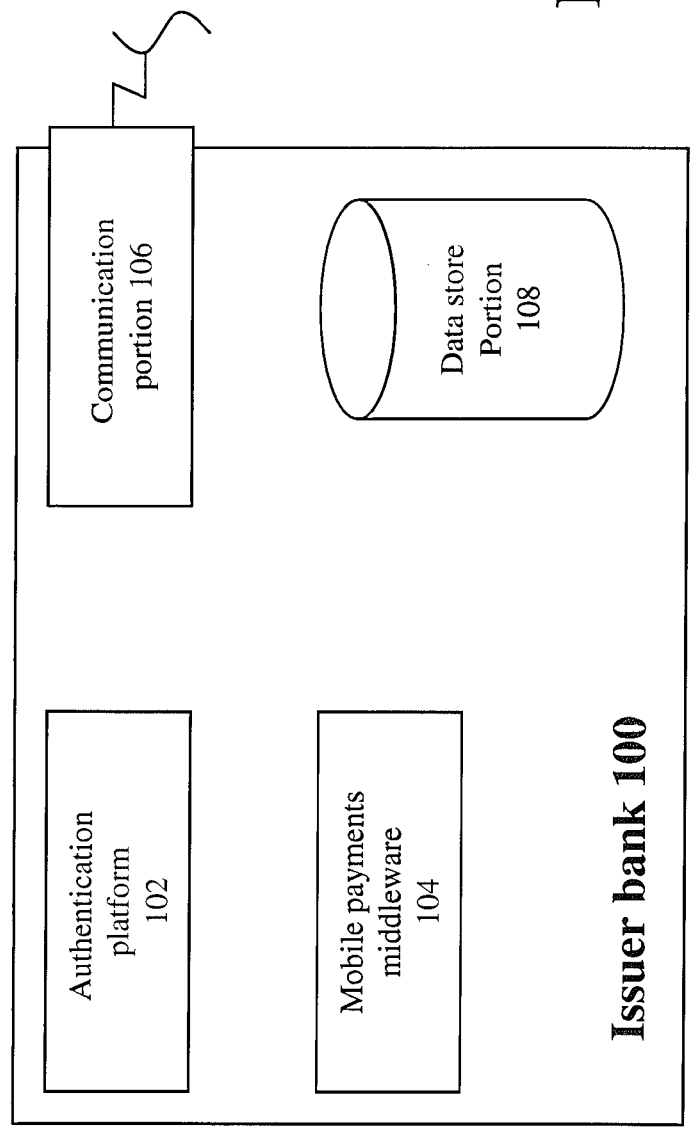
FIG. 3 is a block diagram showing details of the issuer bank, in accordance with one embodiment of the invention.

FIG. 3 is a block diagram showing details of the issuer bank 100 in accordance with one embodiment of the invention. The issuer bank 100 includes various processing components. As shown, the issuer bank 100 includes an authentication platform 102, a mobile payments middleware processor 104, a communication portion 106, and a data store portion 108. The authentication platform 102 performs various processing as described herein related to authentication and authorization of transactions. For example, the authentication platform 102 inputs a requested transaction and confirms that the account associated with that transaction is in good standing and has sufficient funds for the transaction. For example, such processing might include confirming that the customer has sufficient balance in her account, that the credit limit in the account is sufficient to fund the transaction, that there is some other mechanism in place to fund the transaction in some manner, and processing to insure that the processing is not fraudulent. The mobile payments middleware 104 affords various functionality to enable communication between the issuer bank 100 and mobile payments related processing components. The communication portion 106 provides for the various communications between the issuer bank 100 and other processing components, as described herein. The data store portion 108 stores the various data used by the issuer bank 100 or generated by the issuer bank 100, for example.

The general processing portion 110' of the wallet vault 110 performs general processing in operation of the wallet vault 110. For example, the processing portion 110' may monitor incoming transactions and perform the association between a token in such incoming transaction data with the particular real credentials of the customer's account. Relatedly, the processing portion 110' may determine the particular payment product, of the customer, that should be utilized to satisfy a requested transaction. For example, a customer may have multiple cards stored in the wallet vault 110. The processing portion 110' determines which one of those cards should be utilized to satisfy the particular transaction. A suitable set of rules may be utilized to perform such decisioning. For example, the rules may specify that a default credit card should be utilized absent other rules being satisfied. For example, it might be the case that the default card is utilized absent the transaction amount being above a certain threshold, in which case a different card would be utilized. Also, the rules might be based on what device is utilized to effect the transaction. For example, both a husband's cell phone and a wife's cell phone might both be associated with a plurality of payment products in the wallet vault 110. The particular payment product utilized may depend on the particulars of the transaction and/or what device is utilized to effect the transaction. As generally described below, it is of course appreciated that such functionality is not limited to the environment of a cell phone. Various other user devices may be utilized in conjunction with such functionality.

The wallet vault 110 further includes the tracking portion 111. as described above, the tracking portion 111 tracks a wide variety of information associated with the processing performed by the wallet vault 110. For example, the tracking portion 111 keeps track of tokens and merchant transaction reference numbers (used to track transactions) that are input from the interim PPE 120. Relatedly, the tracking portion 111 tracks the real credentials that are associated with each input token. Information associated with such processing, in addition to tracking what token was associated with which real credentials and associated merchant transaction reference number information, might include date information, time information, amount information, merchant information, physical store information and/or any other particulars of the transaction, for example. In summary, the tracking portion 111 may track all information input to the system, all information output from the system, and track particulars of the processing performed within the wallet vault 110 with such information. Further, the tracking portion 111 may perform various mapping of information. In particular, for example, upon a particular transaction coming into the wallet vault 110, the tracking portion 111 maps that particular transaction to the account in the wallet vault to which it is associated, and maintains a history of that mapping.

The tracking portion 111 may also perform various fraud preventative related processing, in accordance with one embodiment of the invention. For example, the tracking portion may, to the extent possible based on available information, keep track of devices that the customer has used to effect her transactions. More specifically, the tracking portion 111 might simply keep track of such devices utilized—for later review, i.e., the tracking portion 111 may keep a history of all of the devices that were used in transactions by a particular customer. On the other hand, or in addition to, the tracking portion might be imposed in the authorization of a transaction, so as to require a particular device to be used. For example, a customer might be provided the ability to set a preference such that the wallet vault 110 will require the use of her smartphone in the processing of any transaction. It is of course appreciated that a single or multiple number of devices might be included in the customer's preferences. For example, the customer might require that either her smartphone, web device, PDA, or computer be utilized in any transaction.

The tracking portion may also perform processing so as to allow contextual data to be associated with a transaction, and maintained with the transaction data, in the wallet vault 110. For example, such contextual data might include receipt data that the merchant wishes to append to the transaction data i.e., receipt data in addition to that required for authorization and settlement of the transaction. Other contextual data that might be appended to transaction data might include particulars of the item purchased. For example, SKU data might be appended to the transaction data if desired by the merchant, customer or other entity. Other contextual data might include indicia reflecting the particular device used by the customer to effect the transaction. In general, any metadata associated with the transaction may be appended to the transaction and stored in the wallet vault 110, as desired.

The wallet vault 110 also includes a reconciliation portion 112. The reconciliation portion 112 works in conjunction with the tracking portion 111 to enable reconciliation of the various processing performed by the wallet vault 110. It is appreciated that various reconciliation processing may be performed in an automated manner. For example, automated processing might be utilized when settlement of a particular transaction did not occur on a day as expected. The reconciliation portion 112, in such situation, might then look to the following day so as to reconcile authorization of a transaction vis-à-vis settlement of the transaction, for example. Alternatively, the reconciliation portion 112 may determine that aspects of reconciliation might not be performed automatically. In such a situation, the reconciliation portion 112 presents the information, via a suitable interface, to a human operator. The human operator, in conjunction with reviewing appropriate materials, might then resolve any problems in the reconciliation processing.

In general, it is appreciated that authorization of a transaction, settlement of a transaction, and other actions may occur outside of traditional payment networks. Accordingly, such processing and related communications may be performed in the environment of a closed loop system and/or using internal processing. Thus, in accordance with one embodiment of the invention, the communication supporting such action may not go over the traditional payment networks or other public network.

The wallet vault 110 also includes an account adjustment portion 113. The account adjustment portion 113 performs processing to handle an adjustment to a transaction, such as a reversal of funds subsequent to a transaction being authorized and settle. For example, such a reversal of funds might include a card refund or an adjustment of a credit balance, i.e., the customer's account is credited. A card refund might occur in the situation where previously debited funds are returned to the customer's card. Such a card refund may be initiated by the merchant. For example, a card refund might occur in the situation where an item is returned to the merchant, and the funds are accordingly put back into the customer's account. The account adjustment portion 113 processing may be performed in conjunction with utilizing processing of the tracking portion 111. For example, the account adjustment portion 113 may input a card refund request from a merchant and utilize the mapping capabilities of the tracking portion 111 so as to refund the funds to the customer's card.

The account adjustment portion 113 might also perform other adjustments to a transaction. For example, the account adjustment portion 113 might handle the cancellation of a transaction after the particular transaction has been authorized, but before the particular transaction is settled. Further, the account adjustment portion 113 may perform processing to handle the situation of a "card charge back". This might occur in the situation where goods or services are not acceptable to the customer and, as a result, it is appropriate to return debited funds to the customer's card. For example, it might be the situation that an item was not received or a service was not performed.

Various functionality may be provided related to account adjustments, i.e., refunds or charge backs, for example. For example, a particular account adjustment might be in the form of a reversal of the transaction or a store credit. It is appreciated that some attribute of a particular transaction is needed in order to find the particular transaction in the wallet vault 110 and/or the merchant's system. For example, a receipt number might be utilized so as to find the transaction. In accordance with one embodiment of the invention, the receipt number might be input by the wallet vault 110 and a requested account adjustment initiated. The wallet vault 110 will then perform processing to unwind the transaction so as to make the customer whole. Such an account adjustment performed by the wallet vault 110 might utilize other information as an alternative, or in addition to, the receipt number. For example, it might be the case that multiple items were purchased. In this example, the receipt number of the transaction, as well as the SKU data of the particular items purchased could be utilized. The wallet vault 110 might effect processing to perform an account adjustment to reflect the return of the single item, while maintaining the funds transfer for the remaining items.

In general, it is appreciated that the wallet vault 110 may maintain data regarding any attribute of a processed transaction, and apply processing functionality to such maintained data. Accordingly, the wallet vault 110 might maintain data associated with a transaction including merchant, items purchased, rewards points utilized, coupons utilized, gift cards utilized, other promotions, and other attributes of a transaction. As a result, the wallet vault 110 may dissect a particular transaction so as to perform processing on the transaction in some desired manner. For example, it might be the situation that a single sales entity (e.g. a travel agency) coordinated purchase of each of the customer's hotel room, rental car, and dinner reservation. The wallet vault 110 may be provided with the ability to dissect such purchase so as to perform desired processing, such as the refund of the dinner reservation, while maintaining the hotel room and rental car transaction. Such processing may include the unwinding of the transaction as to only the dinner reservation in some allocated manner.

In general, it is appreciated that the wallet vault 110 may retain various attributes of a particular transaction and perform processing based on those attributes. In the example above, the wallet vault retained attributes of a collective transaction for a hotel room, a rental car and a dinner reservation. As a result, the wallet vault 110 possesses the ability to dissect and unwind any one portion of such transaction. Illustratively, the wallet vault may retain attributes representative of each leg of a customer's flight on an airplane, including any promotions utilized in the purchase of such flights. As a result, the wallet vault provides the capability to dissect such collective transaction and perform processing on the dissected pieces of the transaction. For example, if the customer opts to not take the last leg of the flight, then the wallet vault may coordinate the refund for only that leg of the flight.

Relatedly, it is appreciated that the wallet vault 110 may provide processing capability to the customer over a number of merchants and other providers of wallets. Accordingly, although the particular wallet 200 of the particular merchant may not provide desired processing capability, the wallet vault 110 may indeed provide such processing capability. Accordingly, the wallet vault 110 may augment and/or complement processing capability provided by a particular wallet 200.

The wallet vault 110 also includes an report portion 114. The report portion 114 monitors the various processing performed in the wallet vault 110 and generates reports based on an observed event taking place or in some predetermined manner. In particular, the report portion 114 may perform rule based processing such that when certain rules are satisfied, then a predetermined, associated communication is generated and sent. Other processing may also be performed in conjunction with the observation of a particular rule.

Illustratively, the report portion 114 may generate and output reports in a routine manner, such as daily, weekly, or monthly, for example. Such reports might be generated and output to the customer, respective merchants, the merchant acquirers, the interim PPE 120, the issuer bank 100, and/or any other entity. For example, such report might show the flow of a transaction or transactions from the perspective of a particular entity. The reporting could take various forms as desired. For example, the reporting might be online, mobile, or mailed reporting.

The report portion 114 may generate and provide any of a variety of financial reporting. For example, financial reporting may include information regarding paying basis points to a wallet provider, information regarding interchange relief attributed to a particular party in the transaction, and/or financial information in general regarding any particular party, for example.

The wallet vault 110 may also include a notification portion 115. The notification portion 115 may be provided to send various notifications, i.e. alerts, to the customer or other entity upon a certain action being observed. For example, notifications may be generated and output based on a suitable rule set. For example, the notification portion 115 may generate an alert if a different user device is utilized, in contrast to that which is expected. For example, the notification portion 115 might generate an alert to the customer if it identifies that a different smartphone (or other user device) is used in a transaction that is associated with an account of the customer. The notification portion 115 might interface with the customer such that the customer may be required to approve of the transaction using the new device. If the customer fails to approve of the particular transaction (using a different device), the notification portion 115 might trigger a refusal of the transaction and send a communication to the customer, indicating that the particular transaction has been refused.

It is appreciated that various processing is described herein in the context of a smartphone or other user device. However, it is appreciated that such processing is not limited to the particular device described. Rather, any suitable user device may be used to perform the described processing. Accordingly, processing described in the context of a smartphone or other user device, might also be utilized in the context of any other phone with processing capabilities, a PDA (personal digital assistant), an iphone by APPLE, an ipad by APPLE, a smart watch, an MP3 player, a mobile device, a cellular phone (cell phone), laptop computer, desktop computer, tablet computer, any other type of computer, or any other user device that is suitable for the processing described herein. It is further appreciated that such user devices may be disposed in any of a wide variety of environments such as a house, car, office, or any other environment. Further, it is not needed that a single user device be utilized for the processing described herein. Rather, multiple user devices may be utilized in some collective manner.

It is appreciated that functionality described herein as constituted by one communication may instead be constituted by multiple communications in some collective manner. For example, particular data described herein is provided by a single communication might instead be provided by multiple communications. On the other hand, communications described herein as provided by multiple communications, might instead be provided by a single communication.

In general, the notification portion 115 may perform processing to advise the customer regarding the status of transactions, as well as other related information. Such related information might include the availability of coupons, rewards points, and gift cards, as described further below.

Regarding the status of transactions, the notification portion 115 may perform a variety of processing. The notification portion 115 monitors the various processing performed in the wallet vault 110 and generates notifications, i.e. alerts, based on an observed event taking place. In particular, the notification portion 115 may perform rule based processing such that when certain rules are satisfied, then a predetermined, associated communication is generated and sent. For example, the notification portion 115 might communicate with the customer during a transaction so as to raise the customer's comfort level in performing the transaction using the wallet vault 110. For example, a customer might be effecting a transaction using either her computer or a mobile device. The notification portion 115 might push communications to the customer either during or after the transaction. For example, it may be desirable for the customer to review the transaction before the purchase is finalized. Accordingly, the report portion could present details of the transaction to the customer, via her mobile device, prior to authorizing the transaction. This communication to the customer might be interjected into the authorization, either before or after authorization is secured from the issuer bank 100. For example, if the communication to the customer is output after authorization by the issuer bank 100, the communication to the customer might read such as "Your current transaction at Starbucks has been approved—do you wish to continue?". In one embodiment, the system may generate a reporting communication, such as a reporting e-mail, so that the customer may keep track of her transactions.

It is appreciated the transactions may be tagged in any suitable manner to reflect associated information. For example, the transaction might be tagged to reflect the manner in which the transaction is categorized in the payment system, or tagged to reflect particular processing that the transaction data has undergone.

The notification portion 115 may generate and push a communication to the customer after a transaction is completed, so as to instill confidence in the customer that the transaction was completed as anticipated by the customer. Hand-in-hand, the report portion might also provide feedback to the particular merchant to advise them of the disposition of a transaction being performed and confirm that a transaction was performed as anticipated.

In general, it is appreciated that a wide variety of communications may be sent to and input from the customer at various steps in the transaction. Some communications output to the customer may require a response from the customer in order to further advance the transaction. On the other hand, some communications out to the customer may not require a response back from the customer, such as informational communications. For example, a communication might be output to the customer before a transaction is finalized, so as to confirm the particular transaction. In this case, it may be that a response is indeed required from the customer or the transaction will not be advanced.

Relatedly, it is appreciated that communications to and from the customer may utilize different communication channels. For example, the transaction may be effected on a first channel and confirmation of the transaction be pushed out (with response received back from the customer) on a different channel. Such would provide an effective and secure way to confirm that it is indeed the customer effecting the transaction and that the customer authorizes the transaction. For example, the customer might be effecting a transaction through a website and the wallet contact the customer via phone call, so as to confirm the transaction. Various of the processing described herein are described in the context of the customer interfacing with a system through a suitable website, or some other interface. It is of course appreciated that such interface, as described, may be performed through any suitable interface, user device, kiosk, physical bank branch with the customer interfacing with a human bank teller, and/or any other suitable interface.

Further, what might be characterized as "interjecting" processing may be utilized in conjunction with the various transaction processing described herein. In interjecting processing, items are interjected into the authorization sequence or interface that is presented to the customer. The particular items that are interjected might be directly related to the transaction or may not be directly related to the transaction. Such interjecting processing may utilize a suitable set of rules to trigger the interjection of a particular item. In one example, if a dollar amount of a purchase exceeds a particular threshold, then certain content may be interjected into the stream of the transaction or other processing in some manner triggered. On the other hand, interjecting processing might relate to the interjection of advertising items into the transaction sequence. For example, if the system identifies that the purchase relates to a particular type of item, then related advertising items might be interjected into the transaction sequence in some appropriate and suitable manner.

It is appreciated that the report portion 114 may present transactions of a customer in some aggregated manner. For example, the report portion 114, via webpage for example, might present all transactions of the customer on a given day. The report portion 114 may present all transactions of the customer for a particular merchant. The report portion 114 may aggregate and present transaction information in any manner as desired. For example, the report portion 114 might present transactions aggregated based on usage of coupons, rewards points, or gift cards.

The wallet vault 110 also includes a promotion portion 116. The promotion portion 116 performs various processing related to promotions, such as coupons. For example, the promotion portion 116 (in the wallet vault 110) may maintain an inventory of coupons that are available to a particular customer. Accordingly, the promotion portion 116 may input coupon information from respective merchants, for example. Such coupon information is then presented to the customer in some suitable manner. For example, the coupon may be presented to the customer via output to the customer's smartphone. In accordance with one embodiment of the invention, a particular code may be associated with the coupon. Such code might be communicated to the merchant in conjunction with a transaction, and thereafter communicated through the merchant acquirer to the interim PPE 120, and thereafter to the wallet vault 110. The wallet vault 110 then associates the particular coupon code with information—dictating the particular offer associated with the coupon code.

It is appreciated that the features described herein may be used in conjunction with various other technology. The features described herein may be used in conjunction with the features described in U.S. Pat. No. 7,949,579 issued May 24, 2011 directed to "System and method for associating financial transaction data with a user's project data", which is incorporated herein by reference in its entirety.

It is appreciated that processing of coupons, as well as other promotional items, may be segregated in some manner. To explain, for example, a customer may be afforded a coupon on a personal (nonwork) basis. Accordingly, even though the customer may be able to use the coupon, the customer may not want to use that coupon for a work related purchase, i.e., one in which the customer hopes to be reimbursed in some manner, for example. Accordingly functionality may be provided to demarcate which coupons are pushed to a customer in which manner. Various other segregated processing may be provided depending on the particular circumstances the customer is coming into the system (e.g. a wallet) to effect a transaction.

In general, the promotion portion 116 might input coupon offers from merchants and disseminate those coupon offers to customers in some predetermined manner. Hand-in-hand, the promotion portion 116 might present those coupon offers to the receiving customers in some predetermined manner. For example, the promotion portion 116 might periodically output an e-mail or other communication to the customer, so as to alert him or her of available coupons. Also, the promotion portion 116 might present the coupons available to a customer via webpage. Further, the promotion portion 116 includes functionality to automatically alert a customer as to the possible use of a coupon. For example, coupon information might be stored in the wallet vault 110 indicating a particular store coupon that is available to the customer for a predetermined period of time. Upon a requested transaction coming into the wallet vault, for a purchase at that particular store, the wallet vault may generate and output a communication to the customer indicating that such coupon is available for her use. The customer might then select the option to use that coupon.

In general, it is appreciated that the manipulation of a token and/or multiple tokens may be varied as desired. For example, a single token may represent or be associated with a payment credential, coupons associated with the transaction, gift cards associated with the transaction, or other attributes or items associated with the transaction. Alternatively, multiple tokens might be utilized that are associated in some suitable manner. For example, such multiple tokens might be associated using a further token.

Processing performed by the promotion portion 116 is not limited to coupons. The promotion portion 116 may also perform processing related to both gift cards and rewards points, for example. For example, the wallet vault 110 may maintain a rewards points program that is incremented and decremented in some predetermined manner, as desired. For example, all transactions processed by the wallet vault 110 may respectively result in additional reward points being attributed to the particular customer's account, or wallet, or wallet vault, for example. The rewards points may then be taken down by the customer, such as in conjunction with the purchase of an item. It is appreciated that the wallet vault 110 may maintain not only its own reward points, but also may maintain reward points for other entities. For example, rather than a particular merchant maintaining a rewards point program utilizing a wallet 200, the merchant might effectively "outsource" maintenance of their own unique rewards point program to the wallet vault 110. Accordingly, the wallet vault 110 would track rewards points associated with that particular wallet 200. Accordingly, a rewards points program for a wallet 200 (maintained by the wallet vault 110) may be fully separate from a rewards points program maintained by the wallet vault 110. Alternatively, there might be some relationship between such reward points programs.

The wallet vault 110 may also maintain gift card information. For example, it might be the situation that a particular gift card is usable at only a particular merchant or at a particular merchant location. The wallet vault 110 maps that gift card to any transactions originating from that particular merchant. Upon identifying such transaction, the wallet vault 110 alerts the customer that the gift card might be utilized. The customer might then opt to use the gift card or defer use for another purchase, at some later time. In general, it is appreciated that the usability of a wallet, wallet vault, coupon, or gift card, for example, at a particular merchant or a particular merchant location may be conveyed to the customer in some suitable manner.

Accordingly, it is appreciated that the wallet vault 110 might keep inventory of coupons, rewards points, gift cards, and other promotion products associated with a customer. The wallet vault 110 may present such promotion products to the customer on demand such as via webpage, in some periodic manner, such as a weekly e-mail, or present such promotions to the customer upon observing an event to which the promotion is applicable. It is appreciated that rules may be utilized to control when particular promotions are utilized, the order in which promotions are utilized, and the manner in which promotions are presented to the customer, for example.

In general, it is appreciated that the wallet vault 110 may provide the ability to implement rules, including defaults, for not just one wallet 200, but across multiple wallets 200. Such rules might relate to a particular accounts to utilize in performing certain transactions and/or particular promotion items (coupon, rewards points, gift cards), for example. Such rules might be dependent on the particular customer device being utilized to effect the transaction and/or the particular merchant. Rules may be provided to be dependent on any parameter, as desired. The implementation of such rules may be performed by the general processing portion 110' of the wallet vault 110. Further, it is appreciated that some rules might be readily changed by the customer, whereas other rules are not changeable by the customer. For example, the particular order in which payment products are utilized might be changed by the customer using a suitable interface between the wallet vault 110 and the customer device. In essence, the wallet vault 110 may provide the customer with the ability to "program" various attributes associated with his or her transaction processing. For example, the customer might be provided with a card vault setting by which they might maximize the number of rewards points that the customer is either "earning" or "burning." Also, it is appreciated that some rules might be readily changed by the merchant, whereas other rules are not changeable by the merchant. Such rules supported by the merchant may include rules relating to the particular manner in which transactions are processed, or rules relating to the manipulation of particular promotion items (coupon, rewards points, gift cards), for example.

In embodiments, and as otherwise described herein, it is appreciated that the financial processing system described herein may include components that provide decisioning regarding the particular payment mechanism, i.e., method of payment (MOP), that is used to process a requested transaction, as well as the particular manner in which a transaction is routed across a network or networks. For example, in interfacing with the financial processing system to effect a transaction, the particular payment mechanism used to perform the transaction might be determined by a processing component, rather than the customer. For example, a customer may have set up her wallet such that the wallet decides whether to perform the transaction using the customer's debit card account, credit card account, or other payment credential. Such decisioning might be based on funds balance in such respective accounts, i.e. if the debit card account is below a particular balance, then the wallet performs the transaction using the credit card account. It is appreciated that the wallet may be provided to make determinations (such as payment credential decisioning and/or payment routing decisioning, for example) based on various factors and/or combination of factors, as desired. Such factors might include customer preference, merchant preference, the particular payment credential that is accepted at the particular merchant, location, or other factor (or combination of factors) present at the time of purchase, for example. Accordingly, the wallet may operate in a dynamic manner based on a set of rules, for example. In particular, the wallet may perform decisioning to select one out of a plurality of payment credentials disposed in the customer's wallet. The customer might interface with the wallet—so as to convey to the wallet that she wishes the wallet to make such decisioning. In addition to decisioning regarding the particular payment mechanism to use, as noted above, a processing component may also perform decisioning as to the manner in which a payment request is routed so as to perform authorization for the transaction and/or settlement of the transaction, for example. It is appreciated, as noted above, that such decisioning of payment mechanism and/or payment routing is not limited to being performed by a wallet. Rather other processing components in the financial processing system may also perform such decisioning either acting alone or acting collectively in some manner.

In embodiments, the system may provide what might be characterized as an "override function." To explain, it may be the case that there may be a problem in processing a token, such as a problem in converting a token to a clear PAN. In such situation, the wallet may interface with the customer to provide alternative processing. For example, the system may interface with the customer to request the customer to enter a credit card number/expiration date in the standard manner. In general, the system may interface with the customer to alert to the customer that the wallet processing is not working, and to guide the customer through alternative processing.

Various processing is described herein. It is appreciated that in embodiments, the system may allow a particular person or entity to impose a time out on the processing. The particular person or entity might be the customer, merchant, merchant acquirer, issuer, or some other person or entity. For example, a situation may occur in which the customer observes multiple transactions being effected in a manner that the customer does not expect. In such situation, the system may, under certain circumstances, provide for the customer to put such processing a timeout. Various indications may be provided in conjunction with such imposition of a timeout. In general, it is appreciated that controls and/or communications may be imposed on the processing described herein as desired. In one embodiment, the customer may be provided the ability to block further transactions with a particular merchant.

The wallet vault 110 may provide useful functionality in a variety of situations. For example, the wallet vault 110 may assist a customer in processing a transaction at a gas station. In a gas station purchase, a customer might typically either swipe a card or present a FOB to the reader at the gas station pump. Such card or FOB, in this example, contains the token which is output to the merchant acquirer and ultimately presented to the wallet vault 110, i.e., for the wallet vault 110 to convert to real credentials. In this example, in addition to the token being presented to the wallet vault 110 (via the particular merchant and merchant acquirer), a further communication is utilized to confirm the transaction. Specifically, a communication is generated from the customer's smartphone and transmitted to the wallet vault 110 separately from the transaction data being processed through the merchant. The wallet vault 110 then maps such two communications to each other—for purposes of comparison. Such mapping of the communications together might be performed using a suitable indicia, such as the token utilized and the device utilized. For example, a static or dynamic code might be presented to the customer at the gas station (or any other point of sale). The customer is asked to scan or otherwise input such code into her smartphone for communication to the wallet vault 110. Hand-in-hand, a matching code is transmitted to the wallet vault via the merchant and merchant acquirer. At the wallet vault, such two transmitted codes are compared to determine whether a match is observed. If a match is observed, then the transaction is put through for authorization. On the other hand, if a match is not observed, then the transaction might be declined or further confirmation might be required of the customer to complete the transaction. Such processing is not limited to comparison of such a presented code. Rather, any suitable reference number, parameter, or other indicia, may be separately transmitted and compared in the background, i.e. at the wallet vault 110, so as to confirm the legitimacy of the transaction. For example, a phrase might be generated at the point of sale, and the customer requested to output such phrase to the wallet vault 110. Accordingly, confirmation may be secured that the legitimate customer is indeed at the particular merchant, i.e., at the particular POS (point of sale). Such processing is of course not limited to a gas station. Rather, such processing may be utilized in conjunction with a transaction at any POS, as desired. Also, to further raise the comfort level of the customer performing a particular transaction, certain personalized information might be presented to the customer. For example, in response to inputting a token from a merchant, the wallet vault 110 might generate a communication via the merchant that would be presented to the customer at the POS via some suitable interface at the POS. For example, the interface at the POS might simply say "Hi Howard" so as to assure the customer that processing was being performed as expected. It is appreciated that any suitable personalized message might be displayed to the customer to attain such comfort level.

Accordingly, a personalized message would be presented to the customer at the POS. It is further appreciated that such personalized message might be integrated into further authentication for the transaction, i.e. out of band authentication might be utilized in conjunction with such personalized message.

The wallet vault 110, for example the processing portion 110', may provide a variety of further capability. For example, the wallet vault may perform the splitting or aggregation of requested transactions. For example, a single token might be presented to a merchant to satisfy a required monthly payment, for example. Upon such token being input by the wallet vault 110, the wallet vault 110, in some predetermined manner, may split the transaction so as to be collectively satisfied by multiple accounts. For example, a telephone vendor might submit a token in conjunction with a requested transaction for $100. Upon receipt by the wallet vault 110, the wallet vault 110, in the predetermined manner, splits that transaction into four parts. For example, each of four customers might have agreed to split any transaction equally. Accordingly, the wallet vault would coordinate the authorization and settlement as to each of the four customer's accounts to the amount of $25. It is appreciated that customers may be provided with the ability to break out such a transaction in any ratio as desired. For example, a parent may be allocated 50% with each of two kids allocated 25%. Relatedly, it is appreciated that various rules may be utilized to control such allocation. The wallet vault 110 may also control recurring payments in some predetermined manner.

It is appreciated that the features described herein may be used in conjunction with various other technology. The features described herein may be used in conjunction with the features described in U.S. Pat. No. 7,401,731 issued Jul. 22, 2008 directed to "Method and system for implementing a card product with multiple customized relationships" which is incorporated herein by reference in its entirety.

In accordance with further embodiments of the invention, it is appreciated that the wallet vault 110 may effectively broker transactions between different wallets of the same customer and/or wallets of different customers, for example. For example, the wallet vault may aggregate different purchases so as to secure either authorization or settlement of such purchases in a collective manner. Accordingly, the wallet vault may collectively perform authorization and/or settlement across different customers, different wallets, different merchants and/or different financial institutions. Such collective handling of transactions may be performed utilizing a suitable set of rules. For example, each of a customer's transactions might be authorized individually during the course of a day. However, the wallet vault might settle all transactions for that particular customer collectively. For example, all transactions for that particular customer might be settled at the end of any given day, in batch manner.

It is appreciated that the various processing and functionality described herein may be associated with fees incurred by the customer. For example, if multiple customers wish to split a given transaction coming into the wallet vault 110, as described above, then the customers might incur a minimal fee to perform such processing. As described herein, various processing is characterized as being performed by a merchant. It is appreciated that such processing may also be performed by other financial entities other than a per se "merchant." For example, such processing may be performed by a financial entity or support entity performing processing on behalf of a merchant.

Figure 4:
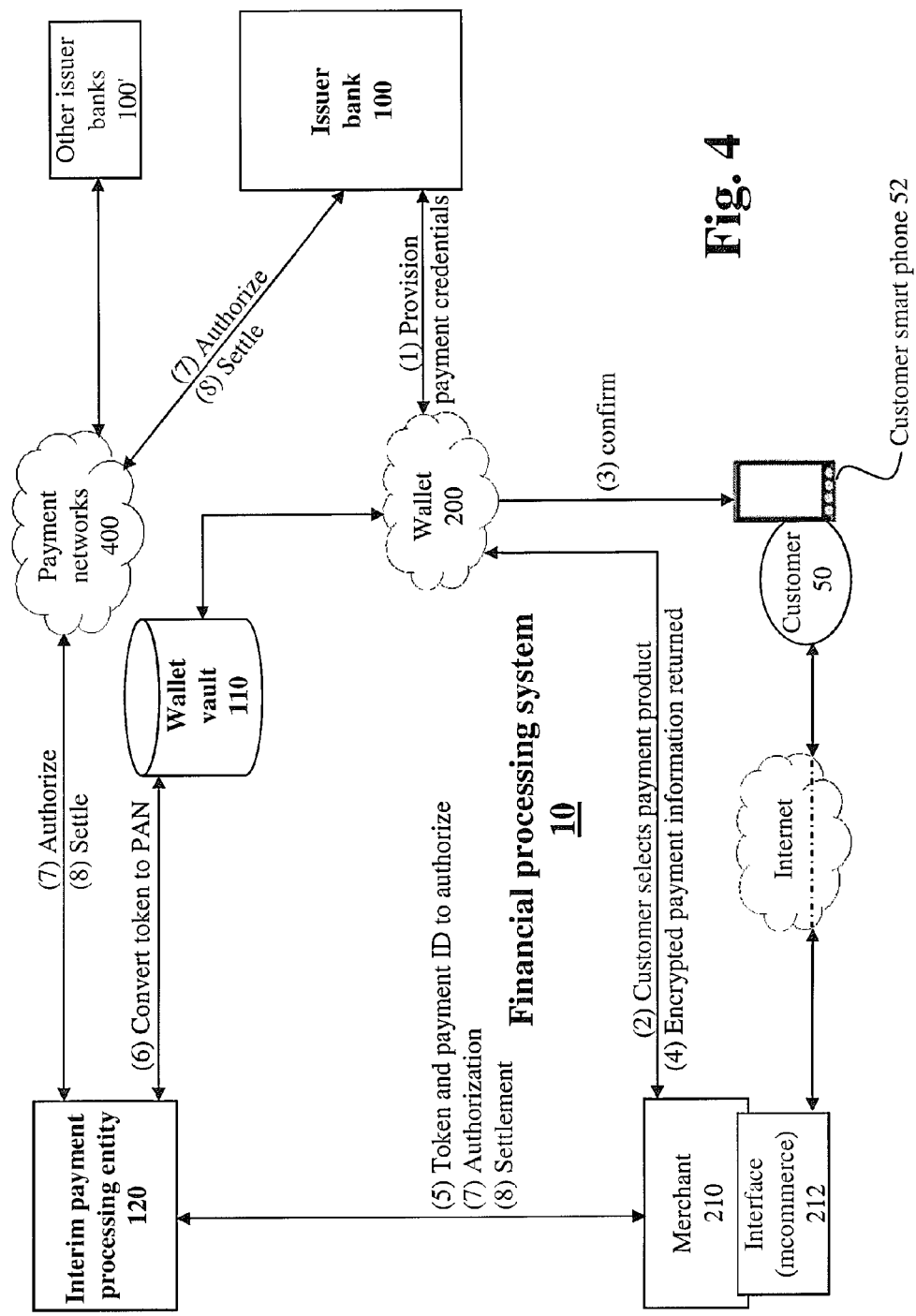
FIG. 4 is a further block diagram showing the components of a financial processing system and the flow of information between such components, in accordance with one embodiment of the invention.

FIG. 4 is a further block diagram showing the components of a financial processing system 10 and the flow of information between such components, in accordance with one embodiment of the invention. In similar manner to the processing shown in FIG. 1, in operation subsequent to enrollment and provisioning of credentials (step 1), in a typical scenario, the customer is shopping and identifies a merchant that accepts payment from the particular wallet 200. At checkout, the customer clicks on a suitable icon indicating she wishes to check out using the wallet 200, or in some other manner indicates she wishes to check out using the wallet 200. At that point in the processing, the customer is presented with the payment products that are available for the wallet 200. The customer then selects (step 2 of FIG. 4) the particular payment product that she would like to use, such as by presenting the customer with icons in a suitable GUI, as described above. The wallet 200 may then seek confirmation that the customer is aware of the requested transaction and approves of the requested transaction. As shown in FIG. 4, in accordance with one embodiment of the invention, the wallet may send a communication such as a telephone call, to the customer's smartphone (step 3 of FIG. 4). The wallet vendor waits for confirmation back from the customer's smartphone 52. Upon receiving such confirmation, the wallet 200 proceeds with processing. Specifically, the wallet 200 sends payment information to the merchant to proceed with the transaction. That is, in accordance with one embodiment of the invention, a token number and a merchant transaction reference number (along with other information indicative of the payment product selected) is then encrypted and sent from the wallet 200 to the merchant 210 (step 4 of FIG. 4).

Thereafter, the token and merchant transaction reference number is sent from the merchant directly to the interim payment processing entity (PPE) 120. That is, in this embodiment the interim PPE 120 acts as the merchant acquirer. Such arrangement is in contrast to FIG. 1 in that a further merchant acquirer is not disposed between the interim PPE 120 and the merchant 210. The particular arrangement, i.e., between the arrangement of FIG. 1 and the arrangement of FIG. 4, may depend on various factors. In particular, it is appreciated that the interim PPE 120 (which may in turn have a relationship to the issuer bank 100) may have a direct business relationship or affiliation with the merchant 210. In such situation, the interim PPE 120 acts as the merchant acquirer to the merchant 210. However, it is of course appreciated that the interim PPE 120 will not be so affiliated with all merchants. Accordingly, the arrangement of FIG. 1 will be utilized—in which the transaction information is transferred from the merchant to an affiliated merchant acquirer, and then subsequently transferred to the interim PPE 120. Relatedly, it is appreciated that a defining characteristic of the interim PPE 120 is the processing capability to input token and merchant transaction reference number information, interface with the wallet vault 110 so as to secure real credentials back from the wallet 110 (i.e., after the wallet vault 110 converts the token to the real credentials), and subsequently communicate with the issuer bank 100 so as to secure authorization for a requested transaction. Relatedly, the interim PPE 120 is provided with processing capability to subsequently settle the previously authorized transactions.

Accordingly, upon receiving the token and merchant transaction reference number from the merchant acquirer 300, the interim PPE 120 then communicates with the wallet vault 110 to provide the token, and in return (as noted above), the wallet vault 110 provides the "real credentials" of the customer, i.e., the actual payment product of the customer, that the customer selected to support the wallet payment (step 6 of FIG. 4).

The interim PPE 120 then communicates with the issuer bank 100, over a predetermined payment network 400, to secure authorization for the requested transaction. Assuming that everything is in order to authorize the transaction, the issuer bank 100 forwards authorization to the interim PPE 120 (step 7 of FIG. 4).

Upon receiving authorization for the requested transaction, the interim PPE 120 associates such authorization with the transaction information disposed in the merchant acquirer 300, i.e., such as the token and merchant transaction reference number initially received from the merchant. The merchant acquirer 300 then forwards such authorization to the merchant 210. Thereafter, the transaction is completed with the customer, and the customer is provided confirmation of her purchase. For example, the customer is provided an appropriate receipt.

Thereafter, settlement of the transaction may occur in due course. In accordance with one embodiment of the invention, settlement may include submitting all approved transactions to the interim PPE 120. The interim PPE 120 then converts each token and merchant transaction reference number (for each approved transaction) to the real credentials for the particular customer. As described above, in one embodiment, such conversion is performed with the wallet vault 110 making the association between each token/merchant transaction reference number vis-à-vis the real credentials/merchant transaction reference number for each transaction. Alternatively, the interim PPE 120 (based on the prior processing performed in conjunction with the authorization of the particular transaction) might retain sufficient information to make such association. Accordingly, once the interim PPE 120 secures the real credentials and merchant transaction reference number for a particular transaction, the interim PPE 120 then communicates with the issuer bank 100 to complete such settlement. Upon completion of settlement of the transaction, processing is completed.

It is appreciated that it may be the situation that the interim PPE 120 and the issuer bank 100 are both part of the same financial entity. In such situation, the processing described herein as performed by the interim PPE 120 and the processing as described herein as performed by the issuer bank 100 may indeed be performed collectively in some manner. However, it is appreciated that the arrangement of FIG. 1 and FIG. 4, and the demarcation of the interim PPE 120 vis-à-vis the issuer bank 100 provides for the processing to be performed using a variety of issuer banks.

As described above, the invention provides for "out of band" authentication to be employed in the processing of the invention. That is, for example, the customer may be requested to confirm the transaction using a secondary channel in conjunction with the processing described above. For example, the customer might be requested to confirm an online transaction via a telephone call with confirmation to the customer. It is further appreciated that the customer may not in fact have (nor do they need to have) knowledge of the particulars of the front end token.

In general, it is appreciated that the processing of token conversion may be performed by a stand alone third-party or some other distinct entity. For example, after a merchant acquirer inputs a token from a merchant (and is in possession of either a transaction token and/or and account token) that merchant acquirer may interface with such distinct entity to effect conversion of the actual credentials to perform the transaction. Accordingly, the merchant acquirer would then have the credentials (such as a clear PAN, i.e. true unencrypted card number) by which they could run the transaction on their merchant's behalf. Accordingly, the distinct entity would perform the role of what might be characterized as a "front end conversion entity" that effects conversion of the tokens to the actual credentials.

Figure 5:
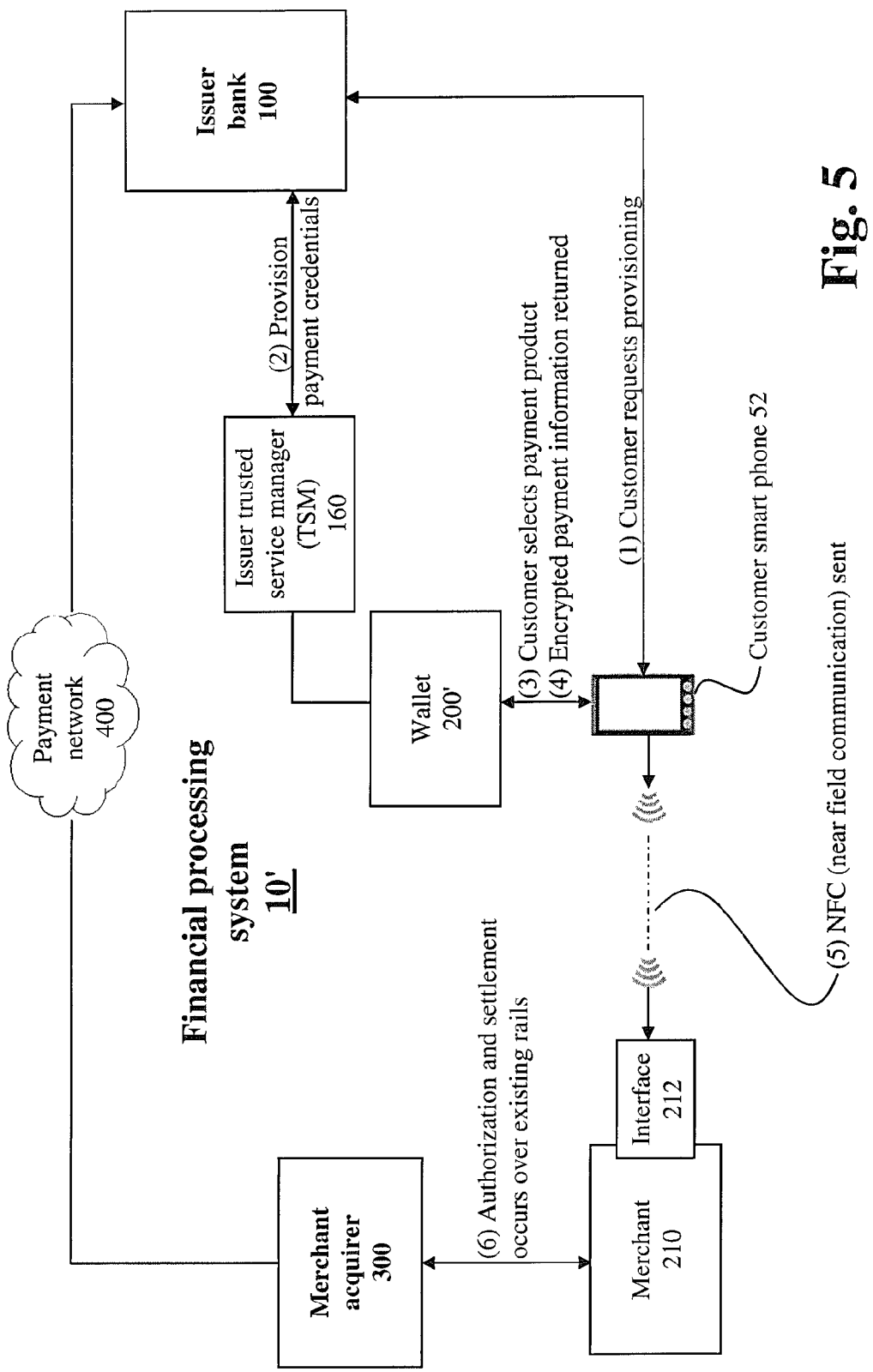
FIG. 5 is a further block diagram showing the components of a financial processing system and the flow of information between such components, in accordance with one embodiment of the invention.

FIG. 5 is a further block diagram showing the components of a financial processing system 10 and the flow of information between such components, in accordance with one embodiment of the invention.

The arrangement of FIG. 5 is distinct from the arrangements of FIGS. 1 and 4 in that the arrangement of FIG. 5 utilizes an issuer "trusted service manager" (TSM) 160. The issuer TSM 160 may be in the form of a processing system that bridges the communication gap between the issuer bank 100 and a particular merchant's wallet 200'. In particular, the issuer TSM 160 may know both the communication protocol and the security protocol of both the wallet 200' and the issuer bank 100, so as to provide both efficient and secure communication between the wallet and the issuer bank. In addition, the issuer TSM 160 may perform the processing of associating credentials in the form of a token (as utilized by the wallet 200') vis-à-vis real credentials that fund such token, as are maintained by the issuer bank 100. In other words, a customer (given the arrangement of FIG. 5) may request provisioning of her real credentials to the issuer TSM 160 (step 1 of FIG. 5). In response to such request, the issuer bank 100 indeed provisions such payment credentials to the issuer TSM 160 (step 2 of FIG. 5).

In operation, once the credentials are provisioned, the customer initiates a transaction using her smartphone 52. In this example, the transaction is initiated with the smartphone 52 interfacing with the interface 212 of a merchant 210. In this example, such interface is performed utilizing NFC (near field communication) technology. However, it is appreciated that other communication protocol might be utilized instead. Subsequent to such interface, the customer smartphone 52 is then prompted to interface with the wallet 200' that is associated with the merchant 210. For example, the merchant interface 212 may output a communication to the customer smartphone 52 providing the smartphone 52 with communication information for contacting the wallet 200'. The interface between the smartphone 52 and the wallet 200' may include the customer selecting a particular payment product to utilize in the transaction (step 3). Thereafter, the wallet 200' returns encrypted payment information to the customer (step 4). Thereafter, such encrypted payment information is sent from the smartphone 52 to the merchant 210 (step 5).

Thereafter, as reflected in FIG. 5, authorization and settlement of the particular transaction occurs over existing rails, i.e., over the existing payment network 400. That is, for example, an authorization request (including the token information) is sent from the merchant 210 to the merchant acquirer 300. Thereafter, the merchant acquirer 300 sends the authorization request to the issuer bank 100. Upon receiving the authorization request (including the token information), the issuer bank 100 looks to the issuer TSM 160 to associate the token with the real credentials of the customer. Specifically, the issuer bank 100 sends a transmission to the issuer TSM 160 requesting the real credentials. In response, the issuer TSM 160 sends the real credentials back to the issuer bank 100 for processing. The issuer bank 100 confirms that the requested transaction should be authorized, and assuming such is the case, generates and outputs a communication to the merchant acquirer 300 reflecting such authorization. It is appreciated that a suitable transaction identification number (ID) may be associated with the transaction related communications such that the communications might be tracked. Settlement may occur in similar manner (to authorization) between the merchant 210, merchant acquirer 300, the issuer bank 100, and the issuer TSM 160, for example. Specifically, in conjunction with settlement, the issuer bank 100 may look to the issuer TSM 160 for conversion of token information to real credentials—for settlement processing.

Various illustrative processing is described herein relating to a "wallet." More specifically, such processing is described herein in terms of a wallet, cloud wallet, and/or a TunesWallet, and/or similar terminology, for example. Such a described "wallet" might be implemented using a standalone server architecture. Such a described "cloud wallet" might be implemented using cloud technology. Further, the wallet described as a "TunesWallet" constitutes a fictional wallet associated with a fictional company, Tunes-Inc, as described herein. It is appreciated the processing performed by one type of wallet might alternatively be performed by another type of wallet, unless described herein to the contrary. It is of course appreciated that the functionality described herein may be utilized with a wide variety of merchants and/or entities. For example, one implementation may be in the environment of the merchant APPLE and its associated iTUNES functionality. However, the systems and methods of the invention are of course not limited to utilization with such entity.

Figure 6:
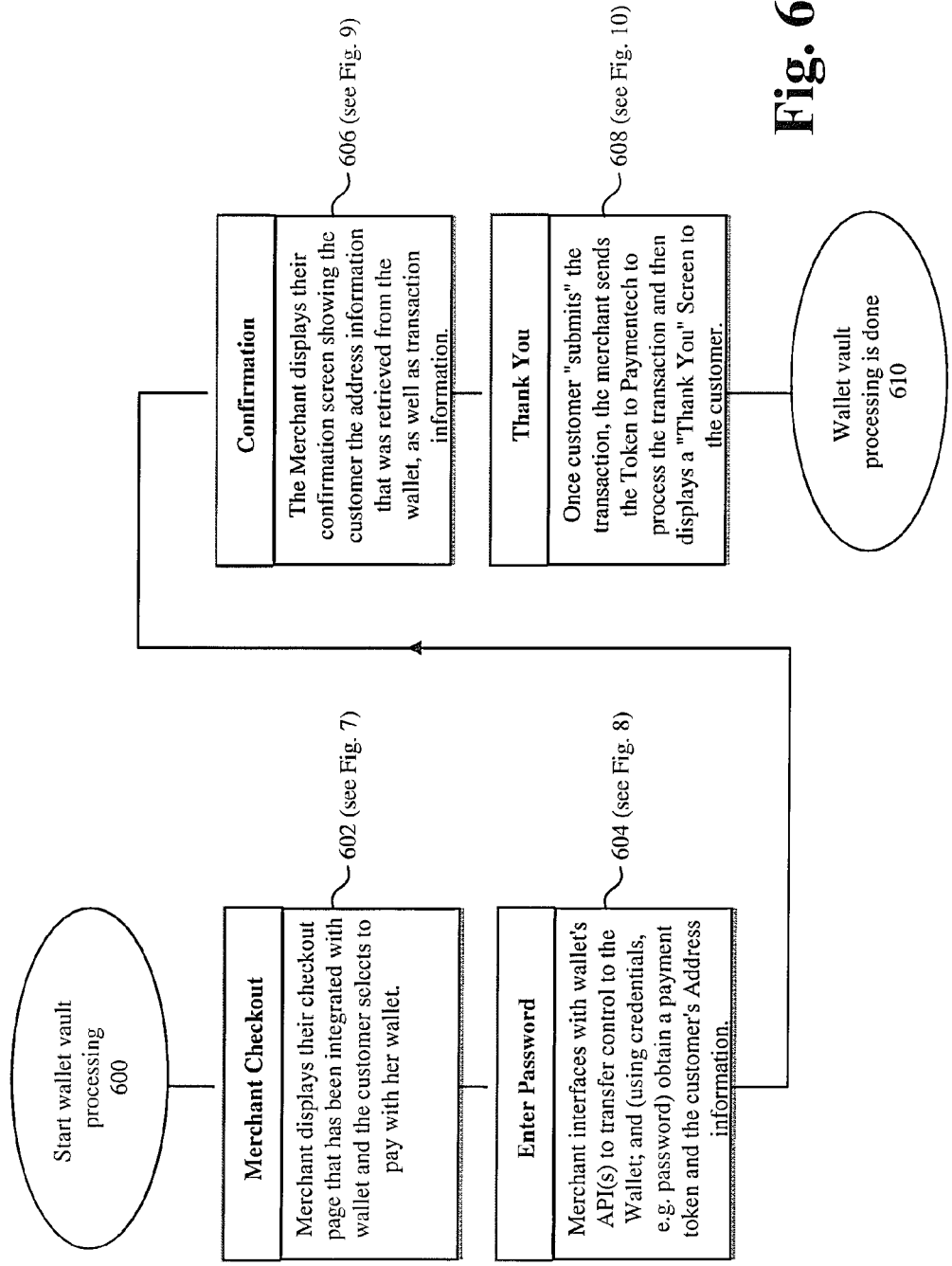
FIG. 6 is a flowchart showing a wallet vault process, in accordance with one embodiment of the invention.

Hereinafter, various further aspects of the invention will be described regarding processing performed related to the wallet vault as well as wallets that are associated with the wallet vault, in accordance with embodiments of the invention FIG. 6 is a flowchart showing a wallet vault process in accordance with one embodiment of the invention. The processing of FIG. 6 illustrates a customer experience using a wallet 200. The wallet 200 might be provided using cloud technology, in accordance with one embodiment. As described herein, use of the wallet 200 may provide for a simplistic experience in which the customer does little more than enter his or her password to complete a purchase, i.e., to effect a transaction. In this embodiment of FIG. 6, the wallet 200 may interfaces with the merchant 210 using a suitable application program interfaces (APIs).

Figures 7, 8:
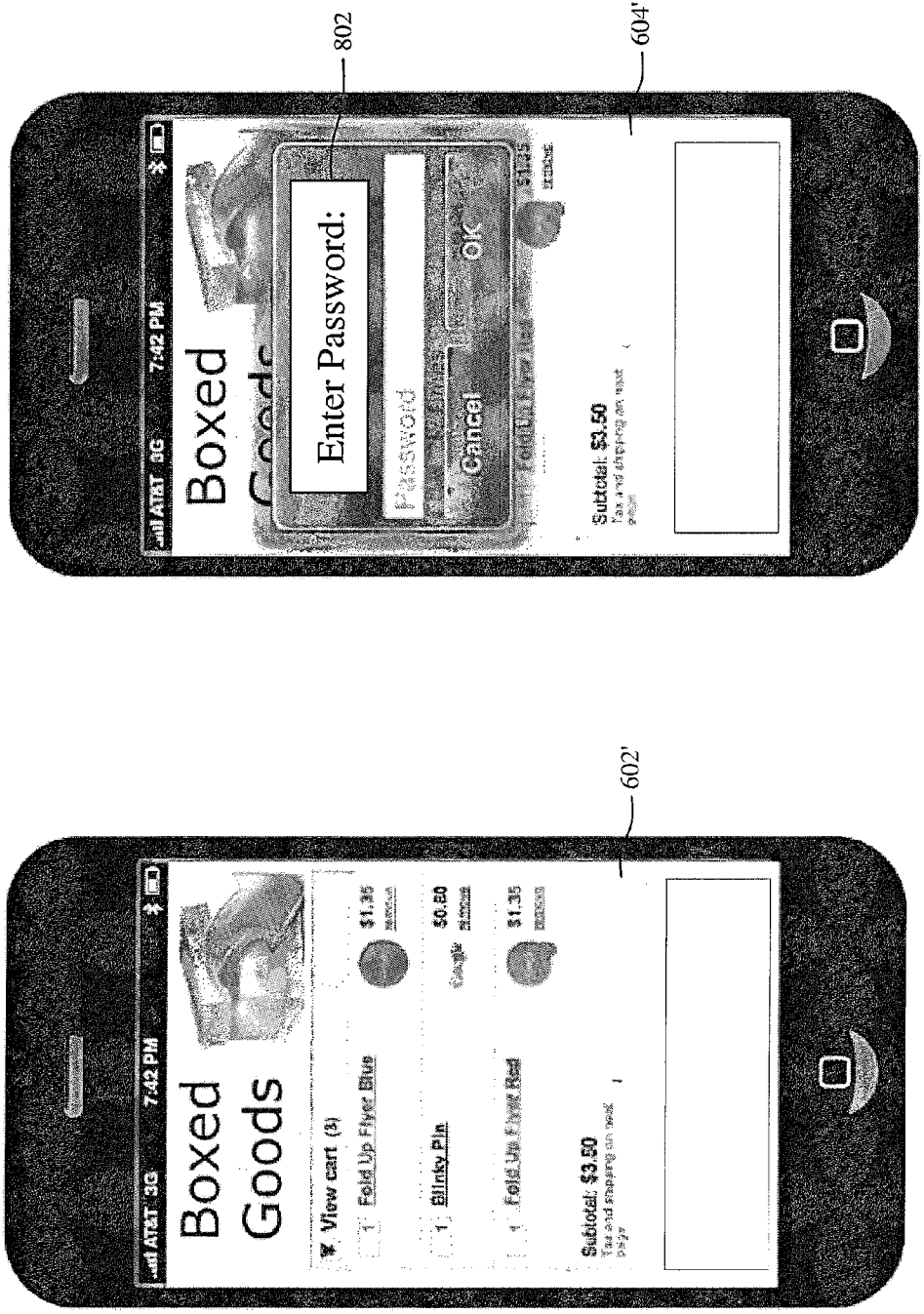
FIG. 7 is a diagram showing a smartphone with GUI illustrating aspects of "merchant checkout," in accordance with one embodiment of the invention.
FIG. 8 is a diagram showing a smartphone with GUI showing aspects of transaction processing, in accordance with one embodiment of the invention.

As shown in FIG. 6, the process starts in step 600 and passes to step 602. In step 602, the merchant system 210 displays their checkout page (which is integrated with the wallet 200) and the customer selects to pay with her wallet, which is displayed as an option on the merchant's checkout page. It is appreciated that display of the merchants checkout page as well as other processing may not in fact be provided by the merchant system. For example, processing may be outsourced to some third party. FIG. 7 is a diagram showing a smartphone with GUI 602' illustrating the processing of step 602 including aspects of "merchant checkout," in accordance with one embodiment of the invention. As shown, the customer has selected three items to purchase in the total amount of $3.50. After step 602 of FIG. 6, the process passes to step 604.

FIG. 8 is a diagram showing a smartphone with GUI 604' illustrating the processing of step 604. In step 604, the merchant interfaces with the wallet 200 using a suitable API. In conjunction with such interfacing, the wallet 200 is provided access so as to generate a dialog box 802 (shown in FIG. 8) on the user device (or on some interface that is presented to the customer). Specifically, the dialog box 802 interfaces with the customer to input a credential from the customer, such as a password. Accordingly, in this processing, control is transferred from the merchant over to the wallet 200, such that the wallet 200 may interface with the customer to secure some predetermined credential from the customer. For example, the wallet might be maintained by APPLE, in which case the password entered by the customer might be constituted by the customer's iTunes password or other credentials. However, it is appreciated that a wide variety of passwords or other credentials might be utilized. In step 604, the wallet 200 then interfaces with the merchant's system 210 to output a token to the merchant (to be used to effect the transaction), as well as other customer information as desired.

Figure 9:
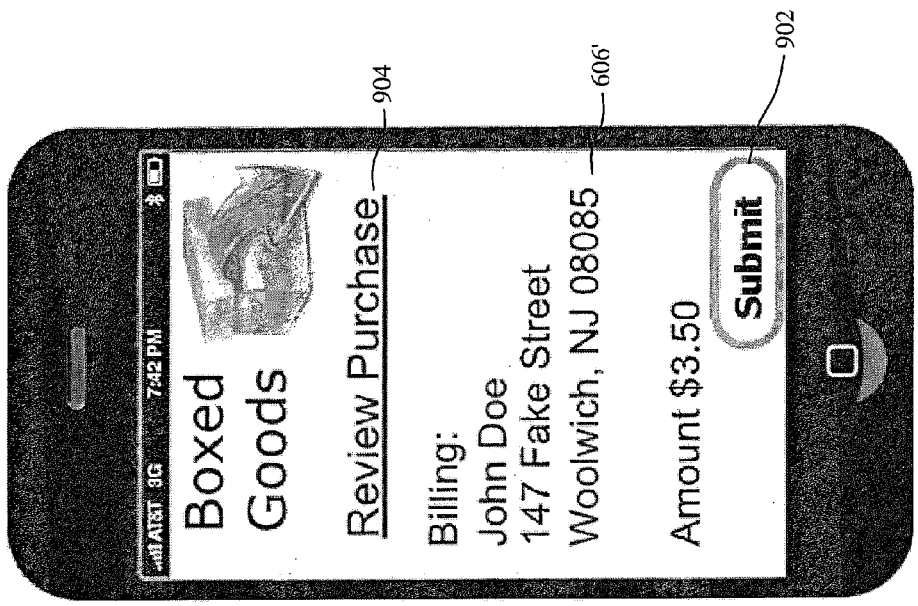
FIG. 9 is a diagram showing a smartphone with GUI illustrating aspects of transaction confirmation, in accordance with one embodiment of the invention.

After step 604 of FIG. 6, the process passes to step 606. In step 606, the merchant displays a confirmation screen showing the customer the address information that was received from the wallet, as well as purchase information, such as the amount of the purchase. Various other information may be presented to the customer for review, as desired. FIG. 9 is a diagram showing a smartphone with GUI 606' illustrating the processing of step 606 including aspects of transaction confirmation, in accordance with one embodiment of the invention. As shown in FIG. 9, the GUI 606' includes a "submit" button 902, as well as an option for the customer to "review purchase", as illustrated by a hot link 904. Upon the customer reviewing the information presented by the GUI 606', the customer taps the submit button 902 or in some other manner interfaces with the GUI 606' to indicate that such information is correct and acceptable. It is appreciated that other functionality may be provided to the customer, i.e., in addition to the "submit" and "review purchase" options.

Figure 10:
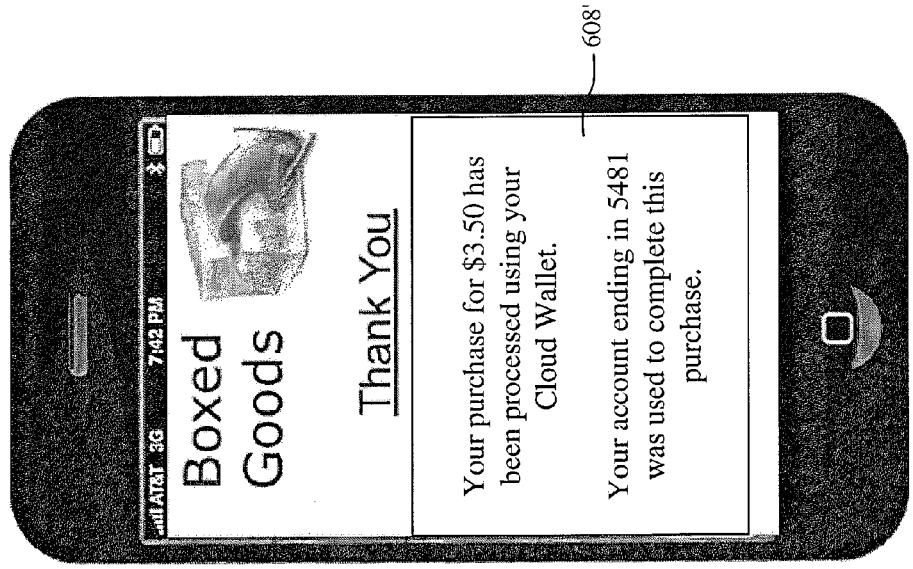
FIG. 10 is a diagram showing a smartphone with GUI illustrating aspects of further transaction processing, in accordance with one embodiment of the invention.

After step 606 of FIG. 6, the process passes to step 608. Step 608 reflects that the transaction has been submitted by the customer. Once submitted by the customer, the merchant sends the token and other transaction information to a suitable financial entity, such as a suitable merchant acquirer 300 or an entity such as Paymentech, for processing of the transaction. In conjunction with the output of the transaction information to the merchant acquirer 300, the merchant system may generate a suitable further message to the customer. Such further message may set forth various details of the transaction including the amount of the transaction, particulars of the account used to fund the transaction, as well as a suitable "thank you," for example FIG. 10 is a diagram showing a smartphone with GUI 608' illustrating the processing of step 608 including aspects of further transaction processing, in accordance with one embodiment of the invention.

Accordingly, the above processing of FIGS. 6-10 provide quick and easy functionality to make a purchase—using an app on the customer's smartphone, for example, or some other customer interface presented by the merchant, for example. It is appreciated that in one perspective, an "in app" purchase as described above, may follow similar processing and methodology as a customer experiences for purchasing digital content and/or physical real world goods (merchandise), i.e., in that the customer is presented with items to purchase and the purchase of those items is effected using essentially a single password. It is further appreciated that the merchant system 210, and specifically a mobile site of the merchant, may be enhanced to effectively and efficiently interact with the wallet 200. For example, a mobile site of a merchant may include functionality and graphics so as to be in harmony with the processing of the wallet and the various functionality provided by the wallet.

As used herein, an "app" means a processing portion for providing particular functionality as described herein. The app may be disposed in the environment of an operating system, such as on a smartphone, in accordance with one embodiment of the invention.

Figure 11:
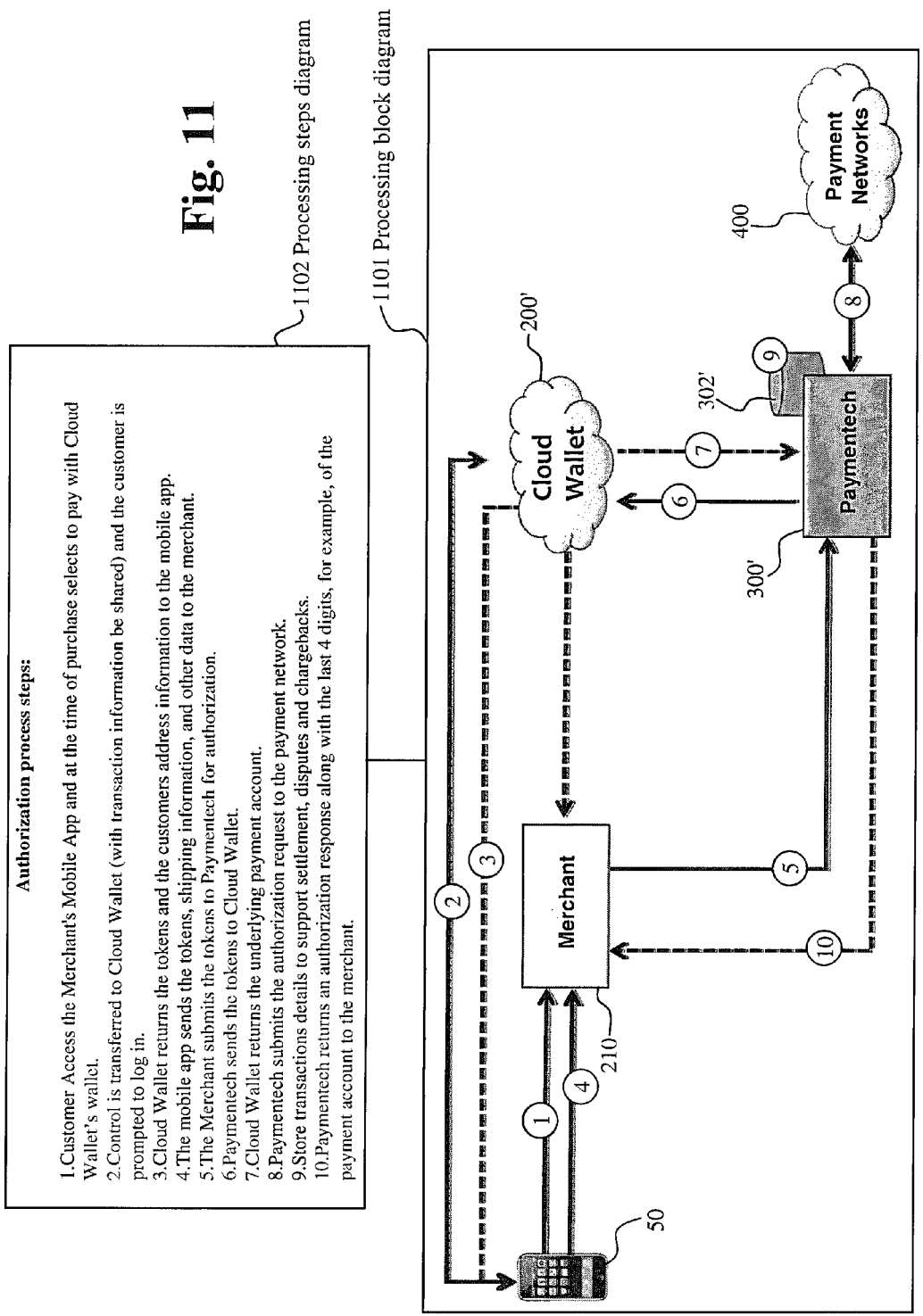
FIG. 11 is a diagram showing aspects of authorization processing, in accordance with one embodiment of the invention.

FIG. 11 is a diagram showing aspects of authorization processing in accordance with one embodiment of the invention. In particular, FIG. 11 includes a processing block diagram 1101 correlated with a processing steps diagram 1102, showing processing effected between various components of the financial system. As described above, a merchant system 210 (of a participating merchant) may integrate with a wallet 200' so as to obtain a token and other particulars of the customer, such as the customer's address information. In such processing, the merchant 210 will be the (merchant of record). In such processing, the merchant will receive a transaction token and an account token, in accordance with one embodiment of the invention. Neither the transaction token nor the account token is the customer's true payment credentials. In the processing, any transaction detail that the wallet 200' needs will be passed from the merchant directly to the wallet 200' during the customer authentication process. Such processing of the invention leverages the existing MOPs (method of payments) with the addition of a wallet indicator (indicating which wallet was utilized for the transaction), as well as functionality to support the output of the tokens from the wallet 200' to the merchant system 210.

As illustrated in FIG. 11, in step 1, a customer 50 (for example using a smartphone) accesses a merchant's mobile app 210 (on the customer's smartphone 50) and (at the time of purchase) selects a particular wallet 200' to use in effecting the purchase. In this example, that particular wallet 200' is characterized as a "cloud wallet". The customer might select the cloud wallet 200' by tapping a particular icon presented on the customer's smartphone 50, for example. Upon the customer selecting to pay with the cloud wallet 210', processing is triggered (in step 2 of FIG. 11) to transfer control of the processing to the cloud wallet 210'. This is done in conjunction with the sharing of the transaction information between the merchant's system and the cloud wallet 210. In conjunction with this sharing of information, the customer is prompted to enter some predetermined credential, as described above, such as a password to log in to the cloud wallet. The cloud wallet then authenticates the credential provided by the customer. For example, the cloud wallet may compare the password provided by the customer and other particulars of the transaction with the data in a database of the cloud wallet. If the information is verified, then processing continues. Specifically, in step 3, the cloud wallet returns the tokens and the customer's address information to the mobile app. Specifically, the tokens may include a transaction token and an account token. Then, in step 4 of FIG. 11, the mobile app sends the tokens, shipping information, and other information to the merchant. Then, in step 5, the merchant submits the tokens to a merchant acquirer, such as Paymentech, for authorization. Then, in step 6, Paymentech sends the tokens received from the merchant to the cloud wallet 200'. It is appreciated that in one embodiment, the account token may come from the merchant acquirer. That is, upon receiving a transaction token, the data in such transaction token may then be mapped to the appropriate account token (or alternatively, an account token is generated in response to receipt of the transaction token). Note that this processing is distinct from the processing of FIG. 1 in which the wallet vault 110 performed the conversion between the tokenized information and the customer's real credentials. Then, in step 7, the cloud wallet 200' returns information of the underlying payment account, i.e. the "real credentials", to Paymentech. Then, in step 8, Paymentech 300' submits the authorization request to the payment network 400 using the underlying payment account information. In conjunction with the processing of step 8, or subsequent to the processing of step 8, Paymentech 300' (in step 9) stores various transaction details in a suitable database 302'. In particular, transaction details are stored to support settlement, disputes and/or charge backs, for example. Such transaction details may include mapping information, such as information to allow mapping correlating tokens that are used vis-à-vis payment account information (the real credentials). Subsequent to the processing of step 8 and step 9, Paymentech 300' receives an authorization response for the requested transaction from the payment network. This reflects, in this embodiment, that the authorization request was output to the issuer bank through the payment network, and that the issuer bank approved the requested transaction, and sent that approval back through the payment network to Paymentech. Then, in the processing of step 10 of FIG. 11, Paymentech 300' returns a corresponding authorization response to the merchant system 210. The authorization response includes sufficient information to allow the merchant system 210 to associate the authorization response to the particular transaction. For example, the authorization response might include the last four digits of the payment account or other information associated with the account and/or requested transaction. Authorization processing for the requested transaction of the customer is then complete. Further aspects of subsequent processing, such as settlement of the transaction, are described below with reference to FIG. 13 and otherwise.

Various aspects of dispute processing are described herein. In a "dispute" the customer becomes aware of a charge that she does not recall, for example. In such a situation, the customer initiates a dispute as to the transaction by approaching either the merchant (at which the transaction was effected) and/or the card issuer, for example. As described below, various processing is involved with processing a dispute. It is appreciated that the invention may provide further tools to assist a customer in enhanced understanding and recollection of the charges placed on a credit card account, or some other card account of the customer. For example, in one embodiment, GPS technology may be utilized. Specifically, the GPS location at which a transaction was performed may be input by a wallet processing portion (or by a wallet vault processing portion), in conjunction with the other transaction information. If the merchant is integrated with the wallet, more detailed information may be available versus the situation where the merchant is not integrated with the wallet. The invention is not limited to utilizing GPS to determine the particular location at which a transaction occurred. Additionally, other location-based methodologies may be utilized, such as Wi-Fi or the particular cell phone tower the customer is interfacing with, for example. For example and relatedly, it is appreciated that if the particular cell tower proximate a customer is determined, for example, then it also may be determined all the different businesses, or other relevant entities, in that particular geographical area of the customer. In response to a customer's query regarding a particular transaction, information regarding the transaction (including location information, for example) may be presented to the customer in a suitable manner. For example, the information might be presented to the customer in map form showing merchants listed on the map and the particular location of the transaction also on the map. Other information may also be utilized to enhance a customer's recollection of a particular transaction. For example any available picture information may be input and presented to the customer.

Relatedly, in one embodiment, specific processing is performed in conjunction with each transaction performed using the customer's smartphone. In this embodiment, the smartphone has both a forward facing camera and a backward facing camera. Upon a customer effecting a transaction at a merchant, as determined by the activation of some suitable trigger, both the forward facing camera and the backward facing camera takes a picture. This image data is input into a record for the transaction. Further, the smartphone may retrieve GPS information and also put that information into the record for the transaction. The record and associated information may be retained in the smartphone, and may also be output to a wallet or other processing portion, as desired. The particular image, i.e., the particular image data that is input and processed may vary. For example, the image may be a QR code or a barcode, for example. The customer might take a picture of the actual goods the customer is purchasing so that the customer could recall at a later time the particular purchase. In general, the pictures could document the particular customer, the item purchased and the environment in which the purchase was effected, for example. The image data from the pictures may be associated with the transaction in some manner as desired.

As described herein, there are various "legs" associated with each transaction of a customer. Various processing is described herein including tokenization of a transaction, de-tokenization of a transaction, dispute processing, and various other manipulation of transaction related information. Accordingly, data representing a particular transaction may be in a variety of forms. In order to associate the various legs of a transaction (and the various data forms that represent a transaction), a commonality may be associated with or included in each of the various data forms. In one embodiment, this commonality may be in the form of a unique "merchant transaction reference number." Such unique merchant transaction reference number may be present in all the different data forms of a transaction. However, the invention is not limited to such particulars. As otherwise described herein, other methodologies may be utilized to associate the different legs of the transaction, such that those legs of a transaction may be reunited as needed for certain processing. Relatedly, as otherwise described herein, token transaction data is converted into real transaction data, such as for outputting to the issuer. On the flipside, real transaction data is converted into token transaction data for output back to the merchant. In one embodiment, the merchant transaction reference number is present all of such processing. That is, the same merchant transaction reference number is present both during processing at the issuer, as well as processing at the merchant. However, in other embodiments, the merchant transaction reference number may be converted in some manner, along with the conversion between the real transaction data vis-à-vis token transaction data. However, if the merchant transaction reference number is indeed converted in such manner, then appropriate mapping is needed to associate such two forms of the merchant transaction reference number.

Relatedly, it is appreciated that further associations may be provided in addition to associating the legs of a single transaction. For example, it may be the situation that a customer has purchased items in a bundle. For example, a customer may have purchased a bundled package including airfare, hotel, and rental car. In such bundle, there are interdependencies between such three purchases including, for example, a reduction in price due to the bundled nature of the purchases. As a result, if a customer wishes to vary one piece of such bundle, then that variance may impact the other pieces of the bundle. For example, if the customer wishes to opt out of the rental car piece of the bundle, such may result in an increase in price in the airfare and/or hotel piece of the bundle. Accordingly, the system associates each piece of a bundled package such that an adjustment to one piece of the bundle may be effectively tracked into the other pieces of the bundle, such that the other pieces of the bundle may be adjusted in some appropriate manner, such as in terms of any discount that was provided in view of the bundled nature, any tax consequences, or other attributes, for example. In other words, in the processing described herein, one embodiment, there needs to be (1) some "glue" to link together all the transactions in a bundle, as well as (2) "glue" to link all of the legs of each respective transaction together. In one embodiment, the unique merchant transaction reference number described above may provide this commonality, i.e., provide this glue. However, it is appreciated that other approaches to associate various transactions in a bundle, as well as the legs of those respect transactions, may be utilized. In general, it is appreciated that the various pieces of a transaction and the manner in which the pieces are associated with each other, i.e., the glue, may be maintained in a financial processing system for as long as is desired. For example, the particular length of time that data is maintained may depend on regulatory requirements, other compliance issues, merchant dictated data requirements, customer requests regarding retainment of data and/or other parameters.

FIG. 12 is a flowchart showing further aspects of authorization and data exchange in accordance with one embodiment of the invention. More specifically, FIG. 12 illustrates further aspects of the particular data that is exchanged between processing components in the processing of FIG. 11, described above. The data exchanged as shown in FIG. 12 is illustrated. It is appreciated that various other data may be exchanged and/or process depending on various parameters, such as the nature of the transaction and the environment in which the transaction is processed.

As described above, in step 2 of FIG. 11, control of the processing is transferred to the particular wallet (cloud wallet) in conjunction with transaction information being sent to the wallet. The transfer of such control and the sending of such transaction information is performed prior to the wallet prompting the customer to log in. As shown in FIG. 12, in such processing, the particular data sent to the wallet may include the merchant ID, a list of MOPs (method of payments) that the merchant allows, CVV, CVV2, the transaction (Txn) amount, any other credential, or some other value, for example. The particular transaction amount may affect decisioning as to the particular processing invoked by the wallet. For example, with a larger transaction amount, additional security and/or communications to the customer may be invoked. Such communications to the customer might include a receipt e-mail, for example. Various embodiments of the invention are described herein as utilizing a CVV or CVV2 or other credential. However, it is appreciated that the use of such credential might be substituted by using another suitable credential, as desired.

As described above, in step 3 of FIG. 11, the wallet returns the tokens and the customer's address information to the mobile app of the merchant. Such processing may include the transfer of information including an account token, an MOP code, a wallet transaction token (which may be 20 bytes or 40 bytes, for example, depending on the particular encryption level), the last four digits of the customer's account number (i.e., the last four digits of the customer's "real transaction data"), a ship-to address that is associated with the customer, an e-mail address that is associated with the customer, a CVV or CVV2 value which might be encrypted, tokenized, or in the clear, meaning that such data is simply unencrypted, or some other value. Other data may be provided, as desired. It is appreciated that applicable rules (such as compliance rules and/or network rules) may limit the manner in which certain account parameters may be stored, and in particular applicable rules may limit the manner in which a CVV2 or other CVV value may be stored.

As described above, the processing of step 4 of FIG. 11 includes the mobile app sending the tokens, shipping information, and other information to the particular merchant that the mobile app is associated with. Further, in step 5 as described above, the merchant submits the tokens to Paymentech for authorization. As shown in FIG. 12, the information exchanged in steps four and five of FIG. 11 might include a merchant ID, an account token, an MOP code, a wallet transaction token, the CVV2 value from the processing of step 3, as well as any other normal fields for the transaction or any other normal fields for the particular MOP being used.

As described above, the processing of step 6 includes Paymentech sending the tokens to the wallet in order to secure the customer's real transaction data (which Paymentech will use to secure authorization from an appropriate issuer. In the processing of step 6, the data output from Paymentech to the wallet may include the merchant ID, the account token, the wallet transaction token, the transaction amount, as well as the CVV2 value from the processing of step 4.

As described above, the processing of step 7 and step 10 includes, respectively, the wallet sending data to Paymentech—and Paymentech sending data to the secure payment network for authorization. Such data may include a clear PAN (i.e., an unencrypted personal account number), a clear CVV2, and a clear billing address, for example.

As noted above, it is appreciated that the particular data exchanged as described above with reference to FIG. 12 is illustrated. Various other data may be exchanged depending on the particular nature of the transaction being effected as well as the particular nature of the merchant affecting that transaction. Various further aspects of the particular data exchanged are described below.

FIG. 13 is a diagram showing aspects of settlement processing in accordance with one embodiment of the invention. In particular, FIG. 13 includes a processing block diagram 1201 correlated with a processing steps diagram 1202, showing processing effected between various components of the financial system.

In accordance with embodiments of the invention, settlement occurs between the merchant 210 and a merchant acquirer 300', such as Paymentech. As described herein, the merchant acquirer 300' may utilize a transaction database 302' to store various data regarding processed transactions. In particular, such stored data may provide needed information to support future dispute or chargeback processing needs. Relatedly, such stored data in the database 302' may provide the information needed to allocate transaction fees to be collected by involved financial entities and/or reimbursed to the customer by the involved financial entities, such as possibly in the situation of a dispute or chargeback. The various components of the financial processing system described herein may receive various updates (regarding the processing of transactions and/or settlement, for example) from other components, as desired. However, it is of course appreciated that such sharing of data may be limited by any applicable constraints.

Aspects of settlement processing are illustrated in the processing of FIG. 13. As shown, the process starts in step 1 in which the merchant 210 submits settlement files to the merchant acquirer 300' (here Paymentech 300') for processing. The merchant acquirer 300' may be a financial entity such as Paymentech, as shown in FIG. 13, or some other entity. The submitted settlement files contain the tokens that were used in the transaction. Step two of FIG. 13 shows the processing that is then performed by the merchant acquirer 300', i.e., in this case Paymentech. The merchant acquirer 300' maps each token to the true account number of the customer that is stored in a transaction database. The merchant acquirer 300' then submits the modified settlement file, which contains the true account numbers, to the payment network 400. The modified settlement file is then received by a financial entity, such as an issuer bank 100'. The settlement information is processed by the financial entity 100', including verifying the transactions, verifying any other information as needed, and effecting any further needed funds transfer needed to effect the settlement processing. Then, as reflected in step 3 of FIG. 13, the response from the financial entity (the issuer bank for example) is sent back to the merchant via the merchant acquirer. Additionally, as reflected in step 4 of FIG. 13, the merchant acquirer (Paymentech) 300' updates the wallet 200' with information including the settlement, such as the token settlement details. The settlement processing is then completed.

Figure 16:
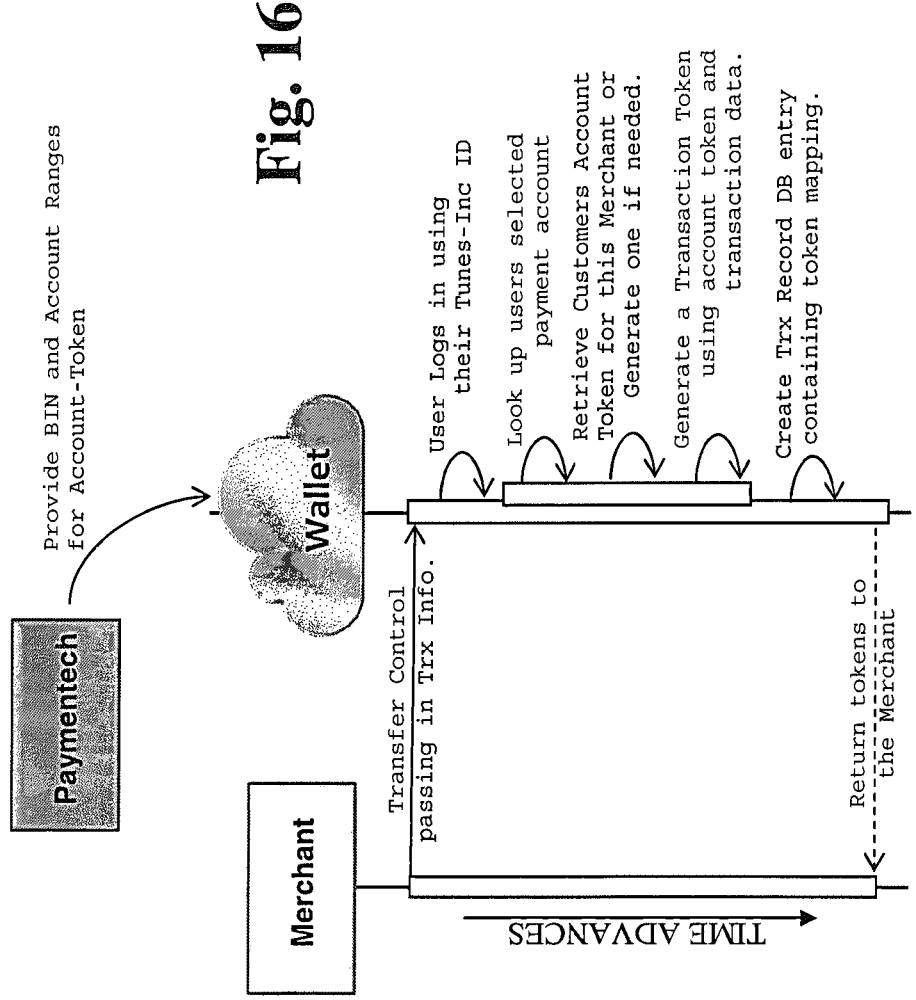
FIG. 16 is a diagram showing further aspects of token generation processing, in accordance with one embodiment of the invention.

FIGS. 14-16 illustrate aspects of token generation. In the invention, a set of tokens may be used to drive wallet payments. These tokens provide enhanced security as well as allow for compatibility with existing networks as needed or desired. FIG. 14 is a diagram showing aspects of an "account token," in accordance with one embodiment of the invention. As illustrated in FIG. 14, an account token may be in the form of a 16 digit ISO compliance number, for example, that is routable over the existing payment networks. It is appreciated that preserving this form factor will reduce merchant integration barriers and serve to support future network routing needs. In general, it is appreciated that preserving the form factor will allow the systems and methods of the invention to further leverage existing payment networks and other existing infra structure. The account token may be utilized to provide a permanent mapping between the particular card of the customer that was used in the transaction and the particular merchant. For a particular entity, the account tokens may be placed in some predetermined range, i.e., in terms of numbers or alpha characters that constitute the account tokens. For example, in one embodiment, the account tokens may be placed in a BIN range that corresponds to the network and product type at the highest level thereof, for example (the highest level meaning the initial characters, e.g. the first group of characters constituted by the first 4 or 6 characters of the clear PAN). FIG. 14 illustrates an account token in the form of a 16 digit number. However, as described above, another length of number or alpha numeric sequence may instead be utilized, as desired.

Accordingly, various aspects of an "account token" are described above. On the other hand, FIG. 15 is a diagram showing aspects of a "transaction token," in accordance with one embodiment of the invention. The transaction token may be generated using a one-way cryptographic hash using a shared secret key and using information about the transaction, merchant and/or customer as the input to the hash. In one embodiment, the transaction token would also have the last four digits of the customer's underlying payment credential, i.e., from the customer's real transaction data. For example, the last four digits of the customer's underlying payment credential might be appended to the end of the character string that constitutes the transaction token. It is appreciated that other data may also be used in the generation of the hash. Such processing may utilize known hash techniques. Other cryptographic methodologies may be utilized instead of hash processing.

In general, it is appreciated that the account token and the transaction token may take on any of a wide variety of forms as discussed above or otherwise. Such tokens may include any of numbers, alphanumerics, symbols, glyphs, and/or any other character. The particular form of the token may include but is not limited to format preserving encryption where a particular limited sequence of characters of the real credentials is maintained. On the other hand, the entirety of the token may be a complete random hash value, as it generated off the account number, or some other random number. It is appreciated the formats described herein in the context of an account token may also be used for a transaction token and vice versa.

In accordance with embodiments of the invention, the transaction token may be unique for a given transaction. In such situation, the transaction token is used once only. In other embodiments, a transaction token may be flagged in a manner, so as to be retained, so as to support recurring transactions. Such might be the situation with a magazine subscription or some other payment that is recurring. For example, in the situation where the customer is being billed in some recurring manner, such as monthly, the transaction token could be configured such that data representing the recurring nature of the token is encrypted into the token. The account token may possess similar attributes. Accordingly, the account token could be a one-time token or for multiple transactions. The account token could be unique for the customer's account or it could be unique for that customer/merchant combination. In one embodiment, the account token is static and used to crossed multiple merchants. On the other hand, an account token could be dynamic or each merchant gets their own account token or some variation of a general account token.

In embodiments, the account token basically provides a mapping between the customer's card (i.e. the customer's account) and the merchant, as reflected in FIG. 14. On the other hand, a transaction token is essentially in lieu of a real PAN, or some other payment credential. Accordingly, an account token is held by the system for that merchant and that account until the account particulars has changed or the merchant changes, in accordance with one embodiment. On the other hand, for a particular account token, there may be any number of transaction tokens. In particular, there may be a transaction token, associated with the particular account token, for each respective transaction. In one embodiment, an account token may only work at one merchant, one merchant location, and/or be limited in some other manner. Such goes hand in hand with, in one embodiment, the account token is for a particular merchant. However, it is appreciated that the complexities of use, in terms of merchant IDs and terminal IDs for example, may increase as limitations on use are increased.

The account token as described herein may be generated using different approaches. In a situation where a non-financial entity owns or is closely affiliated with a wallet and/or a wallet vault, that particular entity may generate the account token. In such situation, a financial entity may be utilized to perform the needed conversions between the tokens and the real credentials of the customer. On the other hand, the financial entity handling the conversion of the tokens may also generate the tokens. Various arrangements may be utilized as desired. Relatedly, it is appreciated that in one embodiment, the transaction token may be generated when the customer is ready to check out, as described in detail herein. Accordingly, as described below, when the customer is ready to check out they are transferred to the particular wallet to log in to that particular wallet. The customer may need to provide certain credentials to log in to the wallet. Once the customer is logged into the wallet, the wallet, which is associated with the merchant, will receive enough information about that transaction to generate a transaction token. The transaction token will contain information about the transaction, such as the dollar amount and other attributes of the transaction. The transaction token will also maintain a reference to the account in the wallet that is being utilized. An account sequence number or some other type of code may be integrated into the token, either encrypted or appended, so that processing entities may identify a token as being invalid. Accordingly, when the transaction token is processed within a particular system, that system may validate the transaction token. In embodiments, encryption keys (keys) may be utilized by the processing entities to open up and validate the transaction token, or in some other manner used to access data. Thereafter, the various processing as described herein may be performed.

In general, encryption keys (keys) may be utilized by the processing entities to open up and validate the transaction token, or in some other manner used to access data. Such keys may be public keys or private keys. Such keys may be asynchronous or synchronous. Different keys may allow different levels of decryption. In one embodiment, a particular key associated with a token may be created by the entity that creates the token. Accordingly, if the wallet generates a transaction token and/or an account token, then the wallet would also generate (and appropriately share) the key that is associated with that particular token. Various types of keys may be utilized using known technology. In one embodiment, keys for the account token versus the transaction token may be separate. However, in other embodiments, the same key may be utilized for both the account token and the transaction token. However, it is of course appreciated that if the same keys utilize, that such may result in a decrease of security.

FIG. 16 is a diagram showing further aspects of token generation processing, in accordance with one embodiment of the invention. More specifically, FIG. 16 is a time line representation of processing performed by the merchant and wallet, and communications therebetween. As described above, the wallet may be provided bin and account ranges to be used in generation of the account token and/or the transaction token. In one embodiment, such ranges might be coordinated and provided by a suitable merchant acquirer, such as the entity Paymentech, as described herein. As described above, upon a customer initiating a transaction with a merchant, the merchant collects initial information for the transaction and then transfers control over to the wallet, in conjunction with outputting information regarding the transaction to the wallet. Upon securing control and inputting such information, the wallet first logs the customer in using a suitable credential, such as a suitable password or ID. Then, the wallet looks up the payment account that was selected by the customer. The wallet then retrieves the customer's account token for the particular merchant. Alternatively, there may be no customer account token for the particular merchant. Accordingly, the wallet generates a customer account token for the particular merchant. Then, the wallet generates a transaction token using the account token and the transaction data, for example. It is appreciated that other data may be utilized in generation of either the account token or the transaction token, as desired. Then, the wallet creates a transaction record database entry containing "token mapping" information. For example, this processing might be in the form of generating a record in a suitable transaction record database that contains a mapping between the transaction information and the tokens, and/or other information. Then, as reflected in FIG. 16, the tokens are output from the wallet to the merchant. The processing of FIG. 16 illustrates an arrangement in which the wallet owner controls the generation of the account token.

The processing of FIG. 14 is accordingly completed with the merchant now in possession of both the account token and the transaction token. Thereafter, further processing is performed with the merchant interfacing with the merchant acquirer (for example, Paymentech).

Figure 17:
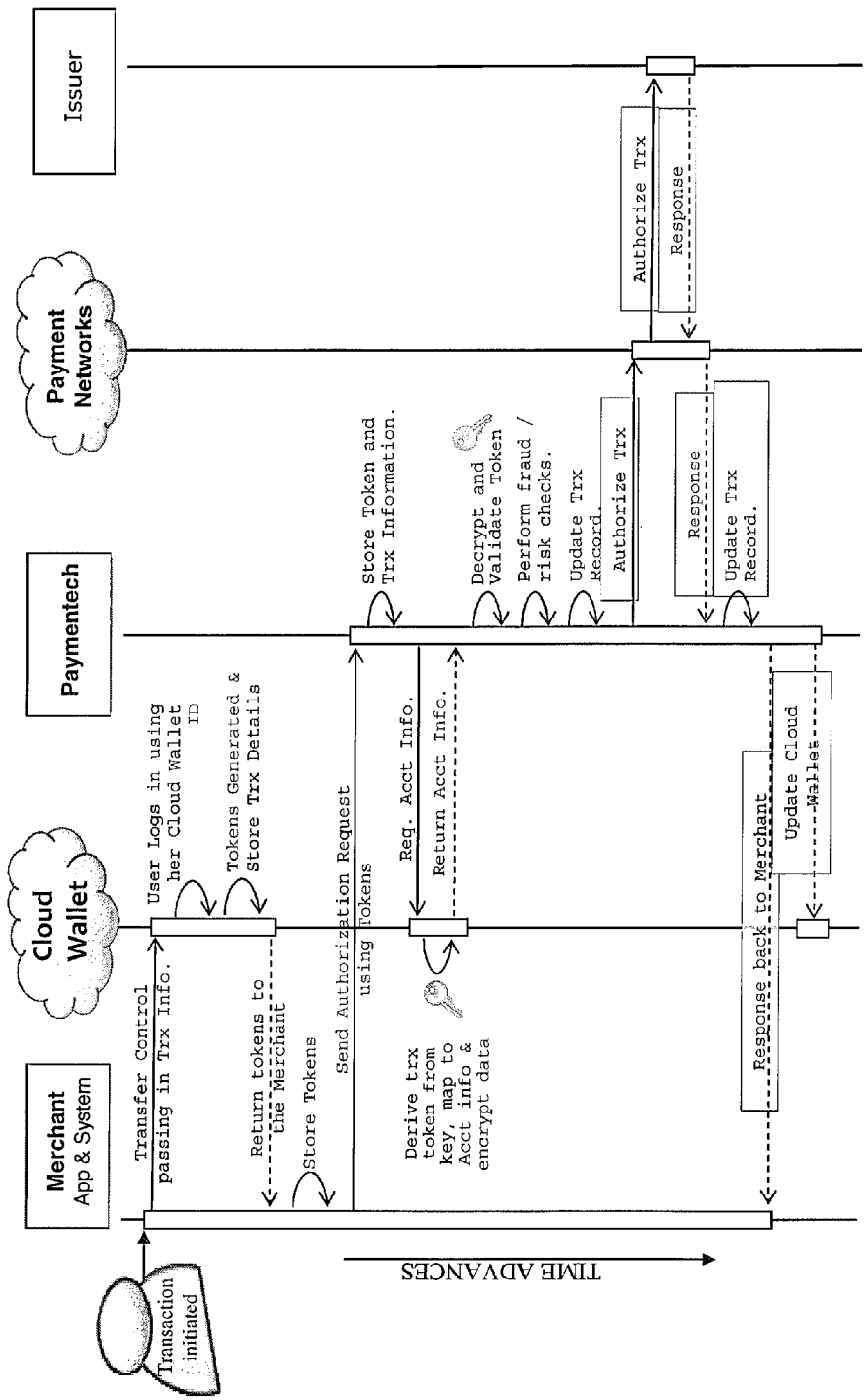
FIG. 17 is a time line diagram showing transaction and authorization related processing, performed in a financial processing system, in accordance with one embodiment of the invention.

FIG. 17 is a time line diagram showing transaction and authorization related processing, performed in a financial processing system, in accordance with one embodiment of the invention.

In the illustrative processing of FIG. 17, a transaction is initiated between a customer and a merchant. In this example, the merchant is constituted by an app, such as an app on the customer's phone, as well as a merchant system sitting behind the app. As otherwise described herein, upon the transaction being initiated, control of the transaction is transferred to a "cloud wallet." This transfer of control is performed in conjunction with outputting data regarding the transaction from the merchant to the cloud wallet. Upon receiving control and the information, the cloud wallet interfaces with the customer to log that customer in using her cloud wallet ID, for example. Then, the cloud wallet generates tokens, such as is described above with reference to FIG. 16. Also, the cloud wallet stores particulars of the transaction. In particular, the cloud wallet stores information to map attributes of the transaction to the particular tokens used in effecting the transaction. Then, the tokens are returned to the merchant as shown. In this example, the merchant then also stores details regarding the transaction, including storing the token information. Then, the merchant sends an authorization request using the tokens. The authorization request is sent to a suitable merchant acquirer, and in this case the authorization request is sent to Paymentech. Upon receiving the authorization request and related information, Paymentech stores the token information and the transaction information. Then, Paymentech interfaces with the cloud wallet to request account information for the transaction. That is, such account information is constituted by the real credentials (the real transaction data) of the particular payment mechanism utilized for the transaction. As shown in FIG. 17, the cloud wallet derives the transaction token from a suitable key and maps that transaction token to the account information of the customer as well as to needed encryption data. As a result, the cloud wallet maps the token information provided by Paymentech to the account information needed to effect the transaction. This account information is then output to Paymentech, as reflected in FIG. 17.

Payment tech then decrypts and validates the token using a provided key. Further, Paymentech may perform any of a variety of fraud checks, risk checks, or other legitimacy related processing to assess the legitimacy of the transaction. Payment tech then updates the transaction record for the particular transaction. Then, Paymentech outputs an authorization request for the transaction to the payment network. The payment network routes the authorization request to the appropriate issuer. In this example, the issuer processes and approves the transaction, and sends a response back through the payment networks. In turn, the payment network outputs the response to Paymentech. Upon receiving the response, Paymentech updates the relevant transaction record. Then, Paymentech sends a response back to the merchant. Accordingly, the merchant then possesses data needed to conclude the transaction with the customer. In addition, Paymentech may output information regarding the transaction to the cloud wallet. This allows the cloud wallet to update transaction data stored in the cloud wallet.

Is appreciated that various constraints and/or rules may be imposed on the above processing—and in general on the various processing described herein. For example, payment network rules may not allow for storing of card validation codes or card validation values. Accordingly, rather than store such information, the wallet may optionally prompt the customer for such value, if such value is indeed required in a particular step of the processing. However, such values might be stored if the imposed security constraints allow for the storage of such values. Further aspects of transaction processing and authorization processing are described below.

Figure 18:
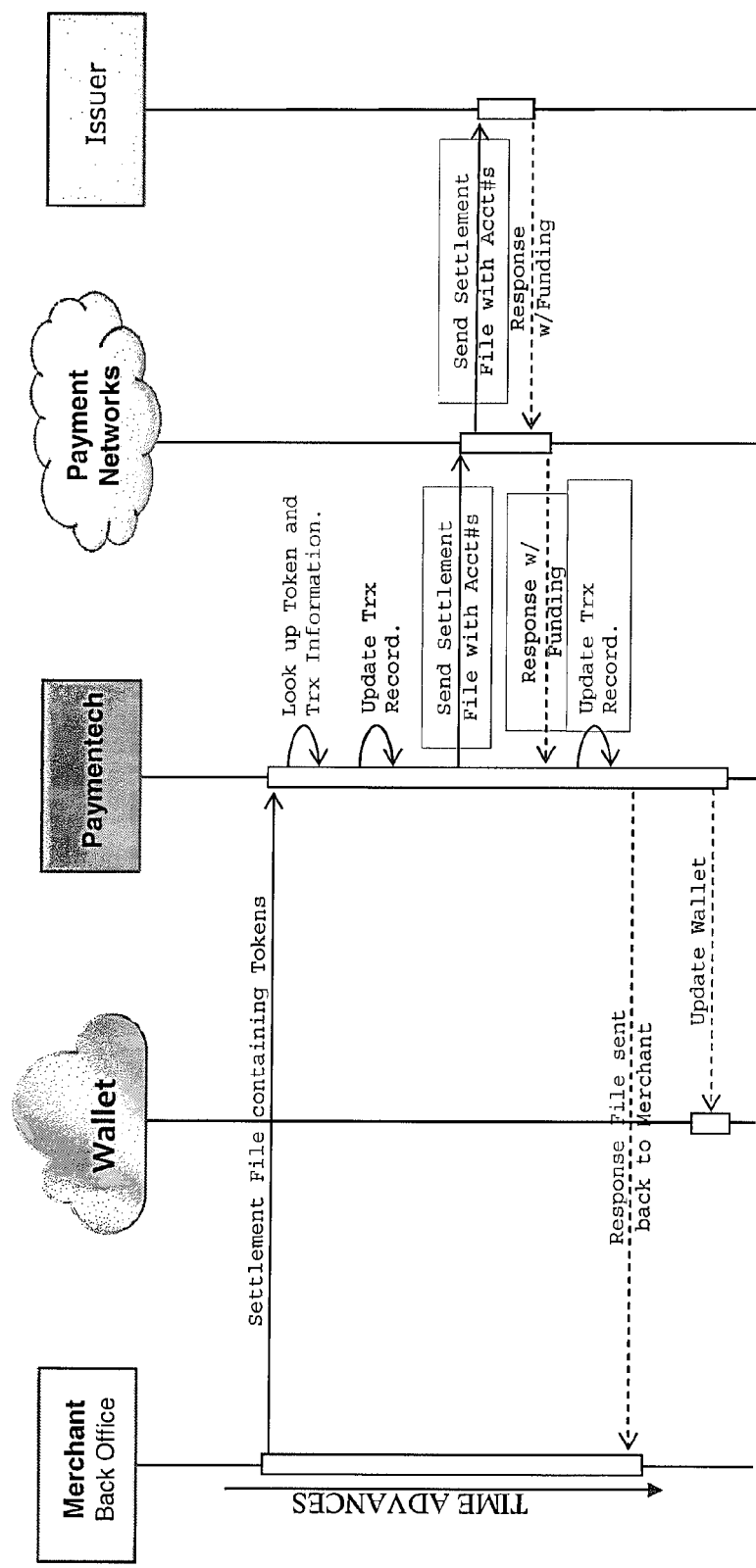
FIG. 18 is a time line diagram showing transaction and settlement related processing, performed in a financial processing system, in accordance with one embodiment of the invention.

FIG. 18 is a time line diagram showing transaction and settlement related processing, performed in a financial processing system, in accordance with one embodiment of the invention. In this example, a back-office of a merchant processing system handles settlement processing for the particular merchant. The "back office" may be constituted by a suitable computer processor. The back office of the merchant initiates settlement processing by sending a settlement file containing tokens to the wallet. The wallet then passes the information contained in the settlement file on to Paymentech. Upon receiving the settlement file including the token information, Paymentech looks up the token information as well as the transaction information. Then, Paymentech updates the particular transaction record to reflect processing for settlement. Then, Paymentech prepares and sends a settlement file, with the appropriate account numbers, to the payment networks. As a result, the settlement files with the account numbers are sent on to the appropriate issuer. Such settlement request is received by the issuer and, in this example, approved by the issuer. As a result, the issuer generates a response to the settlement request. The response includes information regarding funding, i.e., an indication of a transfer of funds and/or credentials to effect the transfer of funds. Such response with funding is sent via the payment networks back to Paymentech. Payment tech then updates its transaction record to reflect that a response with funding information was received from the issuer and processed. Then, a response file is prepared and sent back to the merchant via the wallet. In addition, Paymentech may output further information to the wallet, such that the wallet may update its database based on such information.

It is appreciated that in some situations merchants may have the ability to submit transactions without first authorizing them. For example, this ability might be present in the situation of recurring payments and credits, for example. As a result, supporting such transactions may require de-tokenization during settlement. In other words, it is appreciated that in such situation, the processing of FIG. 18 may include a de-tokenization step.

Figure 19:
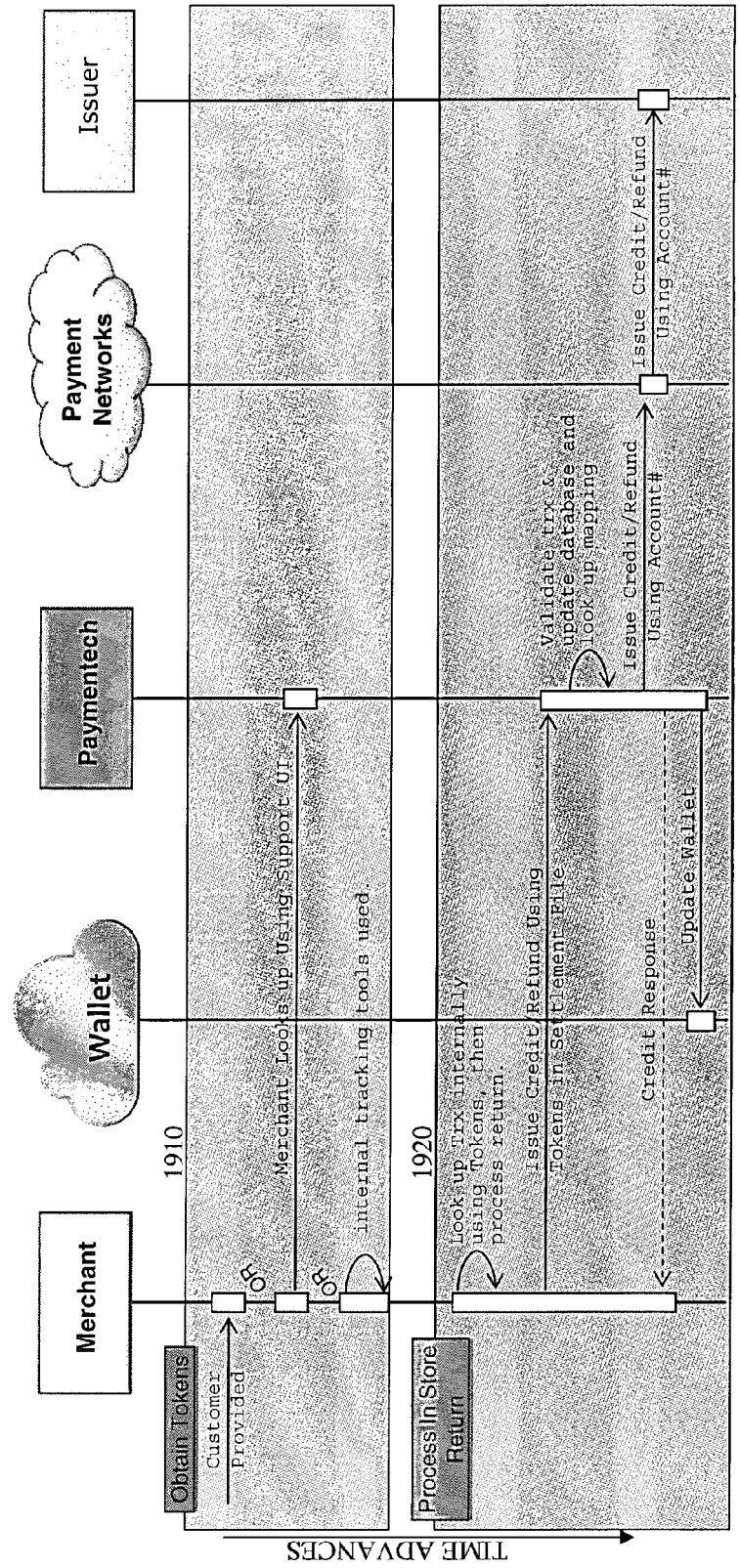
FIG. 19 is a time line diagram showing "return" related processing, performed in a financial processing system, in accordance with one embodiment of the invention.

FIG. 19 is a time line diagram showing "return" related processing, performed in a financial processing system, in accordance with one embodiment of the invention. More specifically, FIG. 19 illustrates processing that is performed subsequent to a customer requesting a return of a purchased item. In this example, the customer actually goes to a physical store of the merchant so as to request the return. As shown in FIG. 19, processing box 1910 illustrates that a first step in processing a return involves obtaining tokens related to the particular transaction, for which the return is requested. Tokens may be up determined in different ways. For example, the customer may herself provide the tokens. For example, the tokens may be disposed on a customer smartphone such that the smartphone may interface with the merchant system, so as to communicate the tokens relating to the transaction. Alternatively, the customer may provide other details of the transaction, so as to require the merchant to look up token information based on such other details of the transaction. In one embodiment, the customer might provide initial information such that the merchant looks up the token information using some type of support user interface (UI). Alternatively, the merchant may utilize some tracking tools that are internal to the merchant itself. It is appreciated that various methodologies may be utilized to secure the tokens that were used for a particular transaction based on information secured from the customer requesting the return.

Upon the merchant obtaining the particular tokens used in the transaction, the in-store return is then performed using the processing as shown in box 1920, of FIG. 19. Such processing includes the merchant looking up the transaction internally using the tokens in order to process the return. Then, the merchant issues a credit or refund using the tokens in the settlement file. As shown in FIG. 19, the merchant sends data regarding the credit or refund to the wallet, and in turn to the merchant acquirer (such as Paymentech). Upon receiving the data, Paymentech validates the transaction and updates its database including looking up all mapping information needed to process the in-store return. Payment tech then issues a credit/refund to the customer using the customer's a real account number. The issuance of such credit/refund is output from the Paymentech to the payment network, and in turn, output to the issuer. Subsequent to issuing the credit/refund, Paymentech outputs data to the wallet and in turn to the merchant reflecting the credit. Hand-in-hand with the output of such data to the wallet and a merchant, Paymentech may also output data dedicated to the wallet updating the records of the wallet.

The example above illustrates processing in the situation of an in-store return. It is appreciated that return processing may also be performed in the situation of a device initiated return. That is, returns can also be initiated from the customer's user device and may follow a similar flow to that described above. In one embodiment, one difference may be that the merchant would be involved, and the customer would be asked to ship the goods back to the merchant before the credit is issued to the customer. In one embodiment, the merchant would control this workflow and in most cases provide a shipping label or other item back to the customer. The transaction token might be embedded in such a shipping label. Accordingly, when the merchant receives the package, with the returned item, from the consumer—the transaction token is embedded in the shipping label—to kick off the process flow in a similar manner as the processing of box 1920 described above.

Figure 20:
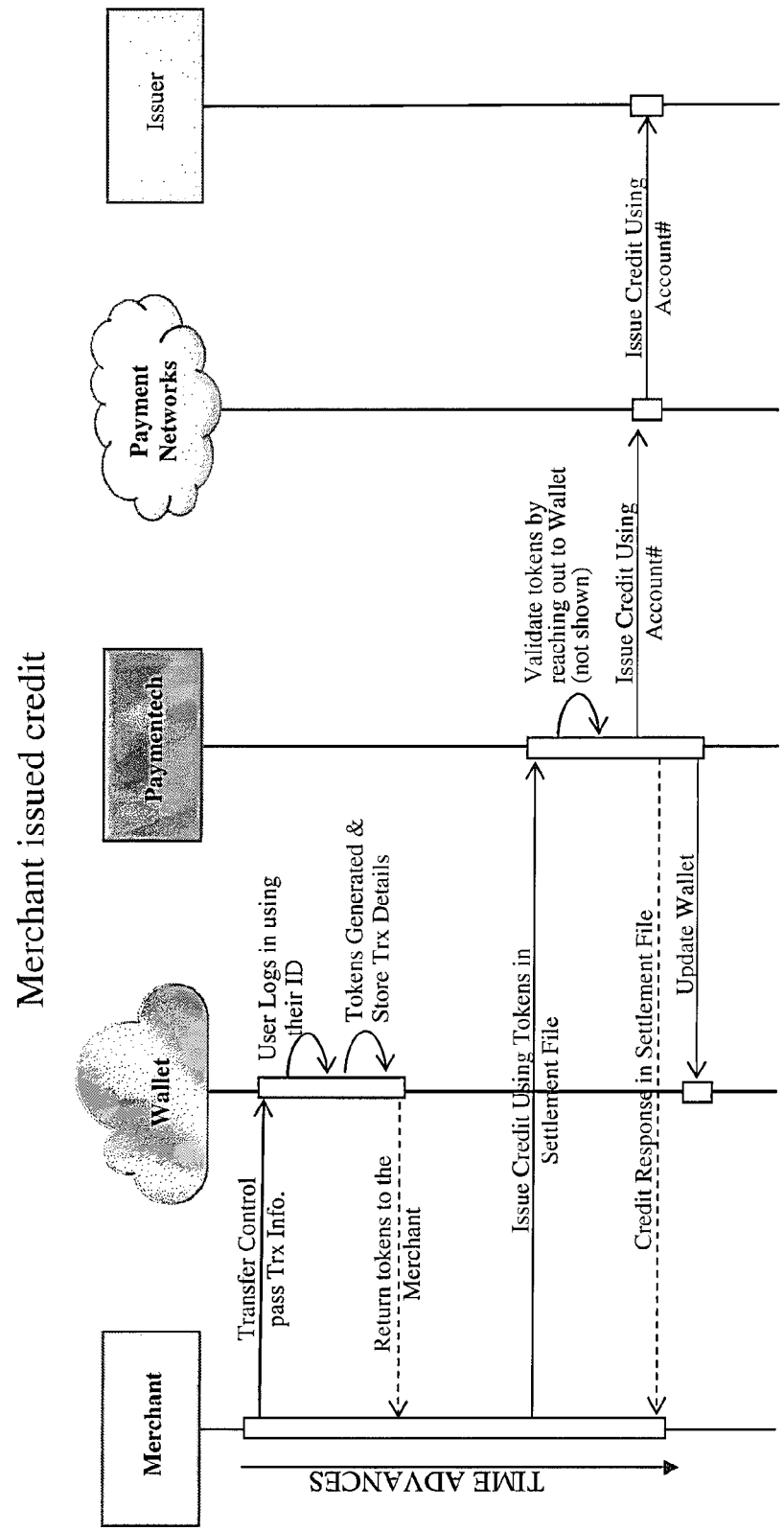
FIG. 20 is a time line diagram showing "credit" related processing, performed in a financial processing system, in accordance with one embodiment of the invention.

FIG. 20 is a time line diagram showing "credit" related processing, performed in a financial processing system, in accordance with one embodiment of the invention. In this embodiment, it is envisioned that issuance of a "credit" to the customer from a merchant requires a token. In this embodiment, such token is needed in order to look up the underlying payment product and in general be in harmony with the processing described above. In such credit processing, a merchant provides processing, within the particular application (app) of the merchant system, so as to allow the customer to request a credit. In one embodiment, requesting a credit would follow the authorization flow to gain customer approval for the transaction. Once approved, and the tokens generated, the transaction would flow to the issuer in the merchant's settlement file. Accordingly, the processing of FIG. 20, is initiated by the customer requesting a credit. Then, the merchant system passes control (of the processing) to the wallet in conjunction with passing the transaction information requesting the credit. Then, the wallet interfaces with the customer to log the customer into the wallet system using the wallet ID of the customer. The processing by the wallet continues by the wallet generating tokens and storing transaction details in the wallet database. Then, the wallet outputs the tokens back to the merchant system. The merchant then issues the credit for the customer using the tokens that were received from the wallet. Specifically, the merchant issues the credit using tokens in a settlement file. This data is output to the wallet, and in turn, output to Paymentech. Upon receipt, Paymentech validates the tokens by reaching out to the wallet (not shown in FIG. 20). Then, Paymentech issues the credit using the real account number of the customer. This credit is output to the payment network and turned to the issuer. Subsequent to issuing the credit using the real account number of the customer, Paymentech outputs a credit response in a settlement file to the wallet, and in turn back to the merchant. Further, Paymentech outputs data dedicated to updating the database of the wallet.

Various processing is described herein relating to a credit to a customer's account, a refund to a customer's account, and other related processing. In processing a credit or a refund, such processing of course constitutes funds flowing back to the customer. As a result, such processing (including the conversion between the transaction token and the real credentials) may be performed unilaterally without the customer's permission or input. In the situation of a "return," the customer is usually involved. In such situation, the processing may include looking up the original transaction information and identifying the particular transaction token. The refund may then be performed on that transaction token. In such situation, the merchant need not be privy to the account token—in that the account token may be mapped to based on the information in the transaction token.

In general, it is appreciated that various aggregation of data may be performed by any entity performing processing in conjunction with transaction processing, such as the wallet vault, the wallet, the merchant, the merchant acquirer, the issuer, and/or any other entity. In conjunction with such aggregation of data, various risk processing and other analytical processing may be performed. Accordingly, idiosyncrasies may be identified in the observed data—so as to identify fraud, money laundering, or other illegitimate practices.

Processing may be performed in the situation where the customer does not have receipt. Such processing is merchant dependent, in that the merchant may need to look up the transaction information in the system to identify the transaction, such as the transaction order number. Once the merchant finds the order number in the system, for example, the merchant then validates the customer. The merchant then retrieves the transaction token using the order number. The merchant may then submit the transaction token and/or the order number to their merchant acquirer so as to effect the refund.

In another scenario, the customer may have the particular merchant's app on the customer's phone. In conjunction with the effecting a transaction is described herein, the data representing each transaction may be downloaded to the customer's app, and presented to the customer in some suitable manner, such as a listing transactions. In such situation, the customer may select a particular item to manipulate. The customer might simply tap an item to obtain further information regarding a particular transaction. Related to the above, the customer may tap the particular item that the customer wishes to return, and designate such request in some suitable manner. Hand-in-hand, the customer might interface with the merchant system in some manner so as to convey the return request. A flow may then be presented to the customer so as to take the customer through the processing steps, to effect the return of the item, i.e. to effect the return process. If the customer is not at the physical store of the merchant, the return processing may trigger the generation of a shipping label, or some other item that is encoded with the appropriate information to return the item to the merchant, and subsequently associate that return with the appropriate information, including the appropriate tokens. In general, it is appreciated that various tracking, interfacing and communications may be utilized to coordinate payment/return processing with the physical return of an item.

Figure 21:
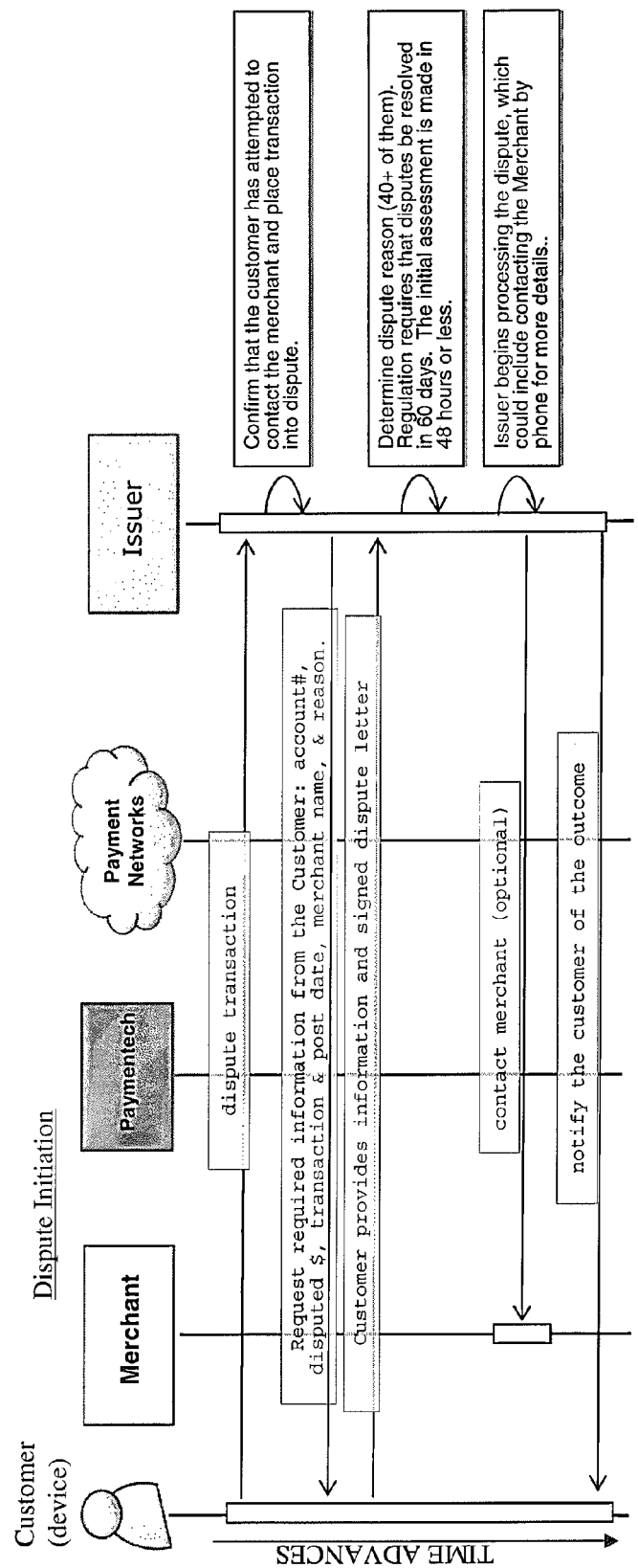
FIG. 21 is a time line diagram showing "dispute initiation" related processing, performed in a financial processing system, in accordance with one embodiment of the invention.

FIG. 21 is a time line diagram showing "dispute initiation" related processing, performed in a financial processing system, in accordance with one embodiment of the invention. Dispute processing is traditionally a heavily regulated process that requires detailed workflow tracking and engaged staff to communicate with customers and merchants. When a customer initiates a dispute the transaction amount is removed from her balance, pending the outcome of the dispute. The processing of the dispute may include fixed time periods to perform certain actions. In particular, issuers may be imposed a fixed amount of time to resolve the dispute. FIG. 21 shows processing by which parties in the financial system may process a dispute. In particular, issuers may work with a dispute as shown in FIG. 21 and described below. Alternatively, an issuer may opt to absorb the transaction amount to make the customer whole, i.e., the issuer may write off the charge.

As shown in FIG. 21, a dispute of transaction is initiated from a customer device, in this example. The dispute of transaction is then output through the merchant, Paymentech, and the payment networks, so as to be ultimately received by the particular issuer. Upon receipt by the issuer, in this example, the issuer first invokes processing to confirm that the customer has indeed attempted to contact the merchant, i.e., so as to resolve the dispute directly with the particular merchant. Accordingly, as shown in FIG. 21, the issuer may send a communication back to the customer (via the payment network, Paymentech, and the merchant). Such communication may request required information from the customer such as account number, the amount of the disputed transaction, the transaction data, the date that the transaction was posted, the merchant name, and the reason for the dispute. The request of such information may be integrated with a dispute letter to be filled out and signed by the customer. Other information may be requested and/or provided by the customer depending on the particular situation.

In response, as shown in FIG. 21, the customer provides information and the signed dispute letter, for example. Upon receiving such information, the issuer may perform further action items and processing. The issuer may then determine the reason for the dispute. It is appreciated that there may be a wide variety of reasons for dispute. Commonly imposed regulation requires that disputes be resolved in 60 days. The processing of FIG. 21 is envisioned to provide an initial assessment of the dispute in 48 hours or less. Upon determining the reason for the dispute and performing other initial processing, the issuer begins to process the dispute, which may include contacting the merchant for more details regarding the dispute. For example, the issuer may contact the merchant in the hopes of resolving the dispute in a phone call. Further to contacting and communicating with the merchant, further action items and processing is performed. Specifically, as reflected in FIG. 21, based on the information at the disposal of the issuer, the issuer comes to a determination regarding the disputed transaction. Subsequently, the issuer notifies the customer of the outcome of the determination.

The illustrative processing shown in FIG. 21 may be modified in a wide variety of ways to make dispute processing efficient and effective based on the particular situation. In one embodiment, the wallet may provide various help aides to assist both customers and merchants in the handling of a dispute. For example, the wallet may guide and assist customers/merchants by making guides available relating to the dispute process.

Figure 22:
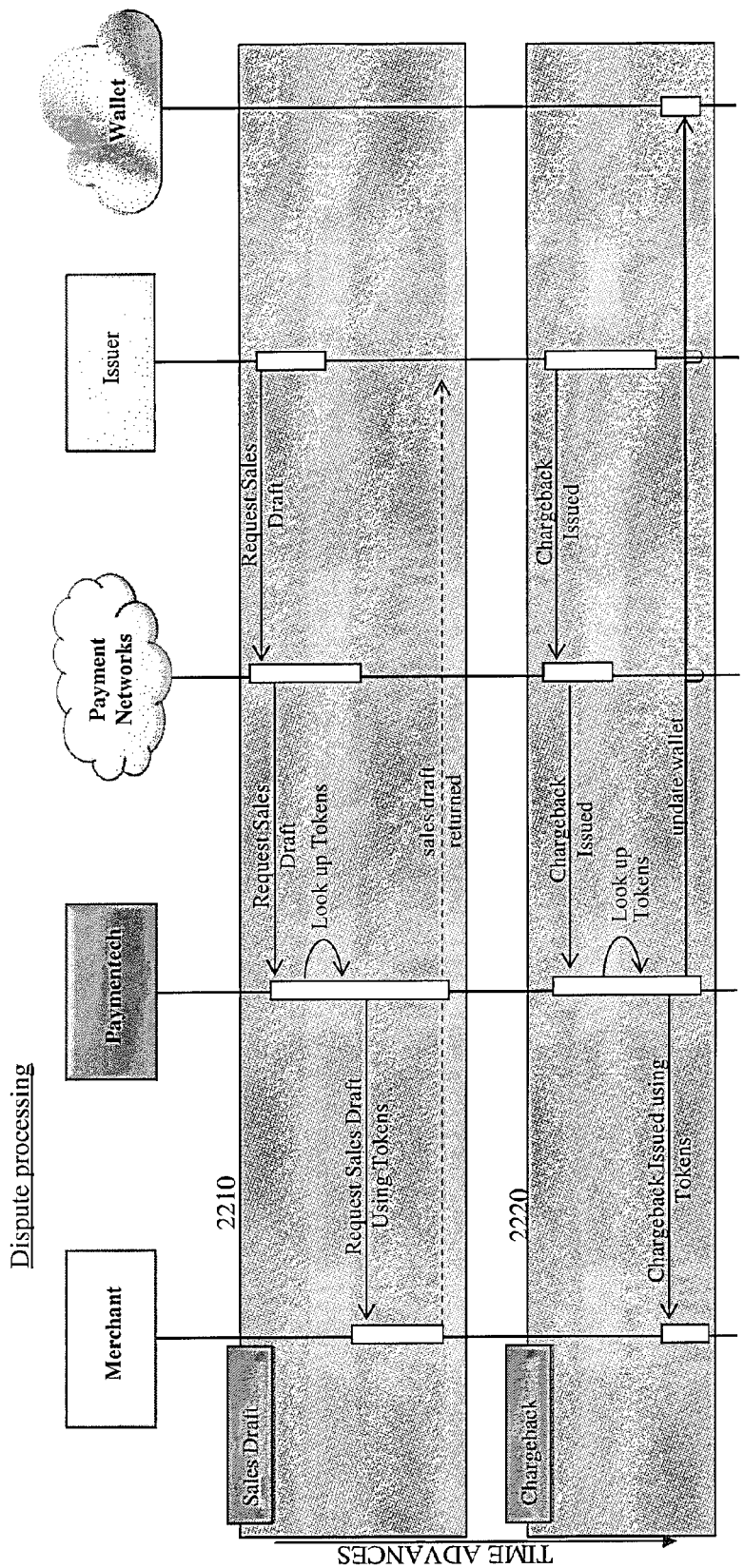
FIG. 22 is a further time line diagram showing "dispute processing" related processing (subsequent to dispute initiation), performed in a financial processing system, in accordance with one embodiment of the invention.

FIG. 22 is a further time line diagram showing "dispute processing" related processing (subsequent to dispute initiation), performed in a financial processing system, in accordance with one embodiment of the invention. In one aspect, dispute processing begins when the issuer, for example, requests a sales draft from the merchant and then issues a chargeback request through the payment networks. Once this process has run its course, the customer's account will be updated to remove the charge. Alternatively, the charge will be reinstated if the merchant proves the customer made the purchase and that the charge is appropriate.

The processing of box 2210 of FIG. 22 illustrates processing performed subsequent to an issuer requesting a sales draft from the merchant. Accordingly, the issuer prepares and sends a request for a sales draft. This communication is sent to the payment network, and then in turn to the merchant acquirer (Paymentech for example). Upon receiving the request for the sales draft, Paymentech accesses information regarding the transaction, including the particular tokens used in the transaction, and generates a communication to the merchant. The communication to the merchant includes a request of the merchant to provide the sales draft using the tokens. Upon receiving the request for the sales draft, in this example, the merchant generates the sales draft including related information. Then, as reflected in FIG. 22, the sales draft is output from the merchant to Paymentech, and in turn to the payment network, and in turn to the issuer. As a result, the issuer is provided with the sales draft information, such that the issuer may factor in such information in their decisioning regarding the dispute.

In this example, the issuer has indeed determined that the dispute is legitimate and, as a result, issues a chargeback to the customer. As shown in FIG. 22, upon the issuer issuing a chargeback communication, that communication is output to the payment network, and in turn output to Paymentech. Payment tech then looks up the tokens relevant to the issued chargeback. In other words, in this processing as well as other processing, Paymentech effectively transforms the real credentials (real transaction data) represented in the issued chargeback to front end credentials (token transaction data) represented in the form of tokens. Accordingly, Paymentech then issues the chargeback to the merchant using the tokens. Subsequent to outputting such communication to the merchant, Paymentech may also generate and output a communication to the wallet, such that the database of the wallet may be updated appropriately.

Figure 23:
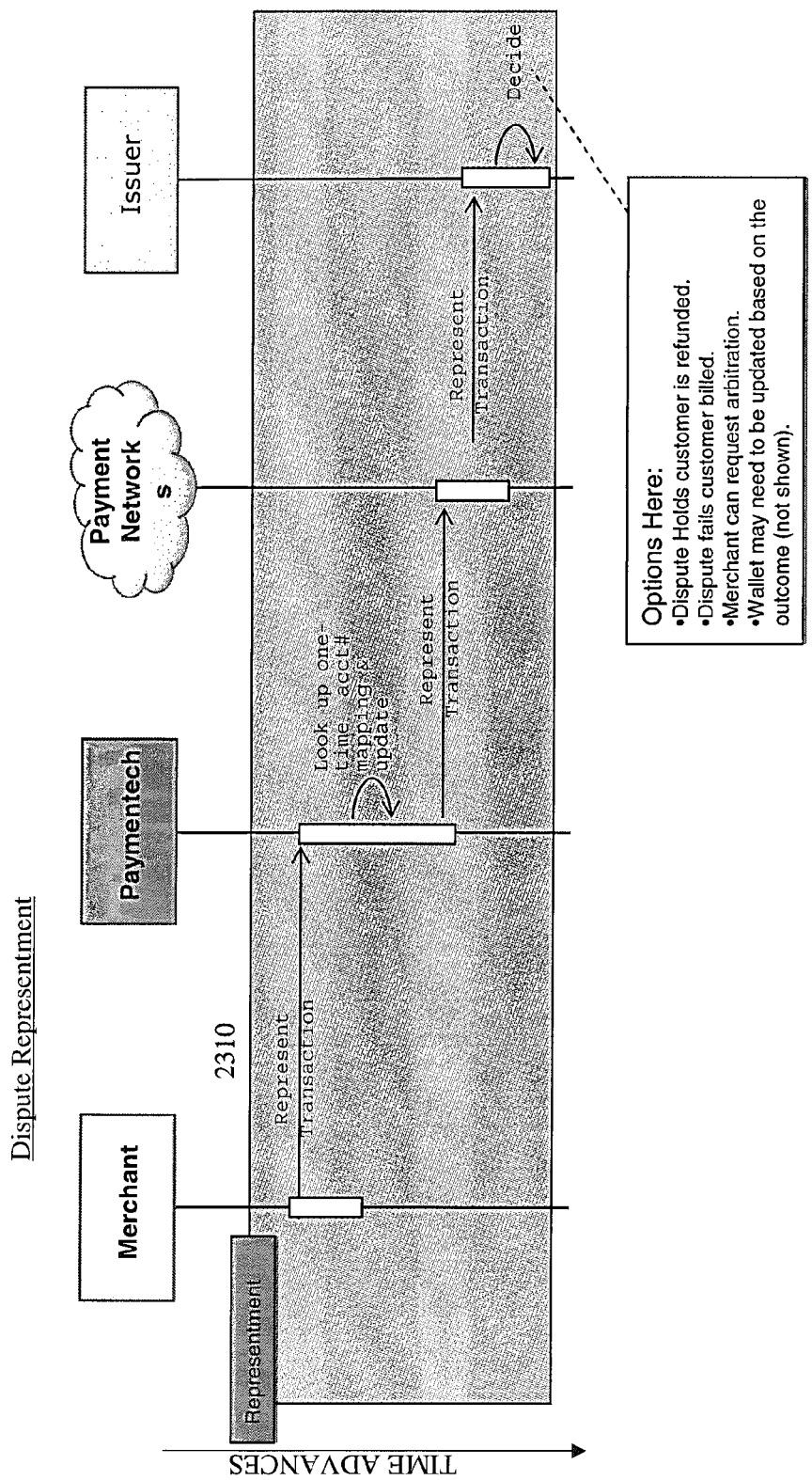
FIG. 23 is a time line diagram showing "dispute representment" related processing (subsequent to dispute initiation), performed in a financial processing system, in accordance with one embodiment of the invention.

FIG. 23 is a time line diagram showing "dispute representment" related processing (subsequent to dispute initiation), performed in a financial processing system, in accordance with one embodiment of the invention. FIG. 23 relates to the situation in which the particular merchant believes, based on information at the merchants disposal, that the customer did make the purchase and that the charges to the customer are appropriate. Accordingly, the processing of FIG. 23 reflects the situation in which the merchant, under the belief that the charges are appropriate, represents the transaction to the issuer. In such situation, the issuer takes up the transaction and updates the customer's account. Alternatively, the issuer may charge the transaction back again, and provide reasons to the merchant for such action. In some cases, such decisioning and processing may lead to an arbitration request being submitted.

Such representment is shown in the processing box 2310 of FIG. 23. As shown, the process is initiated by the merchant generating a "representment" of the transaction. The representment is output from the merchant to Paymentech. Upon receiving the representment, Paymentech maps the representment to the real transaction data. The representment is then output to the payment networks and on to the issuer. Based on the information in the representment, the issuer then performs decisioning regarding disposition of the transaction. Options may include that the dispute holds, and the customer is refunded; and/or the dispute fails, and the customer is billed. Depending on the outcome of the decisioning, the merchant or the customer may request arbitration. Related to the outcome of the decisioning, the wallet may be updated to reflect the disposition. It is appreciated that arbitration may utilize known approaches. For example, if the merchant or the merchant bank is in disagreement over the outcome reached by the issuer bank, they can request the particular charge be sent to arbitration. Arbitration may be in the form of a neutral third-party from VISA or MasterCard, for example, who will hear facts from both sides (such as the merchant bank and the issuing bank) and make a ruling. In many situations, the ruling may be deemed final. In similar manner, it is appreciated that decisioning and options to address a disputed transaction may also be implemented in a closed loop, merchant internal, bank internal, private label, or some other off—network process, i.e. off-line to VISA or MasterCard, for example. Suitable protocol and requirements may be implemented to resolve any dispute or other question action in a fair manner and so as to make the interested parties whole.

Various processing is described herein relating to tokenization, authorization, settlement processing, dispute processing, return processing, and various other related processing. It is appreciated that various mechanisms may be implemented to assist in such processing. For example, interested parties may collectively or individually provide assistance to both customers and participating merchants, for example. The customer service might include providing a call center to support the resolution of merchant transaction issues, technical issues, reporting issues, and various other related issues. Also, assistance may be provided in some effective manner to provide assistance relating to billing items, tokenization issues, and merchant integration issues, for example.

Figure 24:
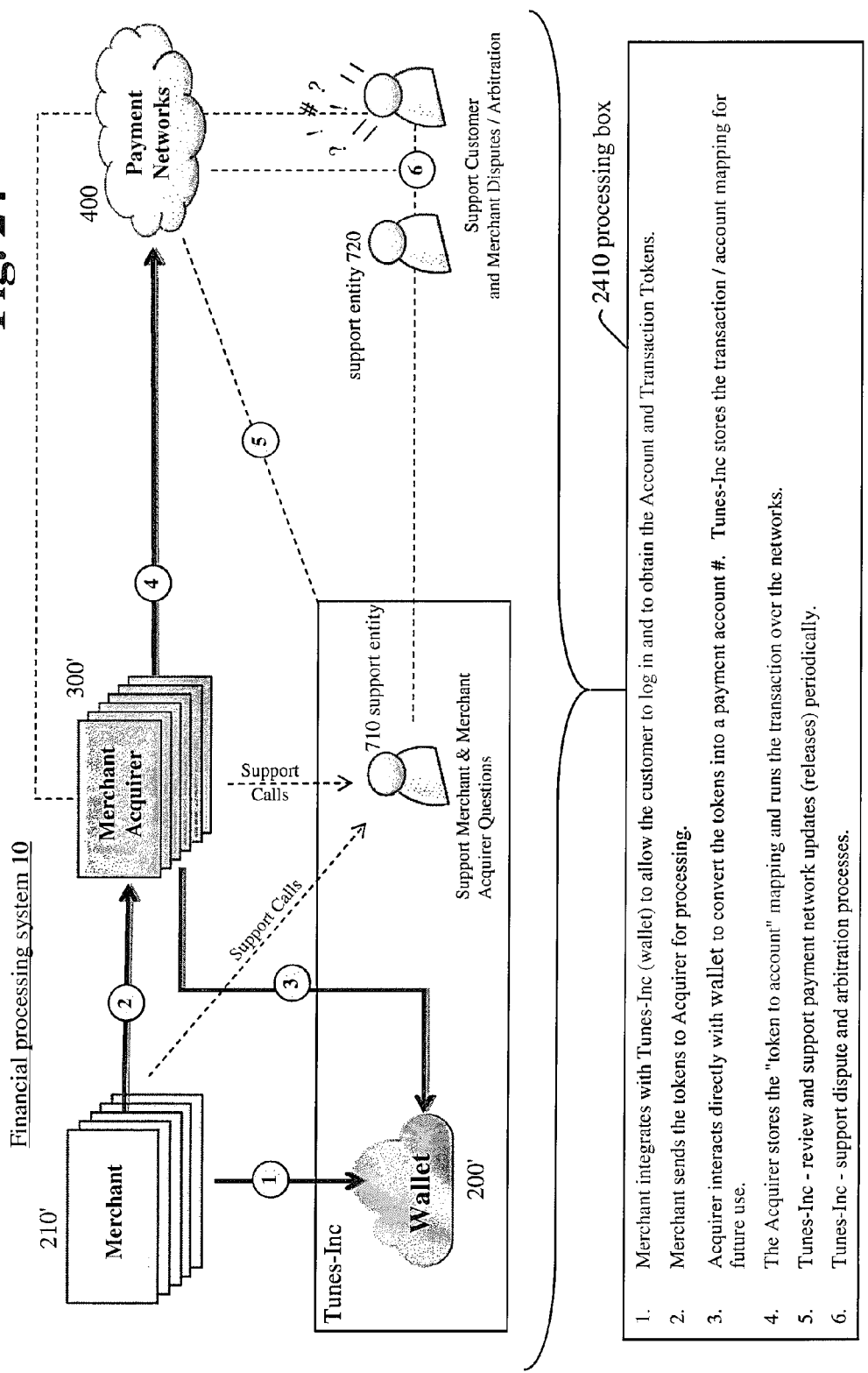
FIG. 24 is a diagram showing aspects of such integration model and related processing, in accordance with one embodiment of the invention.

In one integration model, merchants and their associated merchant acquirers (for example Paymentech as described herein) would integrate directly with the wallet. In such model, a merchant acquirers would perform the token translation processes and would utilize suitable support tools and call center support. FIG. 24 is a diagram showing aspects of such integration model and related processing in accordance with one embodiment of the invention. FIG. 24 shows various components of the financial processing system 10 including a wallet 200' (here TunesWallet maintained by Tunes-Inc), a merchant 210, a merchant acquirer 300', a payment network 400, as well as a support entity 710 and a support entity 720. The nature of the communications and processing between the various entities of FIG. 24 are reflected in the processing flow of FIG. 24 vis-à-vis processing box 2410 of FIG. 24.

As shown in step 1, in the system 10, a merchant integrates with the wallet (TunesWallet) to allow the customer to log in and obtain the account and transaction tokens. As reflected in step 2, the merchant sends the tokens to their merchant acquirer for processing. As reflected in step 3, the merchant acquirer interacts directly with the wallet to convert the tokens into a payment account number. That is, the merchant acquirer interfaces with the wallet to convert "token transaction data" to "real transaction data" and vice versa (as described above). As reflected in step 4, the merchant acquirer stores mapping information of the account (for example token to account mapping). Thereafter, the acquirer, using the real transaction data, runs the transaction over the payment network in the usual manner. That is, in this manner, the invention leverages and utilizes existing payment network infrastructure. Step five of FIG. 24 reflects that the wallet may be charged with review and support of payment network updates (releases) from time to time. Further, step 6 reflects that the wallet may support various processes relating to disputes and arbitration, for example.

Relatedly, as shown in FIG. 24, the support entity 710 may be provided to support merchant and merchant acquirer questions and other support items. Further, the support entity 720 may be provided to support customer and merchant disputes and arbitration. It is appreciated that of course various other support mechanisms may be implemented.

Figure 25:
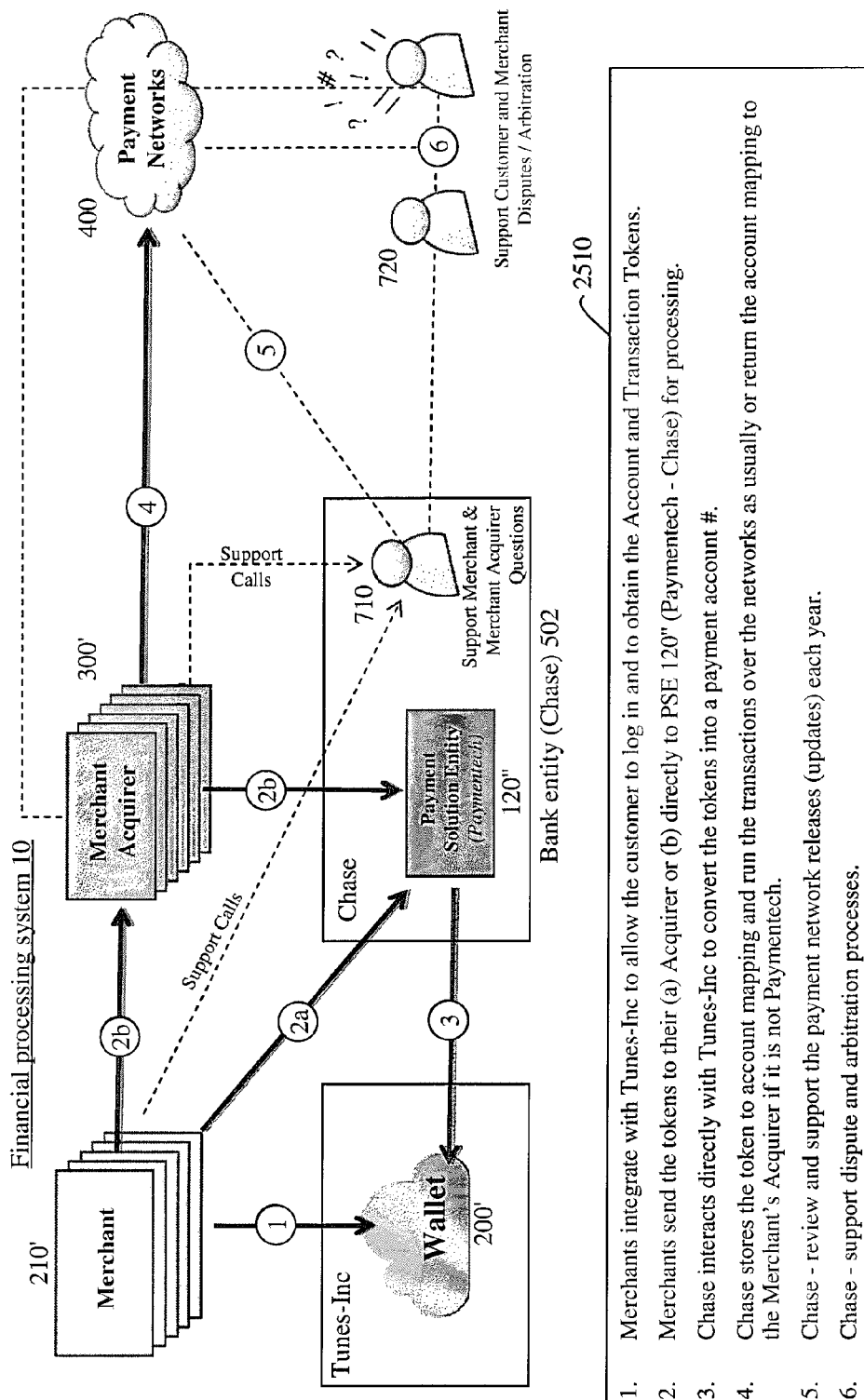
FIG. 25 is a diagram showing aspects of a further integration model and related processing, in accordance with one embodiment of the invention.

FIG. 25 is a diagram showing aspects of a further integration model and related processing in accordance with one embodiment of the invention. FIG. 25 shows various components of the financial processing system 10 including a wallet 200' (here TunesWallet maintained by Tunes-Inc), a merchant 210', a merchant acquirer 300', a payment network 400, as well as a support entity 710 and a support entity 720. In addition, as shown, the system 10 also includes a bank entity 502, such as JPMC. As described below, the bank entity 502 may include a payment solution entity 120". For example, the payment solution entity 120" may be constituted by a financial entity such as Paymentech. The bank entity 502 may also include the support entity 710, in one embodiment. The nature of the communications and processing between the various entities of FIG. 25 are reflected in the processing flow of FIG. 25 vis-à-vis processing box 2510 of FIG. 25.

As reflected in step 1, a merchant may integrate with the wallet (here TunesWallet) to allow the customer to log in to the wallet and obtain the accounting transaction tokens needed to effect the transaction. As reflected in step (2a), a merchant may send the tokens for a particular transaction to the merchant's merchant acquirer 300'. Alternatively, in this embodiment, as reflected in (2b) a merchant may send tokens (for a transaction) directly to the payment solution entity 120". The processing of step 3 of FIG. 25 reflects that the bank entity 502 may interact directly with the wallet 200' to convert the tokens into a payment account number i.e., to convert token transaction data into real transaction data. The processing of step 4 of FIG. 25 reflects that the bank entity 502 may store the (token to account) mapping and run the transaction over the payment network in the usual manner. Alternatively, the bank entity 502 might return the account mapping to the particular merchant acquirer 300'. In particular, such account mapping information might be returned to the particular merchant acquirer 300" if the payment solution entity is not affiliated with the bank entity 502. As reflected in the processing of step 5, the bank entity 502 may be charged with review and support of payment network updates (releases) from time to time. Also, as reflected in step 6 of FIG. 25, the bank entity 502 may support dispute related decisioning and processing, as well as arbitration processing.

Figure 26:
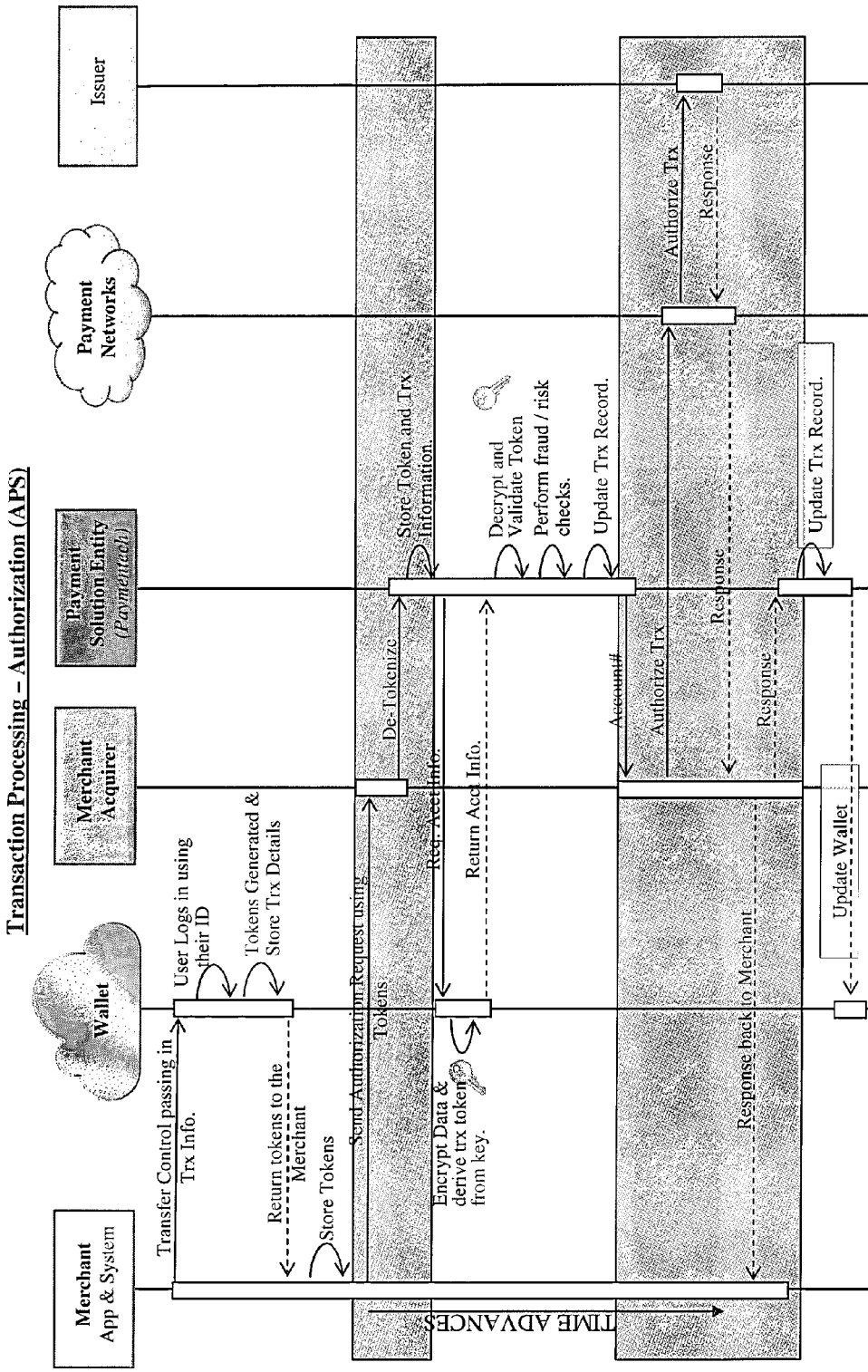
FIG. 26 is a time line diagram showing transaction and authorization related processing, performed in a financial processing system, in accordance with one embodiment of the invention.
Figure 27:
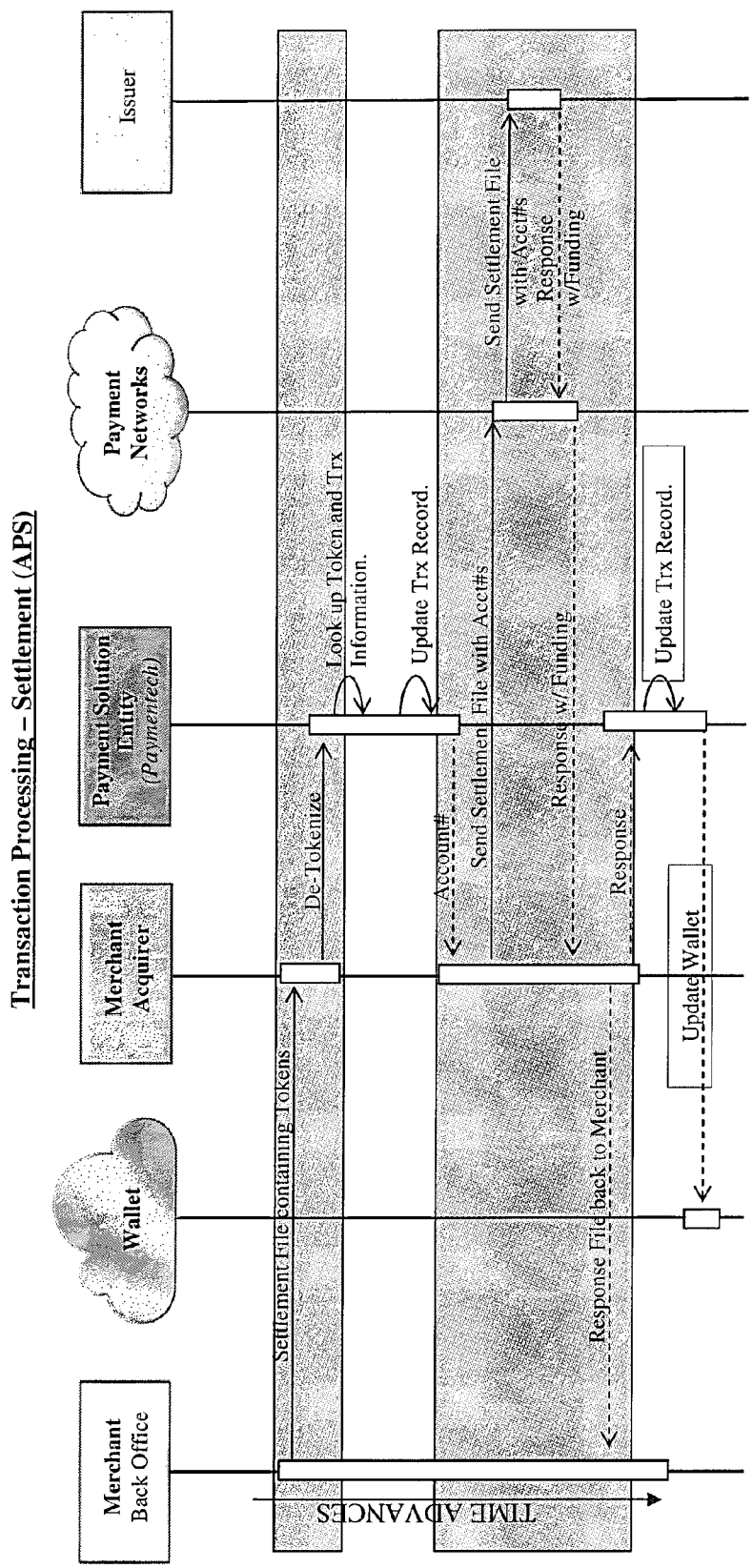
FIG. 27 is a time line diagram showing transaction and settlement related processing, in accordance with one embodiment of the invention.

In the model described above, a payment solution entity 120" (in the examples Paymentech) is interjected into the financial processing system 10 to handle various aspects of the processing. In particular, such payment solution entity handles the processing of a merchant acquirer. However, in other models, a payment solution entity (Paymentech) may be coupled with the processing of a merchant acquirer. FIGS. 26 and 27 show such an arrangement relating to authorization and settlement processing, respectively.

FIG. 26 is a time line diagram showing transaction and authorization related processing, performed in a financial processing system, in accordance with one embodiment of the invention. FIG. 26 is related to processing of FIG. 17. However, in FIG. 26, a merchant acquirer is interjected into the processing.

In the illustrative processing of FIG. 26, a transaction is initiated between a customer and a merchant. In this example, the merchant is constituted by an app, such as an app on the customer's mobile phone, as well as a merchant system sitting behind the app. As shown, upon initiation of the requested transaction, control in the processing is transferred to the wallet. The wallet logs the customer in using a suitable ID. Then, the wallet generates the tokens and stores transaction details. Then, the wallet returns the tokens to the merchant. The merchant system than stores the tokens in a suitable database. Then, the merchant sends an authorization request, using the tokens, to the merchant acquirer. Then, the merchant acquirer interfaces with the payment solution entity to de-tokenize the tokens that were received from the merchant. The payment solution entity than stores the tokens as well as the transaction information.

The payment solution entity then interfaces with the wallet via the merchant acquirer to request account information. In turn, the wallet encrypts data and derives a transaction token from a suitable key. The wallet then returns the account information to the payment solution entity. The payment solution entity then decrypts and validates the token, performs fraud and risk checks, and updates their transaction record. The payment solution entity then outputs an account number (i.e., real transaction data) to the merchant acquirer. The merchant acquirer then interfaces with the payment networks (and in turn the issuer) to authorize the transaction.

The merchant acquirer then receives a response from the issuer via the payment network. The merchant acquirer then interfaces with the merchant system to communicate the response (to the authorization request) back to the merchant. In addition, the merchant acquirer interfaces with the payment solution entity to communicate the disposition of the response. In turn, the payment solution entity updates their transaction record. Further, the payment solution entity interfaces with the wallet so that the wallet may update their transaction record.

FIG. 27 is a time line diagram showing transaction and settlement related processing, in accordance with one embodiment of the invention. FIG. 27 is related to processing of FIG. 18. However, in FIG. 27, a merchant acquirer is interjected into the settlement processing. In this example, a back-office of a merchant handles settlement processing for the particular merchant. The back-office may be in the form of a computer processing system. The back office of the merchant initiates the settlement processing by sending a settlement file to the merchant acquirer. The settlement file contains tokens for the particular transaction. The merchant acquirer then interfaces with the payment solution entity to de-tokenize the tokens received from the merchant. In response, the payment solution entity looks up the tokens, received from the merchant acquirer, and the related transaction information. Further, the payment solution entity updates their transaction record. Accordingly, the payment solution entity converts the token transaction data to real transaction data. Thereafter, the payment solution entity interfaces with the merchant acquirer to send the merchant acquirer the associated account number, i.e., the real transaction data.

Then, the merchant acquirer outputs the settlement file with the account numbers to the payment network. In turn, the payment networks forward the settlement file with the account numbers to the issuer. The issuer then processes the settlement in response by outputting funding information. The funding is output to the merchant acquirer via the payment networks. Then, the merchant acquirer interfaces with the merchant to provide a response file back to the merchant. Also, the merchant acquirer interfaces with the payment solution entity to communicate the response of the issuer to the payment solution entity. Then, the payment solution entity updates their transaction record. Further, in this example, the payment solution entity interfaces with the wallet such that the wallet may update their records.

It is appreciated that in one embodiment, merchants may be provided the ability to submit transactions without first authorizing those transactions. For example, this could be in the situation of recurring payments and credits. In order to support such processing, processing may be provided to de-tokenize during the settlement process.

Figure 28:
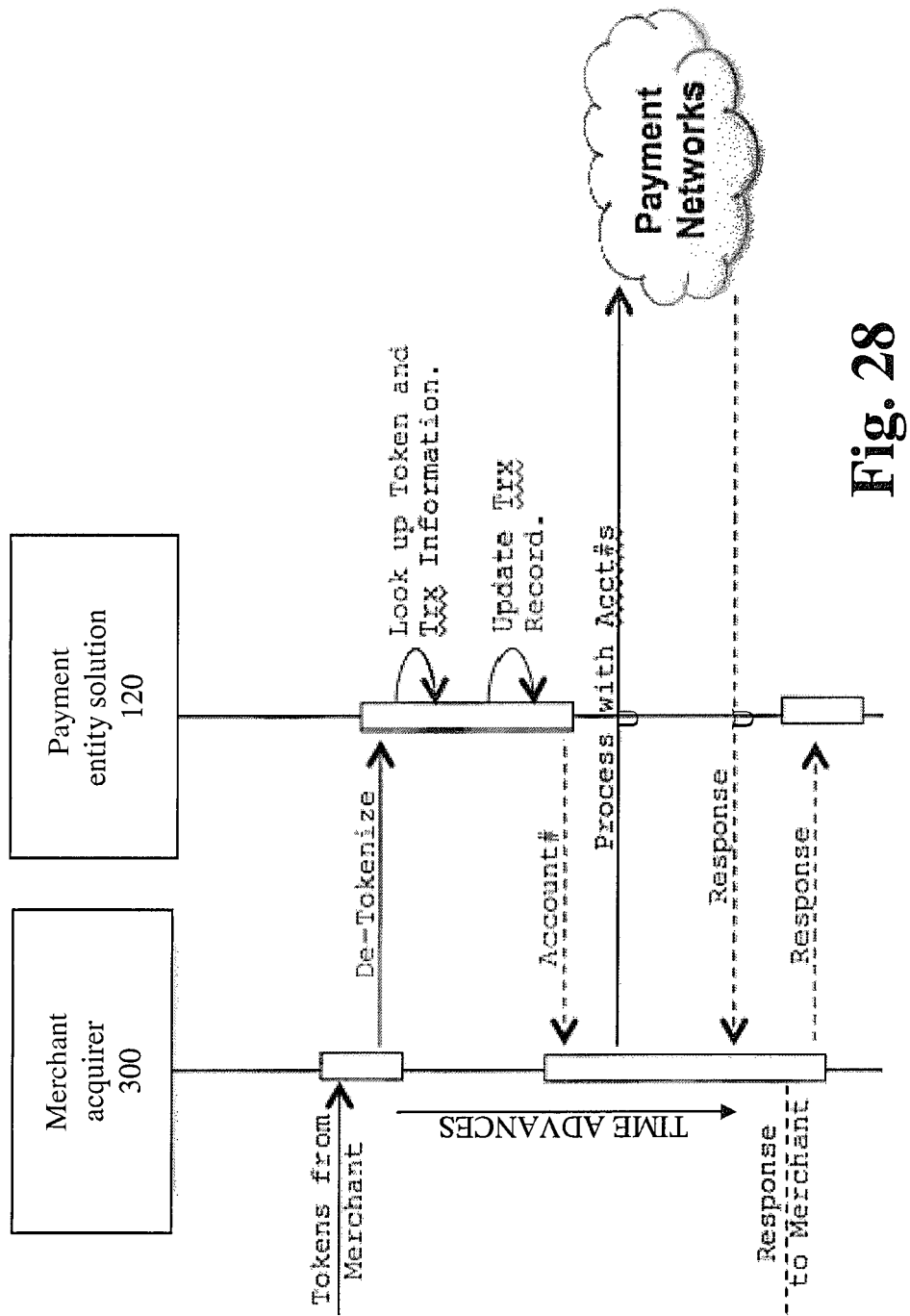
FIG. 28 is a time line diagram showing processing in which tokenization (to convert token transaction data to real transaction data) is not performed by the wallet, in accordance with one embodiment of the invention.

Related to the processing of FIGS. 26 and 27 described above, FIG. 28 is a time line diagram showing processing in which tokenization (to convert token transaction data to real transaction data) is not performed by the wallet, in accordance with one embodiment of the invention. Instead, such tokenization is performed by the payment solution entity 120. FIG. 28 shows that the merchant acquirer inputs tokens from the merchant, in conjunction with a transaction performed between a customer and the merchant. Upon receiving the tokens, the merchant acquirer outputs those tokens to the payment solution entity 120 for de-tokenization, i.e. to convert to real transaction data. Upon being input by the payment solution entity 120, the payment solution entity 120 looks up the token and transaction information. Further, the payment solution entity 120 updates the transaction record for that particular transaction. Thereafter, the payment solution entity 120 outputs the account number, i.e., the real transaction data, to the merchant acquirer. Then, the merchant acquirer generates and outputs a communication to the payment networks, and in turn the issuer, to process the transaction using the real transaction data. As shown in FIG. 28, a merchant acquirer receives a response back from the payment networks. The data reflecting the response is then converted back to tokenized data, i.e. token transaction data, and as shown in FIG. 28, the merchant acquirer interfaces with the merchant to output a communication (with the token transaction data) reflecting an authorization, in this example. Further, interfacing with the merchant, the merchant acquirer may also output a response to the payment solution entity 120 reflecting disposition of the transaction. Such communication will allow the payment solution entity 120 to update its records to reflect disposition.

Figure 29:
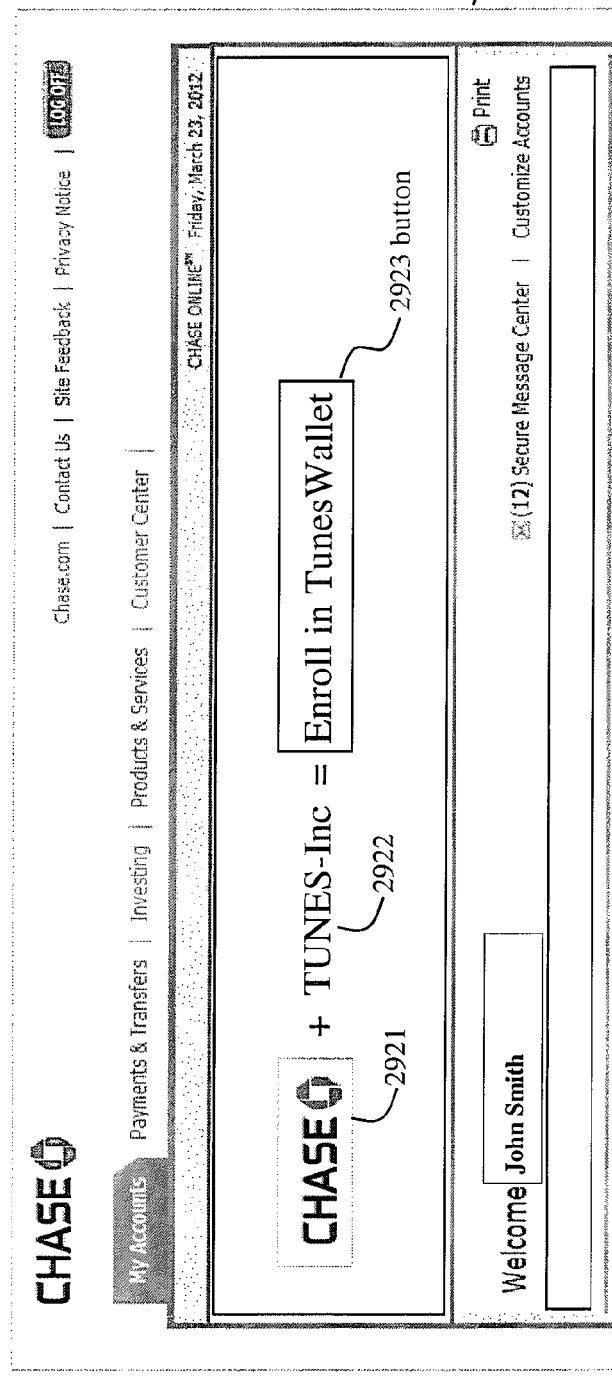
FIG. 29 is a GUI showing aspects of wallet enrollment, in accordance with one embodiment of the invention.

FIG. 29 is a user interface (GUI) 2920 showing aspects of wallet enrollment, in accordance with one embodiment of the invention. The customer might be presented with the GUI 2920 as a result of the customer clicking a suitable link on a webpage (not shown) that lists the accounts of the customer, for example. The customer, in accordance with embodiments of the invention, may be authenticated in any suitable manner such as using customer account information, wallet information, out of band processing such as contacting the customer via cell phone, authentication by verifying billing information, authentication using online credentials, or using any other information as desired, for example. The GUI 2920 may include a bank logo 2921 (here CHASE), the name 2922 of a particular company that maintains a wallet that is affiliated with the bank (here the fictitious music download company Tunes-Inc), as well as a button 2923 that the customer can push to indicate she wishes to enroll in the wallet affiliated with the company 2922 (Tunes-Inc). Here the wallet is denoted by the fictitious name "TunesWallet". It is appreciated that in this example, the wallet "TunesWallet" may generally be utilized as a payment mechanism for products and services associated with the company Tunes-Inc. Relatedly, it is appreciated that the TunesWallet may be associated with a proprietary points system that might be denoted by "tunes points" for example. As is known in the art, a customer might purchase a "tunes points" card from a grocery store, for example, for a certain amount of money, which provides for a certain amount of tunes points. Such is known, for example, in the context of an iTunes card offered by APPLE.

In this example, upon the customer selecting the button 2923, processing is performed to (push) the customer's CHASE credentials to the TunesWallet. As a result, the customer's CHASE credentials are thereafter affiliated with the customer's TunesWallet. More specifically, the customer's CHASE credentials are passed to the TunesWallet such that the CHASE credentials may be used for authorization and settlement of transactions performed by the customer. For example, it may be the situation that the customer's tunes points in her TunesWallet is depleted. In one embodiment, the customer is not required to replenish her tunes points, as would otherwise be the situation. Rather, processing is effected to instead utilize the customer's CHASE credentials so as to fund the particular purchase. It is appreciated that a wide variety of rules may be utilized to control whether the tunes points are utilized in a particular situation or whether the customer's CHASE credentials are utilized in a particular situation. Other decisioning may also be controlled by a suitable set of rules. The arrangement allows and facilitates seamless m-commerce (using a mobile phone for example), e-commerce (using a computer), and POS (point-of-sale) in terms of utilization of the customer's tunes points or CHASE credentials.

Relatedly, the invention provides for utilization of the TunesWallet for products and services above and beyond those specifically offered by the illustrative company Tunes-Inc. Indeed, in this embodiment, the invention provides for the customer to purchase items using her TunesWallet that are unrelated to those items offered by the associated company Tunes-Inc. For example, a customer may effect a transaction at a coffee shop that is totally unrelated to the products and services offered by Tunes-Inc. At the coffee shop, the customer effects the transaction utilizing her TunesWallet. The customer may be presented with the option, via a suitable user interface, to fund the transaction with either her tunes points or her CHASE credentials (real transaction data).

Accordingly, the invention provides for a customer's bank credentials (and bank accounts) to sit side-by-side a proprietary points system (here "tunes points") and to be selectively offered as an alternative funding system to effect desired transactions.

It is appreciated that the GUI 2920 and button 2923 illustrates one manner in which a bank system may interface with the customer to enroll that customer in a particular wallet. However, it is of course appreciated that there are various other methodologies to enroll a customer.

As also otherwise described herein, it is appreciated that the above processing in the context of the bank CHASE and the fictitious company Tunes-Inc and TunesWallet, are illustrative. Accordingly, the invention is not limited to such entities and may be utilized in a variety of corporate environments.

Figure 30:
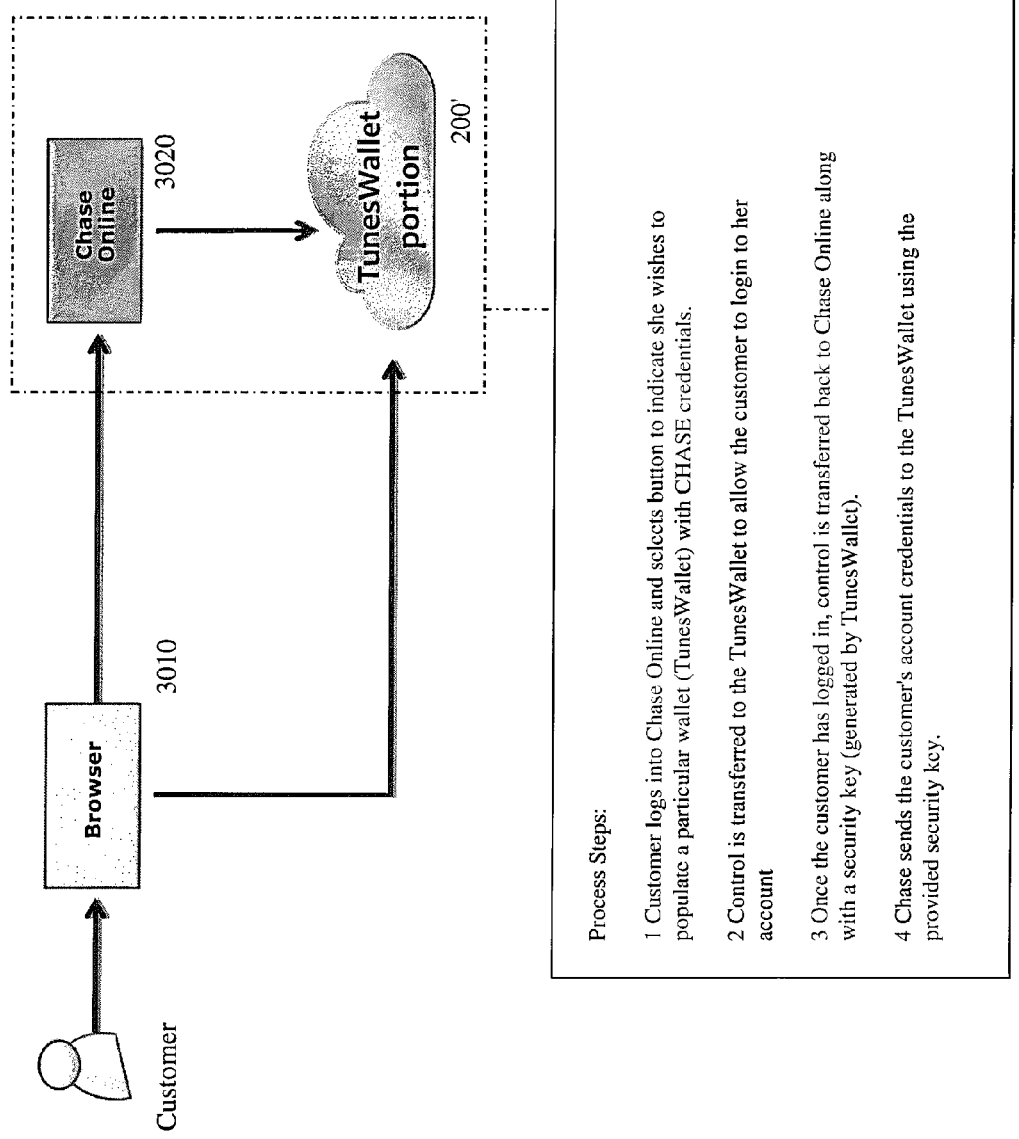
FIG. 30 is a block diagram and process flow showing further aspects of pushing credentials (of a customer) from a bank to a selected wallet, in accordance with one embodiment of the invention.

FIG. 30 is a block diagram and process flow showing further aspects of pushing credentials (of a customer) from her bank to a selected wallet, in accordance with one embodiment of the invention. In one embodiment, the customer might be presented with a GUI 2920 such as shown in FIG. 29. Upon the customer pushing the button 2923, various credentials of the customer are transferred from CHASE to the TunesWallet, for example.

Further aspects will hereinafter be described. The block diagram of FIG. 30 includes a browser 3010 (that interfaces with a human customer), a CHASE online processing portion 3020, and a "TunesWallet" processing portion 200'. Such portions perform various processing as shown in process flow 3002. Specifically, as reflected in the process flow 3002, a customer first logs into CHASE online, for example, and selects a suitable button to indicate that she wishes to populate a particular wallet with bank credentials. In this example, the customer wishes to populate her TunesWallet with her CHASE credentials. In one embodiment, the customer might be presented with a GUI 2920 as shown in FIG. 29, and select the button 2923. In response to such interface with the customer, CHASE online 3020 transfers control of the interaction to the TunesWallet portion 200'. The customer is then allowed to log in to her TunesWallet account. Then, in step 3 of FIG. 30, once the customer has logged in to her account, control is transferred back to CHASE online. Further, a security key, which is generated by the TunesWallet portion 3002, is output to CHASE online 3020. Upon CHASE online 3020 receiving the security key, CHASE online 3020 retrieves the customer's account credentials, and sends those account credentials to the TunesWallet portion 200' using the provided security key. Accordingly, in one embodiment of the invention, all the customer's CHASE payment products (such as credit and debit cards) are loaded into the TunesWallet portion 200' in a single action performed by the customer. Relatedly, it is appreciated that the customer may be presented with an option as to which credentials are output to the TunesWallet portion 200'. For example, upon the customer clicking the button 2923, the customer may be presented with a list of all the accounts of the customer. The customer might then be given the option to select which account she wishes to be loaded into the TunesWallet portion. For example, such selection might be performed using a suitable checkbox presentment.

As a result of the processing of FIGS. 29 and 30, as described above, the customer is able to affiliate a variety of accounts with that customer's TunesWallet. Accordingly, thereafter, any of such accounts may then be utilized to fund transactions through the customer's TunesWallet.

Figure 31:
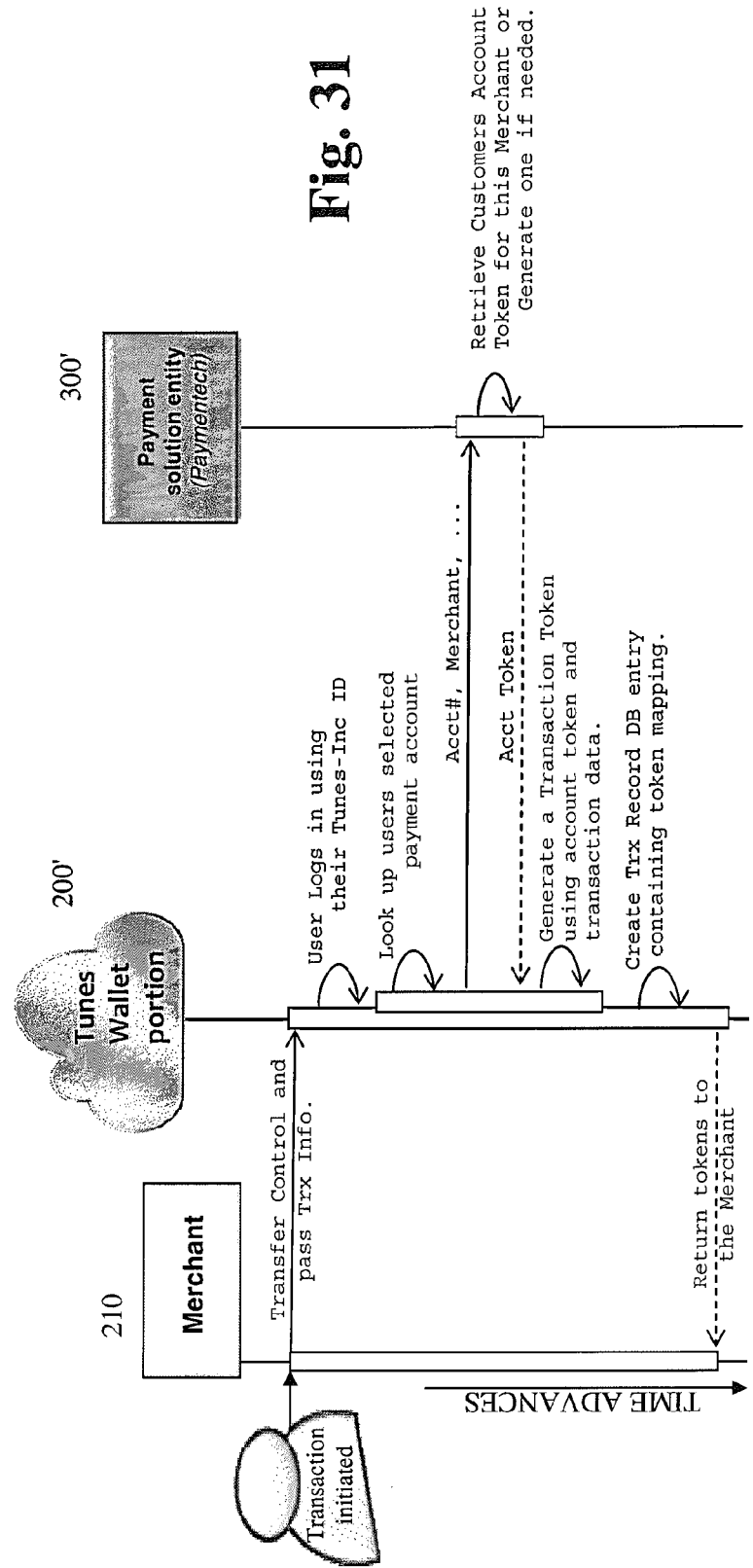
FIG. 31 is a time line diagram showing tokenization related processing, in accordance with one embodiment of the invention.

FIG. 31 is a time line diagram showing tokenization related processing, in accordance with one embodiment of the invention. More specifically, FIG. 31 illustrates an arrangement in which the storage and/or generation of the "account token" is performed by a separate entity vis-à-vis the generation of a "transaction token." In other words, the storage and/or generation of the "account token" is effectively outsourced to a third party, in this arrangement as shown in FIG. 1, outsourced to the payment solution entity 300'. Such arrangement serves to remove the wallet from various processing, so as to relieve any burden on the wallet. In particular, such arrangement may effectively remove the wallet from the transaction flow subsequent to the authorization processing, i.e., Such that the wallet would not need to deal with the refund or credit processing stream, for example.

The processing of FIG. 31 starts with the customer initiating a transaction. The merchant 210 then transfers control to the TunesWallet portion 200' in conjunction with passing transaction information. The TunesWallet portion 200' then interfaces with the customer to log the customer in to the TunesWallet using her Tunes-Inc ID, for example. Once the TunesWallet portion 200' logs the customer in, the wallet looks up the customer's selected payment account, i.e., the particular account that the customer selected at the merchant. Then, as reflected in FIG. 31, the TunesWallet portion 200' outputs the account number, the merchant information, as well as any other appropriate information, to the payment solution entity 300'. The payment solution entity 300' inputs such information and retrieves the customer's account token for the particular merchant. Alternatively, the payment solution entity 300' generates an account token for the customer for the particular merchant. The payment solution entity 300' then outputs the account token back to the TunesWallet portion 200'. Upon receiving the account token, the TunesWallet portion 200' generates a transaction token using the account token and the transaction data. Then, the TunesWallet portion 200' creates a transaction record database entry, which contains the token mapping. Then, the TunesWallet portion 200' returns the tokens to the merchant 210. As a result, the merchant is then in possession of the tokens to effect the transaction requested by the customer.

As described above, a user device may be utilized by the customer to effect payment processing. The user device may be constituted by any of a variety of electronic devices, such as a smartphone, for example. In one embodiment, the user device may be in the form of a multi-use device that handles the various transaction processing, as described herein, in addition to other processing and other tasks. For example, a user device adapted to handle the various described transaction processing may also be provided to hold/retain physical keys or electronic keys (such as a FOB) to open and start a vehicle. Further, the user device might be multi-use in that the device provides functionality to interface with other electronic devices such as electronic locks, alarm systems, and environment controls such as temperature controls, for example. For example, the user device may be provided to interface with a garage door opener. Relatedly, it is appreciated that the tokenization, i.e. the conversion between a token and a real credential is not limited to financial transactions. That is, in one embodiment, the tokenization as described herein may be in the context that the transaction is not a transaction for payment, but rather a transaction to a web enabled device, for example, to effect some type of action. The particular action might be the opening of a garage door or the control of some other device, for example.

Relatedly, any such automated processing may be coupled with requisite information that the customer provides. For example, in opening a car or paying for parking in a garage, the customer may be prompted to enter a password in conjunction with the automated processing. However, in other situations, a password or other credential may not be required. For example, in a toll road situation, password entry may be problematic. Instead, for example, the customer might simply be notified of the transaction, such as via e-mail. As a result, if the customer did not effect the transaction, then the customer can take appropriate action. In general, it is appreciated that related communications may be output and input from the customer in conjunction with processing. NFC communications may be used in conjunction with described processing.

Functionality may be provided in the rental car environment, for example. As the customer works with a rental agent, data is loaded on to the customer's FOB—so as to both allow the customer to start the rented vehicle as well as to provide the customer with any needed credentials in conjunction with operation of the rented vehicle. Instead of the customer interacting with a human rental agent, functionality may be provided to interface with the customer in some automated manner, such as via a kiosk.

In a further embodiment, the particular physical disposition of a person could dictate processing of a transaction. For example, the system could identify that a person is driving a car versus a passenger in the car. Based on such disposition, the system would identify that the person who pays is that person who is driver's seat, e.g. docked her cell phone in the driver's seat. Accordingly, the physical disposition of the person (and specifically the person's cell phone) dictates the particular credentials used to do a transaction. In general, the particular credentials allocated to a particular transaction may be dictated by particular attributes associated with the customer(s). Such decisioning may be performed by a suitable processing system. In particular, such decisioning may be performed by a wallet and/or wallet vault as described above. A further example includes a parking situation in which payment for the parking is controlled based on particular attributes. For example, the system may sense which person's keys (or FOB) are being used to operate the vehicle. Based on the credentials disposed in those particular keys, a desired transaction is effected. Thus, even though two potential payees are physically in a particular vehicle, the system knows to debit the persons account whose keys are currently engaged in operation of in the car.

In a further embodiment, rewards resulting from transactions could be allocated in some manner. The allocation of rewards may be performed by a suitable wallet. For example, rewards could flow to a particular store card based on the various particulars associated with that card. However, further peripheral rewards could be allocated based on use of the wallet vault in some manner. Such approach may be provided so as to not implicate an existing loyalty rewards program of a particular merchant, but rather allocate additional rewards so as to encourage preferred behavior of persons as to use of the wallet vault.

Figure 32:
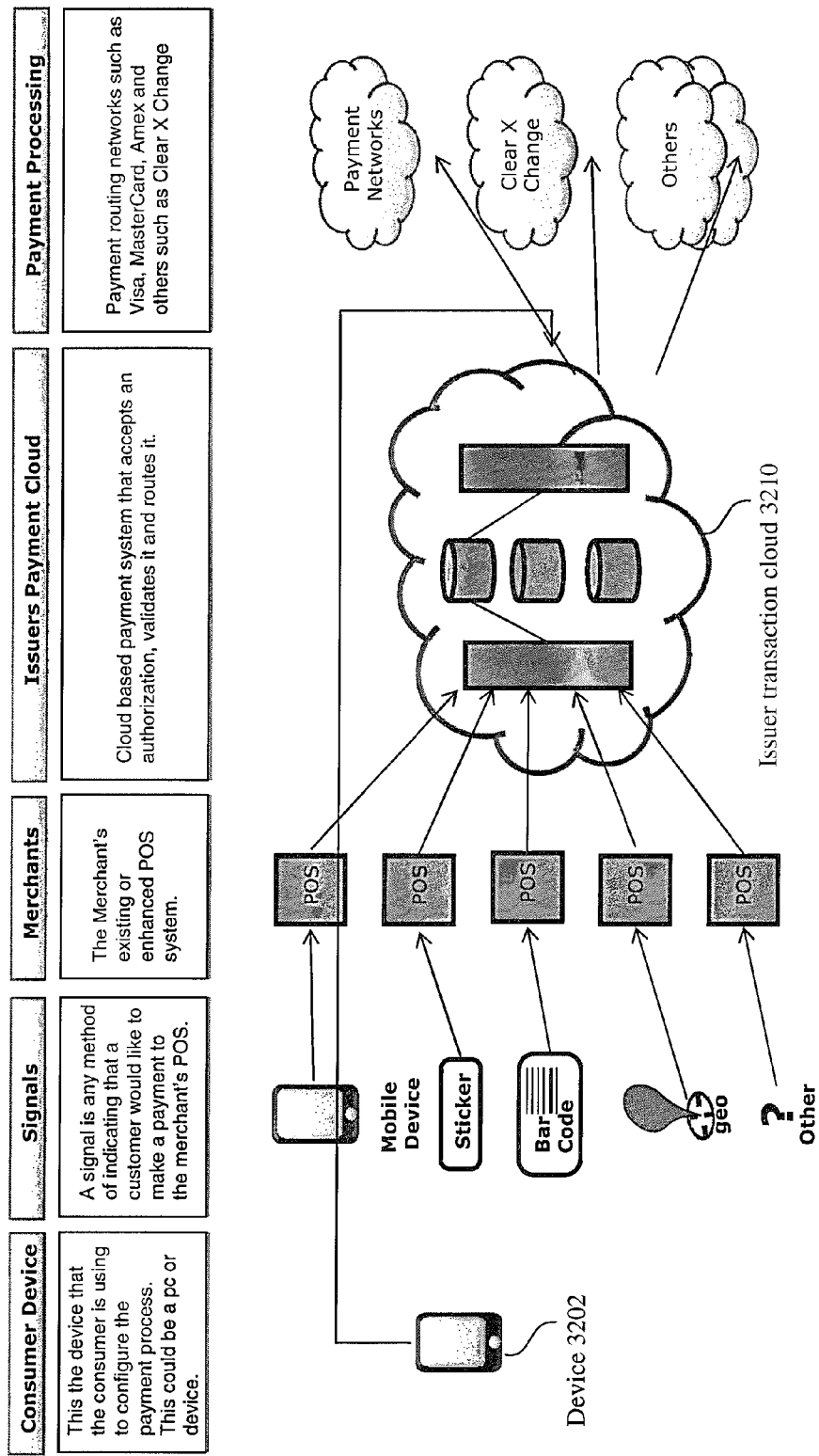
FIG. 32 shows a payment processing system in accordance with further aspects of the invention.

FIG. 32 shows a payment processing system in accordance with further aspects of the invention. In particular, FIG. 32 includes a user device 3202 used to configure a payment initiated by the customer. For example, the user device 3202 may include an electronic wallet or interface with an electronic wallet. Accordingly, the user device 3202 may leverage the various processing described above. The device 3202 might be in the form of a phone or web browser, for example, or other user device as described above. FIG. 32 further illustrates signals that are generated by the customer device and input by a merchant's point of sale (POS). Such a signal might be any method of indicating that the customer would like to make a payment to the particular merchant's POS. Such signals might include a tap on an icon on the user's phone, the reading of a sticker or barcode, the identification of a particular geographical location (geolocation), or other signal that is input from the customer's device to the POS. Accordingly, the customer is provided with a way to signal the POS for the requested transaction. The POS then sends that transaction into the issuer transaction cloud 3210.

In accordance with one embodiment of the invention, the issuer transaction cloud 3210 is a cloud-based payment system that accepts an authorization request for a transaction, validates the request, and routes the request on to an issuer entity, as well as performs other related processing.

To explain further, the issuer transaction cloud 3210 analyzes the credentials that were sent in with the transaction (via the signal to the merchant's POS) and then performs responsive to processing. The credentials might be in the form of a PAN and/or a token. The issuer transaction cloud 3210 analyzes that token, for example, so as to determine further processing of the transaction. For example, the issuer transaction cloud 3210 might convert the token (input with the transaction) to real customer credentials that are to be used to fund the transaction, such as the customer's real bank account number, i.e., as described above, the issuer transaction cloud 3210 may convert token transaction data to real transaction data. In other words, the issuer transaction cloud 3210 may map the token input with the transaction to a particular payment mechanism of the customer, i.e., the system "looks up" the account number of the customer. Such payment mechanism might be of various forms and associated with one of a number of financial entities. Accordingly, the processing in the issuer transaction cloud 3210 may include whether the payment mechanism of the customer is a CHASE account, a CITI account, or some other bank account. The processing of the issuer transaction cloud 3210 performs processing to route the transaction to the appropriate financial entity.

Accordingly, the issuer transaction cloud 3210 provides a routing mechanism to route the transaction to the appropriate financial entity and the appropriate customer account, i.e. payment mechanism, within that financial entity. Thus, the issuer transaction cloud 3210 may constitute essentially a consortium routing mechanism. Thus, once the issuer transaction cloud determines what financial entity the payment should be routed to, the issuer transaction cloud submits the transaction particulars to the appropriate payment network (VISA or MASTERCARD, e.g.) or to some other network—such as a private network or Clear X Change network, for example.

Accordingly, the issuer transaction cloud 3210 is interposed between the POS and the payment networks as shown in FIG. 32. The issuer transaction cloud 3210 initially receives the transaction and determines the best manner in which to forward that transaction on to the issuer of the customer's payment mechanism. The transaction might be forwarded via a payment network such as a VISA or MasterCard. On the other hand, the issuer transaction cloud 3210 might opt for other routing. For example, the transaction might be immediately routed to the issuer financial entity in a manner that avoids a payment network such as VISA or MasterCard. That is, so long as the transaction gets to the issuer for payment processing, it may be non-important the particular manner in which the transaction got there. Accordingly, the interposition of the issuer transaction cloud 3210 provides a layer of processing that might route a transaction so as to avoid the traditional payment networks, and as a result provide efficiencies and cost savings to the customer and the issuer bank, for example.

The routing as described above may use various particulars associated with the transaction. For example, the routing might include numerical indicia associated with the token, an account number that the token is mapped to, the customer's name, and/or other particulars.

Figure 33:
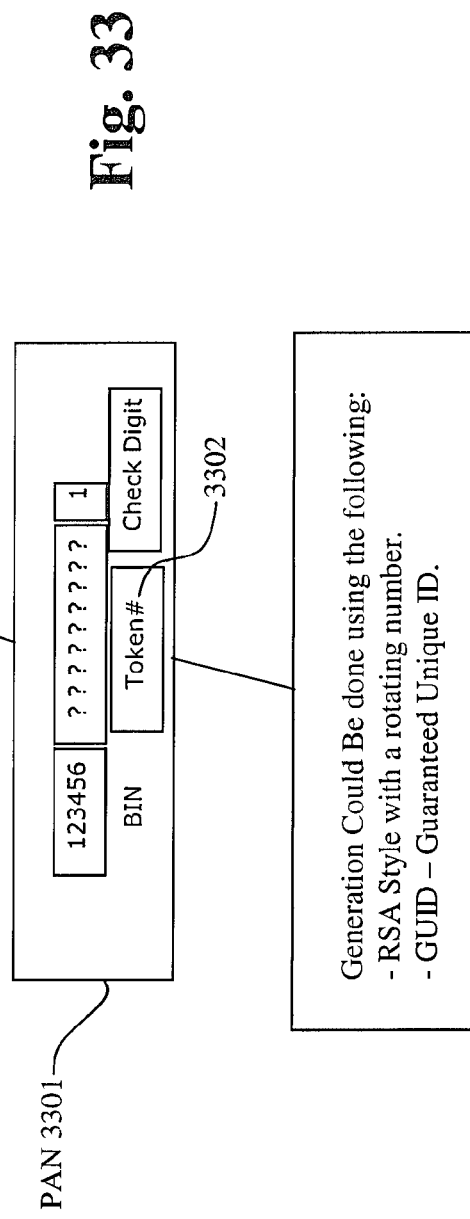
FIG. 33 shows a token, in accordance with one embodiment of the invention.

FIG. 33 shows a token in accordance with one embodiment of the invention. For example, the token of FIG. 33 might be utilized in the processing as described above. In accordance with one embodiment, a single use unique token creation process leverages a mathematical algorithm that allows a device to generate a Personal Account Number (PAN) 3301 in the format described below (and shown in FIG. 33) and then submit that PAN to the issuer over the payment networks (and/or issuer cloud 3210)—and the issuer is able to generate the matching number to validate that the transaction came from a valid device owned by one of the bank's customers.

To explain further, FIG. 33 shows a PAN 3301 (for use by the customer in effecting a transaction) that is constituted by a bin, a 9 digit token 3302 that is generated in some random manner (so as to generate a unique number), and a check digit to further provide for routing through the system. The PAN 3301 (and in particular the token 3302 within the PAN) may be provided to change every transaction, i.e., every time the customer uses it. As a result, the PAN may be used and transmitted via a publicly visible network, i.e., there are less concerns regarding using and losing such payment 3301 since a different token number (which makes up a portion of the PAN 3301) is generated for every transaction. The financial entity authenticating the PAN 3301 performs parallel processing vis-à-vis the customer device so as to generate a matching PAN 3301, or at least some portion of the PAN 3301. Generation of the token might be done using (1) an RSA Style with a rotating number, and/or (2) a GUID (Guaranteed Unique ID).

That is, the financial entity authenticating the transaction is provided with a matching algorithm (that matches the algorithm utilized by the customer device) that also generates the PAN 3301 (or some portion thereof) and compares that generated PAN 3301 with that received from the customer. The matching algorithms may utilize particulars of the context of the requested transaction. For example, the matching algorithms might utilize account particulars, customer device particulars, customer name, the time of the transaction, date of the transaction, the geographical location of the transaction, or other particulars. Accordingly, such particulars might go into the algorithm for building the token number or some other portion of the PAN 3301. Further, such particulars may be used in the routing of the transaction.

Accordingly, it is appreciated that the token generation process as described above and illustrated in FIG. 33 may be used in conjunction with the various processing described above. In one embodiment, the account token (see FIG. 14 for example) and the transaction token (see FIG. 15 for example) may be fully separate from the token 3302. In such embodiment, the token 3302 and associated PAN 3301 might be utilized for further authentication of a requested transaction. However, in other embodiments, there may be some interrelationship between the token 3302 vis-à-vis the account token and the transaction token. The interrelationship might be that the values of such tokens match in some manner. Alternatively, such interrelationship might be that the values do not match, but rather are related in some predetermined manner. Such interrelationship of the values might serve to legitimize a requested transaction, i.e., in that processing is performed to compare the values and confirm that indeed the values compare in some expected manner. For example, such processing might be performed by the user device, a wallet that is participating in the transaction, a wallet vault that is participating in the transaction, the merchant system, and/or some other processing system.

In accordance with embodiments of the invention, it is appreciated that tokens described herein, and use of such tokens, may be for multiple uses, i.e. to perform multiple transactions, or may be for a single transaction. Particular attributes of the token and the manner in which such particular token is processed within a processing system may dictate whether the token is for multiple uses or for a single transaction. Relatedly, it is appreciated that the particular environment in which the token is utilized may also affect whether the token is for multiple uses or whether the token is for a single use. For example, in the environment of a hotel, for example, it is commonplace to incur multiple charges. That is, charges might be incurred for the hotel room of the customer to stay in, a restaurant tab at the hotel venue, a bar tab at the restaurant venue, spa expenses and other expenses that go hand-in-hand with a stay at a hotel or other venue. Accordingly, processing of a transaction by a merchant acquirer, or other financial processing entity, may factor in the particular venue at which the transactions are effected. Decisioning may be built into the processing of transactions—so as to allow multiple charges at a hotel or other merchant at which multiple charges would be expected. As a result, a token which might constitute a single use token at one venue—may indeed constitute a multiple use token at another venue—due to the particular attributes associated with the venue and the manner in which those attributes are decisioned by the financial processing entity.

Another situation in which a single use token may be used more than once, is a situation in which a transaction does not go through, or there is some other problem with the transaction. In such situation, the processing may attach attributes to a token used in the transaction to reflect whether the transaction is successfully processed or not. For example, data may be disposed in a token (used in the transaction) that changes at a certain point in the transaction, e.g. at a point in the transaction at which the transaction is deemed to have been successfully processed. If such data has not changed, then such is indicative that the transaction has not been successfully processed, thus indicating that the token may be reused for another effort to process the transaction. On the other hand, if such data has been changed, then such is indicative that the transaction has been processed successfully, and thus the token may not be used again. It is appreciated that certain attributes of a token may trump other attributes. For example, with reference to the above description regarding venue, even if a single use token has been used to successfully process a transaction, that token might further be used in a particular venue. Various attributes and decisioning may be implemented as desired.

It is appreciated that the features described herein may be used in conjunction with various other technology.

The features described herein may be used in conjunction with the features described in U.S. patent application Ser. No. 12/489,066 filed Jun. 22, 2009 directed to "Systems and methods for remote ordering and payment", which is incorporated herein by reference in its entirety.

The features described herein may be used in conjunction with the features described in U.S. patent application Ser. No. 12/776,961 filed May 10, 2010 directed to "Systems and methods for mobile ordering and payment", which is incorporated herein by reference in its entirety.

U.S. patent application Ser. No. 12/776,961 describes various methodologies in the processing of various types of transactions relating to mobile ordering and payment. In particular, embodiments described therein relate to the manner in how a particular transaction comes into a mobile-payment processing portion. That is, sometimes a transaction may come in though a traditional point of sale cash register type device at a merchant, for example. Alternatively, sometimes a transaction may come in from two different areas, i.e., information for the transaction comes in from two or more sources (one of which might be the merchant). This information from multiple sources then is matched up in processing the transaction.

Such teachings relating to matching of transaction information (herein characterized as matching payment processing) may be utilized in conjunction with the teachings described herein. In one embodiment, with reference to FIG. 34, in payment matching processing, a payment app is disposed on the smartphone of a customer. The payment app includes a plurality of payment mechanisms, i.e., method of payments (MOPs) and provides various functionality as described below. In conjunction with performing a transaction, such as to purchase an item at a merchant, the customer selects a particular MOP to use for the transaction. The customer also secures information regarding the particular POS (i.e., a merchant terminal) at which the customer is purchasing the item. This information is then aggregated into a customer submission, and sent from the customer smartphone to a merchant acquirer, in accordance with one embodiment of the invention.

In parallel to such processing (performed by the payment app on the customer smartphone), the merchant also accumulates data for the transaction, which will be separately submitted to the merchant acquirer. Specifically, subsequent to the merchant ringing up the merchandise to be purchased (in a business as usual (BAU) manner), the cashier at the merchant swipes the particular "store payment card" on the POS terminal. The POS terminal then prepares a POS submission to transmit to the merchant acquirer. The POS submission may include the store payment card data, the POS terminal number, transaction data, as well as other data, as desired. In such processing at the POS, the transaction is processed in a BAU manner, except the processing is different—in that a store payment card (store payment card) is used in lieu of customer payment data. For example, the store payment card may possess a 16 digit card number and expiration date in the same manner as a customer's credit card. With the POS submission, such 16 digit card number/expiration date is output from the merchant POS terminal to the merchant acquirer in the same manner as is known to output a customer's credit card number/expiration date from the POS to the merchant acquirer. Further details are described below.

It is appreciated that various other data may be included in the customer submission and the POS submission, as desired. Such further data may be for the purpose of facilitating the matching of the customer submission with the POS submission, for reporting, and/or for alert notifications, for example.

As used herein, BAU (business as usual) means that such processing is performed using known technology, which may be varied, leveraged, or overlaid with novel processing as described herein. For example, with the ringing up of merchandise, such processing may of course be performed using any of a variety of known technology.

Figure 34:
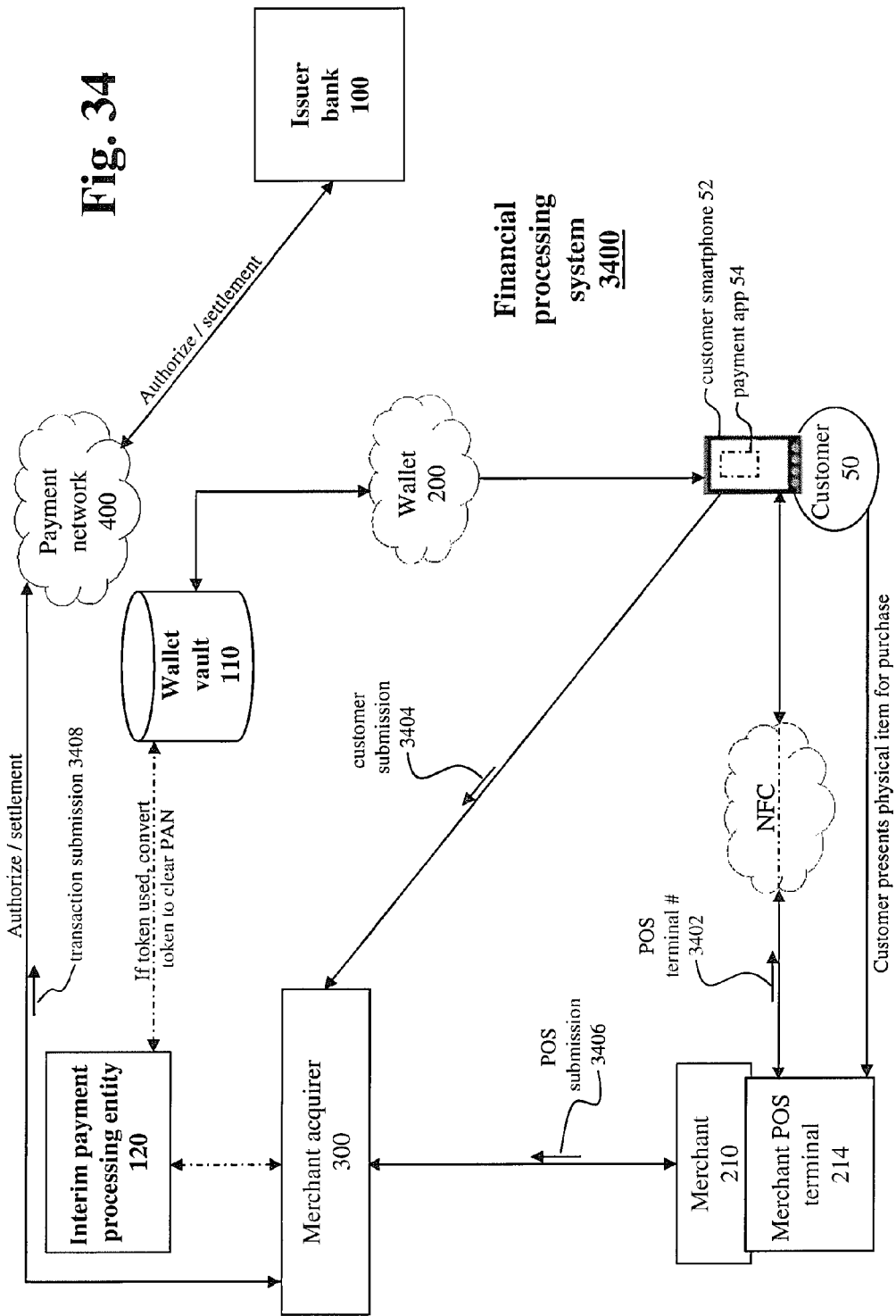
FIG. 34 is a block diagram showing a financial processing system that performs matching processing in accordance with one embodiment of the invention.

FIG. 34 is a block diagram showing a financial processing system 3400 that performs matching processing in accordance with one embodiment of the invention. The system 3400 includes an issuer bank 100, a wallet vault 110, an interim payment processing entity (IPPE) 120, a wallet 200, a merchant 210, a merchant acquirer 300, and a payment network 400. The merchant 210 is associated with a merchant terminal 214. Each of such components includes a computer processer to perform the processing as described herein. The system also shows a customer smartphone 52 that includes a payment app 54. The customer smartphone 52 is associated with a human customer 50. The payment app 54 is in the form of a processing module disposed in the customer smartphone 52. Any suitable communication channels may be used to provide communication between the components of FIG. 34, including those communication channels described herein including internet communications, NFC (near field communication), and/or WIFI, for example. In particular, NFC may be utilized to provide communication between the merchant 210 and the customer smartphone 52. As further described below, the customer smartphone 52 interfaces with the merchant 210 in conjunction with the customer 50 purchasing an item.

The embodiment of FIG. 34 may utilize the wallet and wallet vault processing as described herein. In particular, in conjunction with performing a transaction, the customer smartphone 52 may interact with the wallet 200 to secure a transaction token to effect the desired transaction. However, the matching payment processing described herein may also be used with other MOPs, such as a standard credit card with clear PAN, for example.

Figure 35:
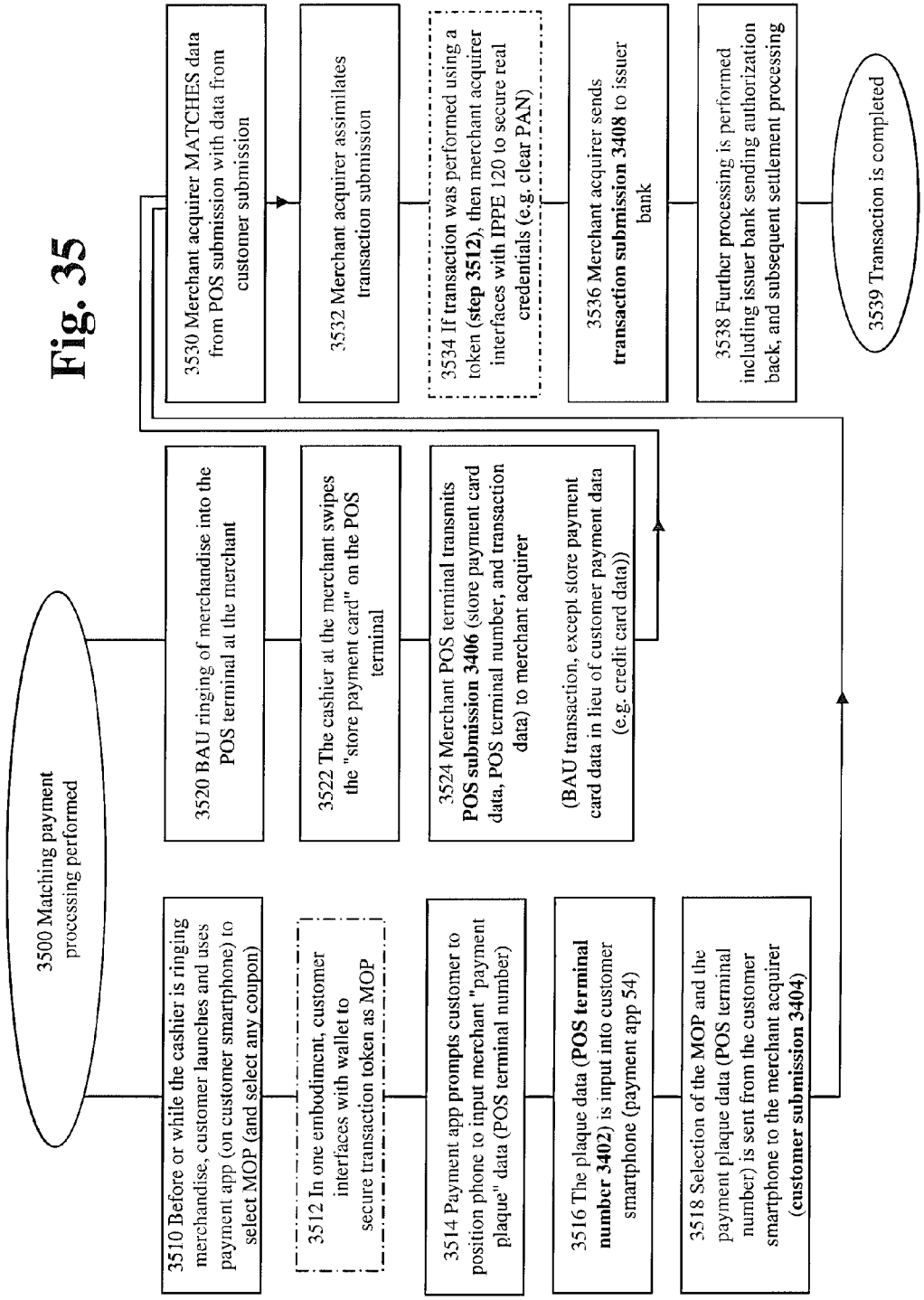
FIG. 35 is a flowchart showing "matching payment processing" in accordance with one embodiment of the invention.

FIG. 35 is a flowchart showing "matching payment processing" in accordance with one embodiment of the invention. As shown, the processing starts in step 3500 and passes to step 3510. In step 3510, before or while the cashier is ringing up merchandise, the customer launches a payment app 54 on the customer smartphone 52. The customer then interfaces with the payment app to select a particular MOP. In addition, the customer may select any applicable coupons or other promotional items that the customer wishes to use for the particular transaction. Then, the process passes to step 3512. Step 3512 reflects a situation in which the customer interfaces with the wallet 200 to secure a transaction token which will constitute a MOP, as described in detail herein. However, as noted above, the matching payment processing need not be performed utilizing a transaction token. Rather, the customer might alternatively use a standard credit card with clear pan, for example.

Then, in step 3514, the payment app 54 prompts the customer to position her phone so as to input merchant information. In one embodiment, the merchant information may be in the form of a payment plaque from which the customer's phone reads data. In particular, the customer's phone reads a POS terminal number from the payment plaque of the merchant, in accordance with one embodiment of the invention. The payment plaque might be in the form of a bar code that the customer smartphone 52 reads. However, it is appreciated that any suitable communication channel might be utilized to convey the merchant information, and in particular the merchant POS terminal number, from the merchant terminal 214 to the payment app 54 (disposed in the customer smartphone 52). Step 3516 illustrates that the payment plaque data (i.e. the POS terminal number 3402) is input into the payment app 54.

Then, in step 3518, the customer selection of the MOP and the payment plaque data (POS terminal number) is sent from the customer smartphone to the merchant acquirer. Such communication constitutes a customer submission 3404 as illustrated in FIG. 34.

In the parallel to the processing described above relating to the payment app 54 in the customer smartphone 52, processing is performed in the merchant POS terminal 214 as reflected in steps 3520-3524 of FIG. 35. Specifically, step 3520 reflects a business as usual ringing up of merchandise into the merchant POS terminal 214 at the merchant. Then, the process passes to step 3522. In step 3522, the cashier does not swipe the customer's card, as occurs in a standard transaction. Rather, the cashier at the merchant POS terminal 214 swipes a specifically suited "store payment card" on the merchant POS terminal 214. Accordingly, the same store payment card is swiped, by the merchant worker, for different customers. Then, the process passes to step 3524. In step 3524, the merchant POS terminal 214 transmits a POS submission 3406 to the merchant acquirer 300, as reflected in FIG. 34. In this embodiment, the POS submission 3406 includes the store payment card data, the POS terminal number, and the transaction data. The transaction data might include the amount of the transaction and the date/time of the transaction, for example.

Accordingly, the POS submission sent from the merchant POS terminal 214 to the merchant acquirer 300 is the same as a "business as usual" transaction, except that store payment card data is included in the POS submission 3406 instead of data from a customer's credit card, for example.

After the parallel processing of steps 3510-3518 and 3520-3524, the processing passes to step 3530. In step 3530, the merchant acquirer matches data from the POS submission 3406 (from the merchant) with the data from the customer submission 3404 (from the customer). Such matching may be performed using various attributes of the transaction, as those attributes are described herein. For example, the merchant acquirer might match the merchant submission with the customer submission based on the POS terminal number, the amount of the purchase, and the date/time of the purchase, for example. Then, in step 3532, the merchant acquirer simulates a transaction submission for output to the appropriate issuer bank 100.

As described above, it may be the situation that a payment token was received (by the merchant acquirer 300) from the customer, rather than a standard credit card number, for example. In such situation, the merchant acquirer 300 may interface with the IPPE 120 so as to obtain real credentials that correspond with the token received from the customer. In turn, the IPPE 120 may then interface with the wallet vault to secure the real credentials and provide those real credentials back to the merchant acquirer 300. Alternatively, in some embodiments, the merchant acquirer 300 might interface directly with the wallet vault 110 so as to convert the token (received from the customer) to the real credentials of the customer. In other embodiments, the merchant acquirer 300 (or some other entity) may receive both the POS submission and the customer submission, and in addition convert a token in the customer submission to real credentials.

Then, in step 3536, the merchant acquirer 300 sends a transaction submission 3408 to the issuer bank 100. Step 3538 of FIG. 35 reflects the further processing that is performed including the issuer bank forwarding back authorization for the particular transaction. Further, it is appreciated that various settlement processing may subsequently be performed in completion of the particular transaction. In step 3539, the transaction is completed.

Accordingly, in the processing described above, in accordance with some embodiments of the invention, the customer's payment credentials are never forwarded to the merchant or through the merchant system. Rather, the customer's payment credentials are sent directly from the customer's device (the customer smartphone 52, for example) to the merchant acquirer 300. Thus, the merchant acquirer receives data from both the customer and the merchant, and essentially "marries up" such respective information. The processing of FIG. 34 may of course utilize cloud computing technology. The processing of FIG. 34 might use the POS terminal number as described, or any other information to identify the particular terminal and/or the particular merchant at which the transaction is taking place. Also, it is of course appreciated that the processing of FIG. 34 is not limited to the purchase of a physical item. For example, such processing may be used in the situation of a purchase over the Internet or via telephone call. In such processing, the online merchant would forward the POS terminal number to the customer in some suitable manner.

It is appreciated that the situation might occur in which either the POS submission 3406 or the customer submission 3404 does not make it to the merchant acquirer 300. In such situation, in one embodiment, the processing performed by the merchant acquirer 300 may include the merchant acquirer 300 generating and forwarding a communication in an attempt to cure the deficiency. For example, if only the customer submission 3404 is successfully received by the merchant acquirer 300, then the merchant acquirer 300 has the merchant information—such that the merchant acquirer 300 may send a communication to the merchant querying the merchant regarding the transaction. On the other hand, if only the POS submission 3406 is received by the merchant acquirer 300, supplemental and/or alternative processing may be initiated. For example, the merchant acquirer 300 might send a communication to the merchant POS terminal 214 asking for the merchant to secure customer contact information. Once this information is secured by the merchant terminal 214, and sent to the merchant acquirer 300, the merchant acquirer 300 might then reach out to the customer 50 with a suitable communication—to resolve the deficiency.

As noted above, it is appreciated that the processing of FIG. 34 might be performed with another entity in the place of the merchant acquirer 300. For example, the IPPE might replace the merchant acquirer 300. In such situation, the POS submission 3406 and the customer submission 3404 would both be forwarded to the IPPE 120 for processing. In general, in accordance with embodiments of the invention, it is appreciated that the processing described herein may be varied in terms of the particular financial entity and/or other particular processing portion that effects such processing. For example, the processing described herein as being performed by a merchant acquirer might instead be performed in some manner by a bank interfacing directly with a merchant.

All documents including patents and patent applications referenced herein are incorporated by reference in their entirety. The invention as described herein including the drawings may be used in conjunction with the features as disclosed in the above referenced documents including patents and patent applications.

As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running a Microsoft Windows™ operating system, such as the Microsoft Windows™ 8 operating system, the Microsoft Windows™ 7 operating system, the Microsoft Windows™ Vista™ operating system, the Microsoft Windows™ XP™ operating system, the Microsoft Windows™ NT™ operating system, the Windows™ 2000 operating system, a MAC operating system (Mac OS) such as OS X, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, RFID (Radio Frequency Identification), NFC (Near Field communication) or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A wallet vault, in the form of a tangibly embodied processing machine having:
   at least one processor, disposed in communication with a financial payment network,
   a communication portion that inputs and outputs information; and
   memory having instructions stored thereon, the instructions, when executed by the at least one processor, cause the at least one processor to perform operations comprising:
      storing token information of a customer and real credentials of the customer, the token information associated with the real credentials of the customer, the real credentials constituted by an account number of the customer;
      inputting the token information with transaction ID information from a processing entity in the financial network, the transaction ID information generated by a merchant processing a transaction for the customer;
      associating the token information of the customer with the real credentials of the customer; and
      outputting the associated real credentials with the transaction ID information to the processing entity in the financial network;
   wherein the wallet vault is associated with a plurality of wallets of the customer, including a first wallet from which the transaction is initiated, each of the plurality of wallets associated with one or more merchants,
   wherein each of the plurality of wallets stores assigned token information of the customer and not the real credentials of the customer, and
   wherein the transaction is an online transaction and a checkout page of the merchant is integrated with one of the plurality of wallets using an application programming interface such that the customer can select to pay for the transaction using the one of the plurality of wallets on the checkout page of the merchant by selecting an option on the merchant's checkout page, and upon selection of the option on the merchant's checkout page, transferring control of the transaction from the merchant to the wallet.

2. The wallet vault of claim 1, wherein the associating the token information of the customer with the real credentials of the customer is performed in conjunction with an authorization of the transaction.

3. The wallet vault of claim 1, wherein the associating the token information of the customer with the real credentials of the customer is performed in conjunction with a settlement of the transaction.

4. The wallet vault of claim 1, wherein the token information with transaction ID information is transmitted from the merchant processing the transaction for the customer to the wallet vault through a merchant acquirer, the merchant acquirer being associated with the merchant.

5. The wallet vault of claim 4, wherein the token information with transaction ID information is transmitted from the merchant processing the transaction for the customer to the wallet vault further through an interim payment processing entity, the interim payment processing entity being associated with the wallet vault.

6. The wallet vault of claim 1, the token information constituted by a one-time payment identifier for use by the customer to perform a single transaction.

7. The wallet vault of claim 1, the operations further comprising: maintaining a history of associating token information of respective customers with the real credentials of respective customers over a period of time for each of a plurality of customers.

8. The wallet vault of claim 7, the operations further comprising: based on the history maintained by the wallet vault, outputting communications to settle a plurality of transactions in a batch manner.

9. The wallet vault of claim 1, wherein the processing entity in the financial network is an issuer bank.

10. The wallet vault of claim 1, wherein the processing entity in the financial network is an interim payment processing entity, the interim payment processing entity disposed in the payment network between a merchant acquirer and an issuer bank.

11. The wallet vault of claim 1, wherein the processing entity in the financial network is an interim payment processing entity, the interim payment processing entity disposed in the payment network between a merchant and an issuer bank.

12. The wallet vault of claim 1, wherein the first wallet associated with the merchant sends the token information to the merchant after the customer enters a password while interfacing with the first wallet.

13. A non-transitory computer readable medium constituting a wallet vault, the computer readable medium including code and the computer readable medium being tangibly embodied, the computer readable medium comprising:
   a first portion that inputs and outputs information; and
   a second portion, the second portion:
      storing token information of a customer and real credentials of the customer, the token information associated with the real credentials of the customer, the real credentials constituted by an account number of the customer;
      inputting the token information with transaction ID information from a processing entity in the financial network, the transaction ID information generated by a merchant processing a transaction for the customer;
      associating the token information of the customer with the real credentials of the customer; and
      outputting the associated real credentials with the transaction ID information to the processing entity in the financial network;
   wherein the wallet vault is associated with a plurality of wallets of the customer, including a first wallet from which the transaction is initiated, each of the wallets associated with one or more merchants, wherein each of the plurality of wallets stores assigned token information of the customer and not the real credentials of the customer, and wherein the transaction is an online transaction and a checkout page of the merchant is integrated with one of the plurality of wallets using an application programming interface such that the customer can select to pay for the transaction using the one of the plurality of wallets on the checkout page of the merchant by selecting an option on the merchant's checkout page, and upon selection of the option on the merchant's checkout page, transferring control of the transaction from the merchant to the wallet.

14. A method performed by a wallet vault, the wallet vault in the form of a tangibly embodied processing machine, having at least one processor, disposed in communication with a financial payment network, the method performed by the at least one processor, the method comprising:

storing token information of a customer and real credentials of the customer, the token information associated with the real credentials of the customer, the real credentials constituted by an account number of the customer;

inputting the token information with transaction ID information from a processing entity in the financial network, the transaction ID information generated by a merchant processing a transaction for the customer;

associating the token information of the customer with the real credentials of the customer; and outputting the associated real credentials with the transaction ID information to the processing entity in the financial network;

wherein the wallet vault is associated with a plurality of wallets of the customer, including a first wallet from which the transaction is initiated, each of the wallets associated with one or more merchants, wherein each of the plurality of wallets stores assigned token information of the customer and not the real credentials of the customer, wherein the transaction is an online transaction and a checkout page of the merchant is integrated with one of the plurality of wallets using an application programming interface such that the customer can select to pay for the transaction using the one of the plurality of wallets on the checkout page of the merchant by selecting an option on the merchant's checkout page, and upon selection of the option on the merchant's checkout page, transferring control of the transaction from the merchant to the wallet.

\* \* \* \* \*